(12) United States Patent
Mochizuki et al.

(10) Patent No.: US 10,007,142 B2
(45) Date of Patent: Jun. 26, 2018

(54) DYE-BASED POLARIZER AS WELL AS POLARIZING PLATE AND LIQUID CRYSTAL DISPLAY DEVICE USING THE POLARIZER

(71) Applicants: NIPPON KAYAKU KABUSHIKI KAISHA, Tokyo (JP); POLATECHNO CO., LTD., Niigata (JP)

(72) Inventors: Noriaki Mochizuki, Tokyo (JP); Takahiro Higeta, Tokyo (JP)

(73) Assignees: NIPPON KAYAKU KABUSHIKI KAISHA, Tokyo (JP); POLATECHNO CO., LTD., Niigata (JP)

( * ) Notice: Subject to any disclaimer, the term of this patent is extended or adjusted under 35 U.S.C. 154(b) by 0 days. days.

(21) Appl. No.: 15/814,802

(22) Filed: Nov. 16, 2017

(65) Prior Publication Data

US 2018/0074371 A1 Mar. 15, 2018

Related U.S. Application Data

(63) Continuation of application No. PCT/JP2016/064941, filed on May 19, 2016.

(30) Foreign Application Priority Data

| May 20, 2015 | (JP) | ................. | 2015-102407 |
| May 20, 2015 | (JP) | ................. | 2015-102408 |
| Feb. 17, 2016 | (JP) | ................. | 2016-027632 |
| Feb. 17, 2016 | (JP) | ................. | 2016-027633 |

(51) Int. Cl.

| *G02F 1/1335* | (2006.01) |
| *G02B 5/30* | (2006.01) |
| *C09B 31/30* | (2006.01) |
| *C09B 43/32* | (2006.01) |
| *C09B 67/22* | (2006.01) |
| *C09B 43/124* | (2006.01) |

(52) U.S. Cl.
CPC ........ *G02F 1/133528* (2013.01); *C09B 31/30* (2013.01); *C09B 43/124* (2013.01); *C09B 43/32* (2013.01); *C09B 67/0046* (2013.01); *G02B 5/3025* (2013.01); *Y10T 428/1041* (2015.01)

(58) Field of Classification Search
CPC . G02F 1/133528; G02B 5/3025; C09B 31/18; C09B 31/26; C09B 31/30; C09B 37/00; C09B 39/00; C09B 43/32; C09B 43/124; C09B 67/0046; Y10T 428/1041
See application file for complete search history.

(56) References Cited

U.S. PATENT DOCUMENTS

| 5,318,856 A | 6/1994 | Misawa et al. |
| 5,354,512 A | 10/1994 | Ogino et al. |
| 5,659,020 A | 8/1997 | Ogino et al. |
| 5,667,719 A | 9/1997 | Mortazavi et al. |
| 6,235,064 B1 | 5/2001 | Ogino et al. |
| 6,790,490 B1 | 9/2004 | Oiso et al. |
| 7,304,147 B2 | 12/2007 | Sadamitsu et al. |
| 2001/0040652 A1 | 11/2001 | Hayashi |
| 2004/0218118 A1 | 11/2004 | Hayashi |
| 2005/0003109 A1 | 1/2005 | Oiso et al. |
| 2007/0166483 A1 | 7/2007 | Sadamitsu |
| 2009/0126127 A1 | 5/2009 | Sadamitsu et al. |
| 2009/0174942 A1 | 7/2009 | Sadamitsu et al. |
| 2010/0257678 A1 | 10/2010 | Sadamitsu et al. |
| 2011/0164208 A1 | 7/2011 | Nishiguchi et al. |
| 2013/0302538 A1 | 11/2013 | Higeta et al. |
| 2013/0314786 A1 | 11/2013 | Higeta et al. |
| 2016/0047959 A1 | 2/2016 | Mochizuki |

FOREIGN PATENT DOCUMENTS

| CN | 1360682 A | 7/2002 | |
| CN | 1523375 A | 8/2004 | |
| JP | 60-156759 A | 8/1985 | |
| JP | 64-05623 A | 1/1989 | |
| JP | 2-61988 A | 3/1990 | |
| JP | 3-12606 A | 1/1991 | |
| JP | 5-295281 A | 11/1993 | |
| JP | 08-240715 A | 9/1996 | |
| JP | 2622748 B2 | 4/1997 | |
| JP | 10-259311 A | 9/1998 | |
| JP | 11-506547 A | 6/1999 | |
| JP | 11-218611 A | 8/1999 | |
| JP | 2985408 B | 10/1999 | |
| JP | 2000-329936 A | 11/2000 | |
| JP | 3378296 B2 | 12/2002 | |
| JP | 3661238 B2 | 4/2005 | |
| JP | 2005344071 A | * 12/2005 | ............. C09D 11/32 |

(Continued)

OTHER PUBLICATIONS

English translation of the Written Opinion dated Jul. 26, 2016 for corresponding International Application No. PCT/JP2016/064941.
International Preliminary Report on Patentability dated Nov. 21, 2017 for corresponding International Application No. PCT/JP2016/064941.
"Application of Functional Dyes", compiled under the supervision of Masahiro Irie, edition of the first copy, CMC Publishing Co., Ltd., Jun. 2002, pp. 98-100 and concise English translation.
"Senryo Kagaku (Dye Chemistry)" written by Yutaka Hosoda, Gihodo Shuppan Co., Ltd., 1957, pp. 135-234.
International Search Report and Written Opinion for corresponding International Application No. PCT/JP2016/064941 dated Jul. 26, 2016.
Decision to Grant a Patent received on Nov. 14, 2017 in corresponding Japanese Application No. 2016-555382 and English translation.

(Continued)

*Primary Examiner* — Sophie Hon
(74) *Attorney, Agent, or Firm* — Pearne & Gordon LLP

(57) ABSTRACT

A polarizer contains, in a base thereof, at least one of an azo compound represented by Formula (1) or a salt thereof (as compound A), and at least one of an azo compound represented by Formula (2-I), (2-II), (3), (4-I), (4-II), (5-I) or (5-II), or a salt thereof (as compound B).

7 Claims, No Drawings

(56) References Cited

FOREIGN PATENT DOCUMENTS

| | | |
|---|---|---|
| JP | 2006-276236 A | 10/2006 |
| JP | 4033443 B2 | 11/2007 |
| JP | 4162334 B2 | 8/2008 |
| JP | 2009-132764 A | 6/2009 |
| JP | 2009-155364 A | 7/2009 |
| JP | 4360100 B2 | 8/2009 |
| JP | 4452237 B2 | 2/2010 |
| JP | 4662853 B2 | 1/2011 |
| JP | 4736424 B2 | 5/2011 |
| JP | 5017961 B2 | 6/2012 |
| TW | 1292494 B | 1/2008 |
| TW | 201439606 A | 10/2014 |
| WO | 2007/138980 A1 | 12/2007 |
| WO | 2007/145210 A1 | 12/2007 |
| WO | 2007/148757 A1 | 12/2007 |
| WO | 2009/154055 A1 | 12/2009 |
| WO | WO 2012081637 A1 * | 6/2012 ............ C09B 31/30 |
| WO | 2012/108169 A1 | 8/2012 |
| WO | 2012/108173 A1 | 8/2012 |

OTHER PUBLICATIONS

Office Action dated Feb. 20, 2017 in corresponding Taiwanese Application No. 105115801 and English translation.
Decision to Grant a Patent received on Jun. 19, 2017 in the corresponding Taiwanese Application No. 105115801 and English translation.
Chinese Office Action dated Feb. 11, 2018 for corresponding Chinese Application No. 201680004043.4 and English translation.
Korean Notification of Reason for Refusal dated Mar. 6, 2018 for corresponding Korean Application No. 10-2017-7028065 and English translation.

* cited by examiner

DYE-BASED POLARIZER AS WELL AS POLARIZING PLATE AND LIQUID CRYSTAL DISPLAY DEVICE USING THE POLARIZER

CROSS REFERENCE TO RELATED APPLICATIONS

This is a continuation application of International Patent Application No. PCT/JP2016/064941 filed May 19, 2016, which claims the benefit of Japanese Patent Application Nos. 2015-102407, 2015-102408, 2016-027632, 2016-027633 filed May 20, 2015, May 20, 2015, Feb. 17, 2016, and Feb. 17, 2016, respectively, and the disclosure of which are hereby incorporated by reference in their entirety.

BACKGROUND

Technical Field

The present disclosure relates to a dye-based polarizer having a high degree of polarization, high contrast and high durability, as well as a polarizing plate and a liquid crystal display device using the polarizer.

Background

A polarizer is generally produced by absorption orientation of iodine that is a dichroic pigment, or a dichroic dye on a polyvinyl alcohol-based resin film. A polarizing plate obtained by laminating a protection film of triacetyl cellulose or the like on the polarizer thorough an adhesive layer is used in a liquid crystal display device or the like. A polarizing plate using iodine as the dichroic pigment is designated as an iodine-based polarizing plate, and on the other hand, a polarizing plate using a dichroic dye such as a dichroic organic dye as the dichroic pigment is designated as a dye-based polarizing plate. Among of these polarizing plates, in general, the iodine-based polarizing plate is excellent in optical characteristics in general, but is poor in heat resistance. Therefore, the iodine-based polarizing plate has a disadvantage that it is difficult to use under an environment requiring high durability as in a liquid crystal display device. On the other hand, the dye-based polarizing plate has high heat resistance, high wet heat durability and high stability, and further has a characteristic of high color selectivity through pigment mixing, but has a problem that polarization performance and contrast are lower than those of the iodine-based polarizing plate. Therefore, there is a demand for a polarizer that retains high durability and has a wide range of color selectivity as well as has high contrast and a high polarization property.

Japanese Laid-Open Patent Publication No. 11-218611, Japanese Patent No. 4162334 and Japanese Patent No. 4360100 disclose polarizers each obtained by absorption orientation of an azo compound, used as a dichroic dye, on a polyvinyl alcohol-based resin film. From the viewpoint of a polarization property, an absorption wavelength region, hue and the like, however, the polarizers containing the dichroic dyes described in these documents have polarization properties and contrast lower than those of an iodine-based polarizing plate, and hence do not sufficiently meet requirements for use in a recent high-definition display. Besides, Japanese Patent No. 4736424 and Japanese Patent No. 5017961 each disclose a polarizing film containing an azo compound having a ureide skeleton. Even the polarizing film containing such an azo compound, however, is not sufficient in the polarization property for use in a recent high-definition display, and is required to be further improved in the performance.

Besides, it is known that there are tetrakis-azo-based ureide pigments such as C.I. Direct Red 73, C.I. Direct Red 75, C.I. Direct Red 79, C.I. Direct Red 80, C.I. Direct Red 84, C.I. Direct Red 106 and C.I. Direct Red 113 as other examples of the azo compound having the ureide skeleton. If such a ureide pigment is applied to a polarizing plate, however, the degree of polarization is low, and therefore, such a polarizing plate is difficult to apply to a display. Besides, in a polarizing plate for use in a display, an azo compound of a dichroic dye is generally mixed for color adjustment in consideration of luminous efficiency, but in some cases, the polarization performance may be largely varied by the azo compound thus mixed. Therefore, with respect to a polarizing plate for use in a display, it is very significant to select an optimal azo compound for producing a polarizing plate best in the polarization performance in consideration of luminous efficiency. Furthermore, recently, in order that not only a liquid crystal display but also a touch panel or an organic EL display can be used in the field of vehicle use, there is a demand for development of a polarizing plate that not only has a high degree of polarization and high contrast but also is little changed in the degree of polarization even by heat or under a high-temperature high-humidity environment.

The present disclosure is related to providing a high-performance polarizer having a high degree of polarization, high contrast and high durability, as well as a polarizing plate and a liquid crystal display device using the polarizer. In particular, the present disclosure is related to providing a high-performance polarizer, has excellent polarization performance and durability, that is free from color loss in a perpendicular position in a visual light region, particularly in a wavelength region of 400 to 700 nm, and that is improved in humidity resistance and heat resistance against heat and humidity, as well as to provide a polarizing plate and a liquid crystal display device using the polarizer.

SUMMARY

According to a first aspect of the present disclosure, a polarizer contains, in a base thereof, at least one of an azo compound represented by the following Formula (1) or a salt thereof (as compound A); and at least one of an azo compound represented by the following Formula (2-I), (2-II), (3), (4-I), (4-II), (5-I) or (5-II), or a salt thereof (as compound B):

the compound A:

Formula (1)

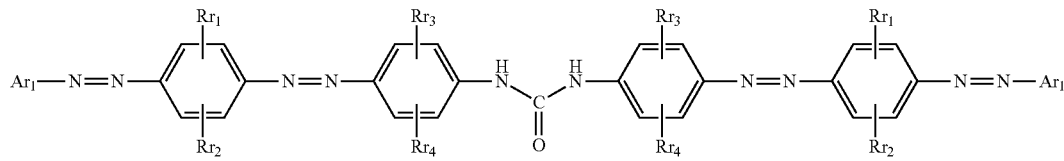

wherein Ar₁ represents a phenyl group or a naphthyl group having at least one substituent of a sulfo group or a carboxy group; and Rr₁ to Rr₄ each independently represent a hydrogen atom, a lower alkyl group, a lower alkoxy group or a lower alkoxy group having a sulfo group, the compound B:

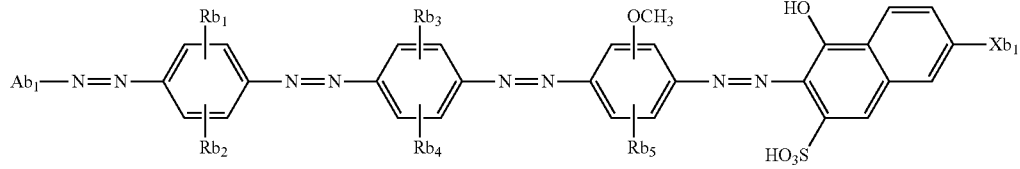

Formula (2-I)

wherein Ab₁ represents a phenyl group or a naphthyl group having at least one substituent of a sulfo group or a carboxy group;

Rb₁ to Rb₅ each independently represent a hydrogen atom, a lower alkyl group, a lower alkoxy group or a lower alkoxy group having a sulfo group; and Xb₁ represents an amino group, a phenylamino group, a phenylazo group, a naphthotriazole group or a benzoylamino group optionally having at least one substituent selected from the group consisting of a lower alkyl group, a lower alkoxy group, a sulfo group, an amino group, a lower alkylamino group, a hydroxyl group, a carboxy group and a carboxyethyl amino group,

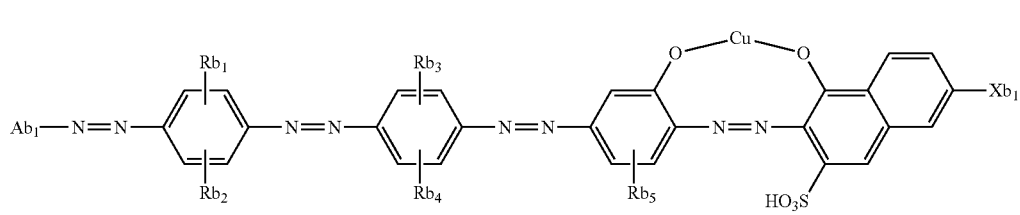

Formula (2-II)

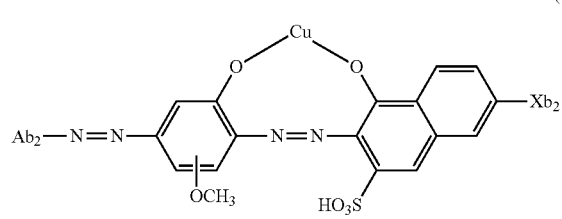

Formula (3)

wherein Ab₂ represents a phenyl group or a naphthyl group having at least one substituent of a sulfo group or a carboxy group; and Xb₂ represents a phenylamino group, a phenylazo group, a naphthotriazole group or a benzoylamino group optionally having at least one substituent selected from the group consisting of a lower alkyl group, a lower alkoxy group, a hydroxyl group, a carboxy group, a sulfo group, an amino group and a substituted amino group,

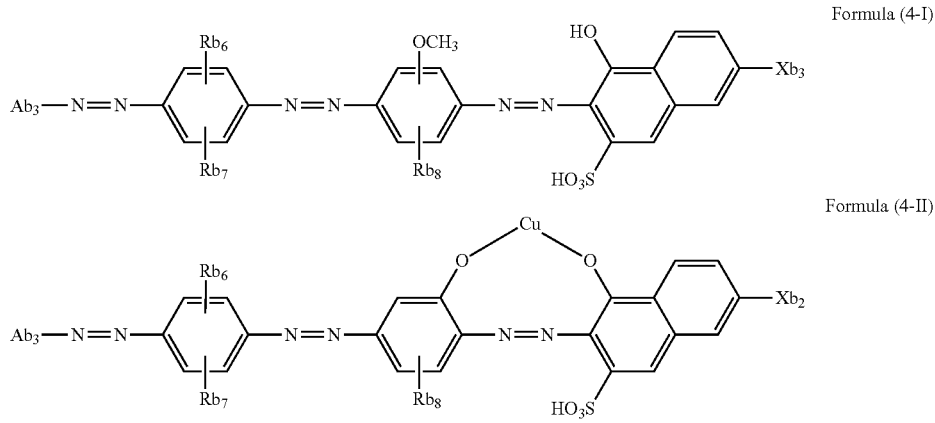

Formula (4-I)

Formula (4-II)

wherein Ab$_3$ represents a phenyl group or a naphthyl group having at least one substituent of a sulfo group or a carboxy group;

Rb$_6$ to Rb$_8$ each independently represent a hydrogen atom, a lower alkyl group, a lower alkoxy group or a lower alkoxyl group having a sulfo group; and Xb$_3$ represents an amino group, a phenylamino group, a phenylazo group, a benzoyl group, a benzoylamino group or a naphthotriazole group optionally having at least one substituent selected from the group consisting of a lower alkyl, a lower alkoxy group, a hydroxyl group, a carboxy group, a sulfo group, an amino group, a substituted amino group and an aminonaphthyl group, and

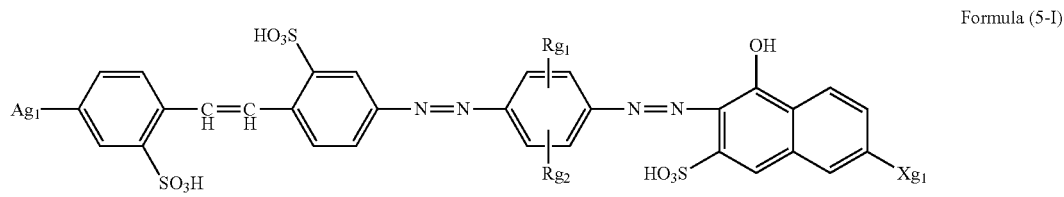

Formula (5-I)

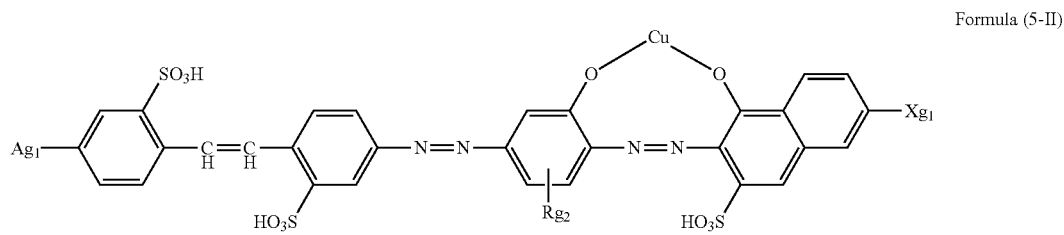

Formula (5-II)

wherein $Ag_1$ represents a nitro group or an amino group,
$Xg_1$ represents: an amino group optionally having at least one substituent selected from the group consisting of a lower alkyl group, a lower alkoxy group and a sulfo group;
a benzoyl group or a benzoylamino group optionally having at least one substituent selected from the group consisting of a lower alkyl group, a lower alkoxy group, a sulfo group, an amino group and a substituted amino group;
a phenylamino group optionally having at least one substituent selected from the group consisting of a lower alkyl group, a lower alkoxy group, a sulfo group, an amino group and a substituted amino group;
a phenylazo group optionally having at least one substituent selected from the group consisting of a lower alkyl group, a lower alkoxy group, a sulfo group, a hydroxyl group, an amino group and a substituted amino group; or
a naphthotriazole group optionally having at least one substituent selected from the group consisting of a lower alkyl group, a lower alkoxy group, a sulfo group, an amino group and a substituted amino group,
$Rg_1$ and $Rg_2$ of Formula (5-I) each independently represent a hydrogen atom, a hydroxyl group, a lower alkyl group, a lower alkoxy group or a lower alkoxy group having a sulfo group, and
$Rg_2$ of Formula (5-II) represents a hydrogen atom, a hydroxyl group, a lower alkyl group, a lower alkoxy group or a lower alkoxy group having a sulfo group.

Further, it is preferable that the compound represented by Formula (1) is represented by the following Formula (1'):

According to a second aspect of the present disclosure, a polarizing plate includes a transparent protection layer on at least one surface of the polarizer according to the present disclosure.

According to a third aspect of the present disclosure, a liquid crystal display device uses the polarizer according to the present disclosure or the polarizing plate according to the present disclosure.

A polarizer or a polarizing plate of the present disclosure exhibits a high degree of polarization and further remarkably high contrast. Therefore, a polarizer or a polarizing plate exhibiting excellent polarization property can be provided. Besides, the polarizer or the polarizing plate of the present disclosure exhibits remarkably high durability against heat and humidity. Therefore, a highly reliable and brighter liquid crystal display device that has high contrast for a long period of time can be provided by using the polarizer or the polarizing plate of the present disclosure.

DETAILED DESCRIPTION

Hereinafter, embodiments of the present disclosure are detailed explained. Herein, a range of numerical values expressed using "to" means a range including numerical values before and after "to", respectively, as a lower limit value and an upper limit value.

Besides, azo compounds represented by respective Formulas and azo compounds of compound examples described below are represented in the form of a free acid unless otherwise mentioned. In the following description, for avoiding complication, "an azo compound or a salt thereof" is described, for convenience sake, as "an azo compound" inclusively meaning a salt of the azo compound unless otherwise mentioned.

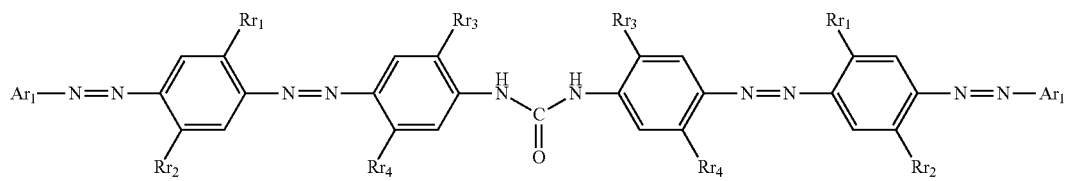

wherein $Ar_1$ and $Rr_1$ to $Rr_4$ are the same as defined in the Formula (1).

Further, it is preferable that the polarizer further contains, in the base, at least one of an azo compound represented by the following Formula (6) or a salt thereof (as compound C):

Formula (6)

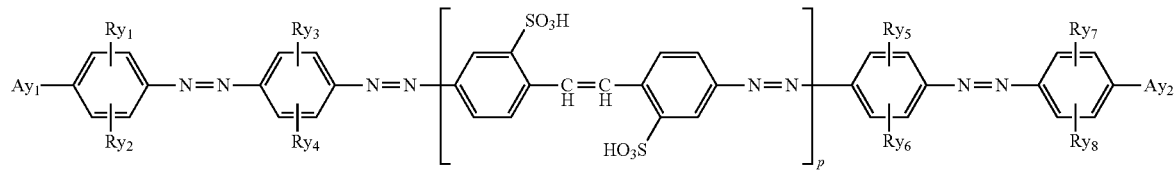

wherein $Ay_1$ and $Ay_2$ each independently represent a sulfo group, a carboxy group, a hydroxyl group, a lower alkyl group or a lower alkoxyl group;
$Ry_1$ to $Ry_8$ each independently represent a hydrogen atom, a sulfo group, a lower alkyl group or a lower alkoxyl group; and
p represents an integer of 1 to 3.

Further, it is preferable that the base is a film made of a polyvinyl alcohol-based resin.

Besides, in the present disclosure, the term "lower" described in such as a lower alkyl group or a lower alkoxy group means that the number of carbon numbers is 1 to 4.

<Polarizer>

A polarizer according to the present disclosure contains, in a base thereof, at least one of an azo compound represented by Formula (1) or a salt thereof (as compound A), and at least one of an azo compound represented by Formula (2-I), (2-II), (3), (4-I), (4-II), (5-I) or (5-II), or a salt thereof (as compound B). A high-performance polarizer exhibiting high transmittance and high contrast and further high durability can be obtained by both the azo compounds being contained in the base. Besides, the polarizer according to the present disclosure may further optionally contain at least one of an azo compound represented by Formula (6) or a salt thereof (as compound C), and preferably contains the compound A, the compound B and the compound C in the base thereof.

(Base)

The base used in the polarizer of the present disclosure contains the compound A and the compound B. Therefore, the base is preferably a film or the like obtained by filming a hydrophilic polymer capable of adsorbing a dichroic dye, particularly azo compound(s). The hydrophilic polymer is not especially limited, and examples include polyvinyl alcohol-based resins, amylose-based resins, starch-based resins, cellulose-based resins and poly acrylate-based resins Among these resins, a polyvinyl alcohol-based resin or a derivative thereof is preferred from the viewpoint of the dyeability of a dichroic dye, workability and cross-linkability. The shape of the base is not especially limited, and for example, the base can be produced into an optional shapes including a film shape, a sheet shape, a plate shape, a curved plate shape and a semispherical shape. Besides, the thickness of the base can be appropriately designed in accordance with the use of the polarizer, and is preferably in a range of 5 µm to 150 µm, and more preferably in a range of 20 µm to 100 µl. The polarizer according to the present disclosure can be produced, for example, by forming the hydrophilic polymer used as the base into a film shape, subsequently causing an azo compound or a salt thereof to be contained in the film, and subjecting the resultant film to an orientation treatment such as stretching.

(Compound A)

The polarizer according to the present disclosure contains, in the base, at least one azo compound represented by the following Formula (1):

ethyl group, a methoxy group, an ethoxy group, a carboxy group, a nitro group and an amino group, and is particularly preferably selected from the group consisting of a sulfo group, a methyl group, a methoxy group, an ethoxy group and a carboxy group. The lower alkoxy group having a sulfo group is preferably a straight chain alkoxy group, and the substitution position of the sulfa group is preferably a terminal of the alkoxy group. Such a lower alkoxy group having a sulfo group is more preferably a 3-sulfopropoxy group or 4-sulfobutoxy group, and particularly preferably a 3-sulfopropoxy group. If the phenyl group has a sulfo group as substituent, the number of sulfo groups is preferably one or two, and the substitution position of the sulfo group is not especially limited, but is preferably the 4-position of the phenyl group if the number of sulfo groups is one, and is preferably a combination of the 2- and 4-positions of the phenyl group or a combination of the 3- and 5-positions of the phenyl group if the number of sulfa groups is two.

In Formula (1), if An is a naphthyl group, the naphthyl group preferably has at least one sulfo group as substituent. If the naphthyl group has at least two substituents, at least one of the substituents is a sulfo group, and the other substituent is preferably selected from the group consisting of a sulfo group, a hydroxyl group, a carboxy group and a lower alkoxy group having a sulfo group. The lower alkoxy group having a sulfo group is preferably a straight chain alkoxy group, and the substitution position of the sulfo group is preferably a terminal of the alkoxy group. Such a lower alkoxy group having a sulfo group is more preferably a 3-sulfopropoxy group or 4-sulfobutoxy group, and particularly preferably a 3-sulfopropoxy group. If the number of sulfo groups substituted in the naphthyl group is two, the substitution positions of the sulfo groups are preferably a combination of the 4- and 8-positions or a combination of the 6- and 8-positions of the naphthyl group, and is more preferably a combination of the 6- and 8-positions. If the number of sulfo groups substituted in the naphthyl group is Formula (1)

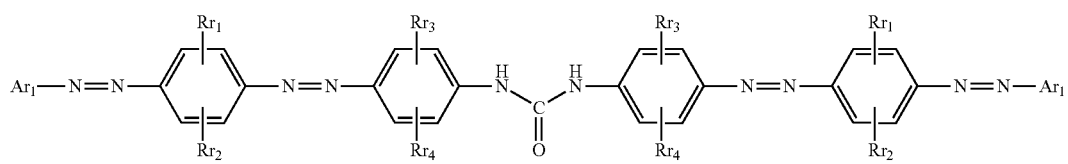

In Formula (1), An represents a phenyl group or a naphthyl group having at least one substituent of a sulfo group or a carboxy group; and $Rr_1$ to $Rr_4$ each independently represent a hydrogen atom, a lower alkyl group, a lower alkoxy group or a lower alkoxyl group having a sulfo group.

In Formula (1), if $Ar_1$ is a phenyl group, the phenyl group preferably has at least one sulfo group or carboxy group as substituent. If the phenyl group has at least two substituents, at least one of the substituents is a sulfo group or a carboxy group, and the other substituent is preferably selected from the group consisting of a sulfo group, a carboxy group, a lower alkyl group, a lower alkoxy group, a lower alkoxy group having a sulfo group, a nitro group, an amino group, an acetylamino group and a lower alkylamino group-substituted amino group, and is more preferably selected from the group consisting of a sulfo group, a methyl group, an three, the substitution positions of the sulfa groups are preferably a combination of the 1-, 3- and 6-positions.

In Formula (1), $Rr_1$ to $Rr_4$ each independently represent a hydrogen atom, a lower alkyl group, a lower alkoxy group or a lower alkoxyl group having a sulfo group. The lower alkoxy group having a sulfo group is preferably straight chain alkoxy, and the substitution position of the sulfo group is preferably a terminal of the alkoxy group. $Rr_1$ to $Rr_4$ each independently represent preferably a hydrogen atom, a methyl group, an ethyl group, a methoxy group, an ethoxy group, a 3-sulfopropoxy group or a 4-sulfobutoxy group, and particularly preferably a hydrogen atom, a methyl group, a methoxy group or a 3-sulfopropoxy group. The substitution position of a phenyl group substituted in each of $Rr_1$ to $Rr_4$ is preferably the 2-position alone, the 5-position alone, a combination of the 2- and 6-positions, a combination of e 2- and 5-positions or a combination of the 3- and 5-positions of the phenyl group, and particularly preferably the 2-position alone, the 5-position alone or a combination of the 2- and 5-positions. Incidentally, the substitution position being the 2-position alone or the 5-position alone means, with respect to the relationship between $Rr_1$ and $Rr_2$ and the relationship between $Rr_3$ and $Rr_4$, that one of $Rr_1$ and $Rr_2$ or $Rr_3$ and $Rr_4$ has at least one substituent excluding a hydrogen atom in the 2- or 5-position alone, and the other has a hydrogen atom as the substituent.

Among azo compounds represented by Formula (1), an azo compound represented by the following Formula (1') is preferred, and if such an azo compound is used, the polarization performance of the resultant polarizer can be further improved.

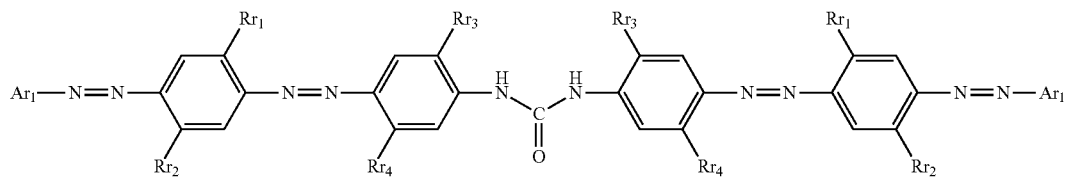

(1')

In Formula (1') $Ar_1$ and $Rr_1$ to $Rr_4$ are the same as defined in Formula (1) above.

The azo compound represented by Formula (1) can be synthesized, for example, by a method described in Japanese Laid-Open Patent Publication No. 2009-155364 or a similar method, but the production method is not limited to these. For example, the azo compound represented by Formula (1) can be produced by reacting a base compound represented by Formula (v) described below with ureidization agent such as phenyl chlorocarbonate at 20 to 95° C. As another synthesis method through ureidization, a method in which an amine compound is ureidized using a phosgene compound or the like is known. By employing this synthesis method, the azo compound having a ureide skeleton and represented by Formula (1) of the present disclosure can be obtained.

A specific synthesis method for the azo compound represented by Formula (1) will now be described. First, an amine having at least one substituent represented by the following Formula (i) is diazotized by a production method similar to a production method described in "Senryo Kagaku (Dye Chemistry)" written by Yutaka Hosoda, Gihodo Shuppan Co., Ltd., 1957, pp. 135-234, the resultant is coupled with anilines represented by the following Formula (ii), and thus, a monoazo amino compound represented by the following Formula (iii) is obtained.

 Formula (i)

In Formula (i), Ar has the same meaning as assigned to $Ar_1$ of Formula (1) above.

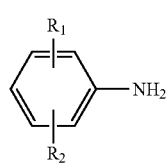

Formula (ii)

In Formula (ii), $R_1$ and $R_2$ respectively have the same meaning as assigned to $Rr_1$ and $Rr_2$ of Formula (1) above.

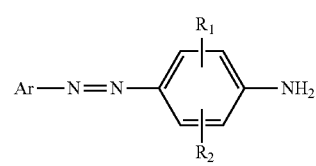

Formula (iii)

In Formula (iii), Ar has the same meaning as assigned to $Ar_1$ of Formula (1) above, and $R_1$ and $R_2$ respectively have the same meaning as assigned to $Rr_1$ and $Rr_2$ of Formula (1) above.

Subsequently, the monoazo amino compound represented by Formula (iii) is diazotized, the resultant is secondarily coupled to an aniline represented by the following Formula (iv), and thus, a disazo amino compound represented by the following Formula (v) is obtained.

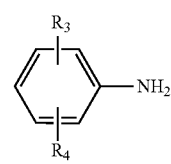

Formula (iv)

In Formula (iv), $R_3$ and $R_4$ respectively have the same meaning as assigned to $Rr_3$ and $Rr_4$ of Formula (1) above.

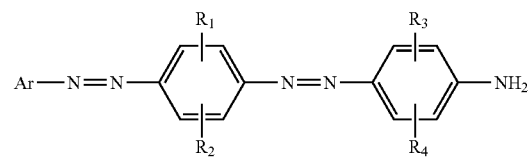

Formula (v)

In Formula (v), Ar has the same meaning as assigned to $Ar_1$ of Formula (1) above, $R_1$ and $R_2$ respectively have the same meaning as assigned to $Rr_1$ and $Rr_2$ of Formula (1) above, and $R_3$ and $R_4$ respectively have the same meaning as assigned to $Rr_3$ and $Rr_4$ of Formula (1) above.

The diazotization step of the reaction process described above is performed by a normal method in which a nitrite such as sodium nitrite is mixed in an aqueous solution or a suspension of a diazo component in a mineral acid such as hydrochloric acid or sulfuric acid, or a inverse method in which a nitrite is added to a neutral or weak alkaline aqueous solution of a diazo component, and the resultant is mixed with a mineral acid. A suitable temperature for the diazotization is −10 to 40° C. Besides, the coupling step to anilines is performed by mixing the above-described diazo solution with an acidic aqueous solution of hydrochloric acid, acetic acid or the like at a temperature of −10 to 40° C. under an acidic condition of pH 2 to 7.

The monoazo amino compound or the disazo amino compound obtained by the coupling step can be taken out by filtration as it is or after deposition with acid deposition or salting out, or alternatively can be subjected to another step still in the form of the solution or suspension. If a diazonium salt is slightly soluble and obtained as a suspension, the suspension is filtered to obtain a press cake, and the resultant filtered diazonium salt can be used in another coupling step.

The disazo amino compound obtained through the above-described steps is then subjected to ureidization reaction with phenyl chlorocarbonate, and thus, the azo compound represented by Formula (1) is synthesized. The ureidization reaction is performed, for example, by the production method described in Japanese Laid-Open Patent Publication No. 2009155364 at a temperature of 10 to 90° C. under a neutral to alkaline condition of pH 7 to 11. After completing the ureidization reaction, the obtained azo compound is deposited by salting out, and the resultant is filtered. Besides, if purification is necessary, the salting out is repeated, or the obtained azo compound may be deposited from water using an organic solvent(s). Examples of the organic solvent used for the purification include water-soluble organic solvents, for example, alcohols such as methanol and ethanol, and ketones such as acetone. In this manner, the azo compound represented by Formula (1) used in the present disclosure can be synthesized.

Specific examples of the azo compound represented by Formula (1) include the following compounds:

[Compound Example 1-1]

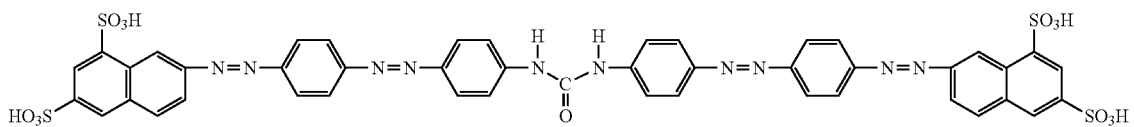

[Compound Example 1-2]

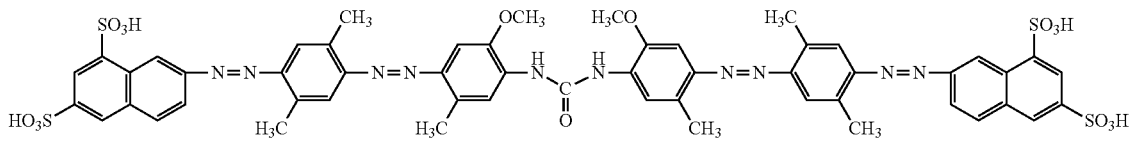

[Compound Example 1-3]

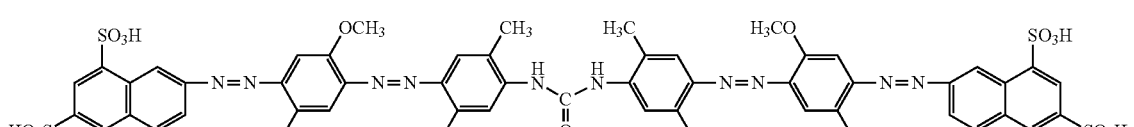

[Compound Example 1-4]

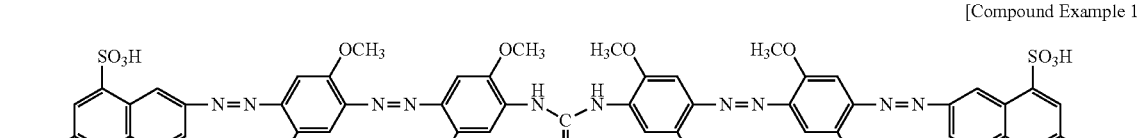

[Compound Example 1-5]

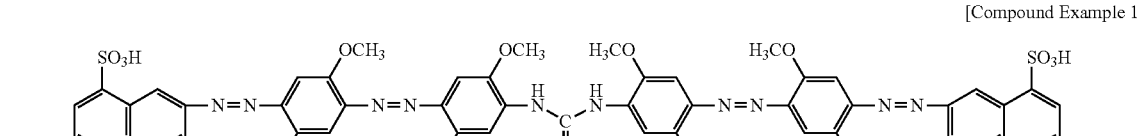

[Compound Example 1-6]

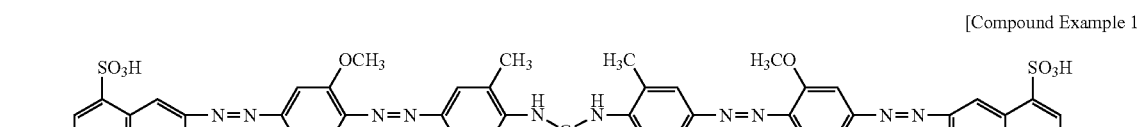

[Compound Example 1-7]

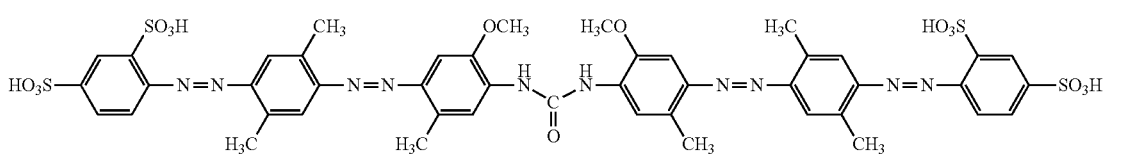

-continued
[Compound Example 1-8]
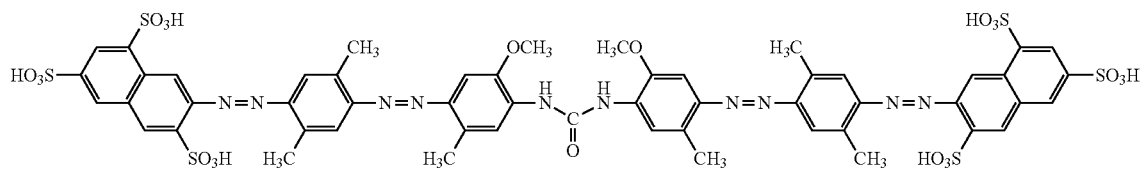
[Compound Example 1-9]
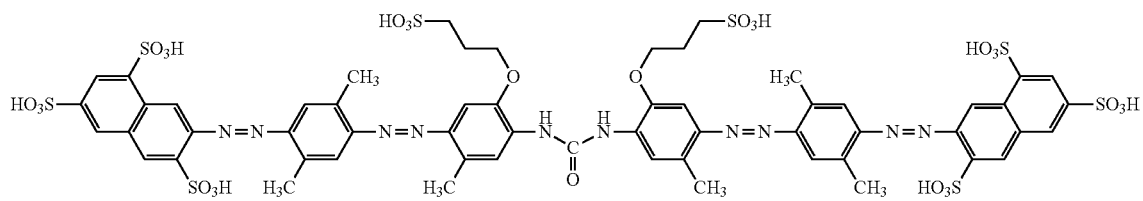
[Compound Example 1-10]
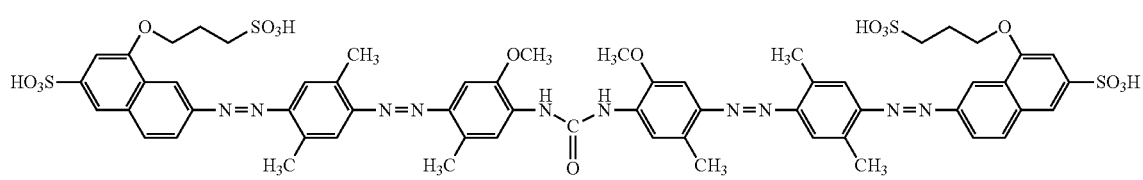
[Compound Example 1-11]
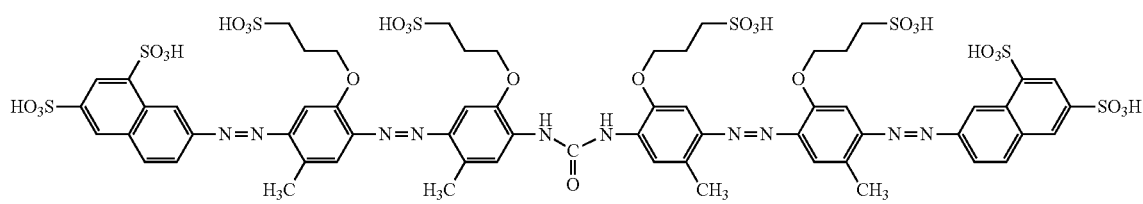
[Compound Example 1-12]
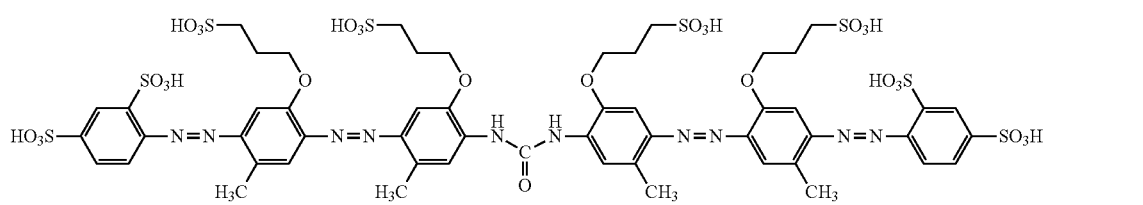
[Compound Example 1-13]
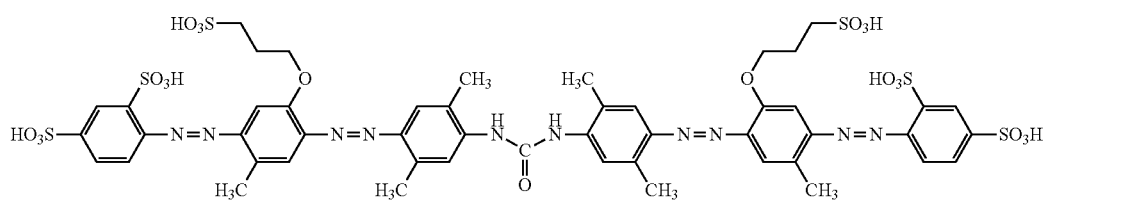
[Compound Example 1-14]
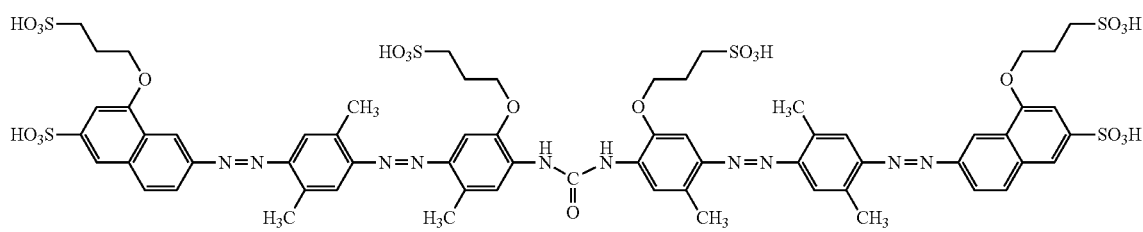

-continued
[Compound Example 1-15]
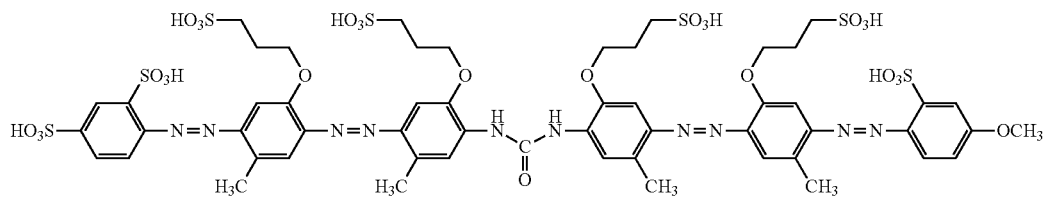
[Compound Example 1-16]
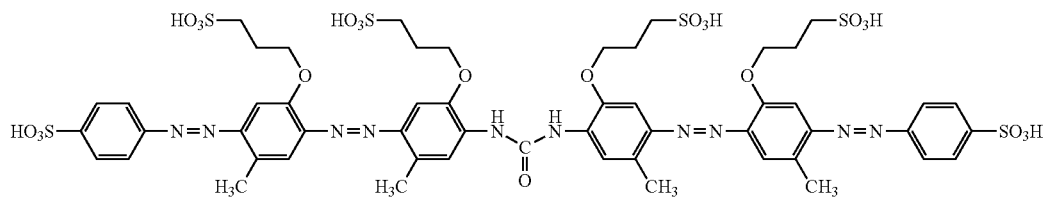
[Compound Example 1-17]
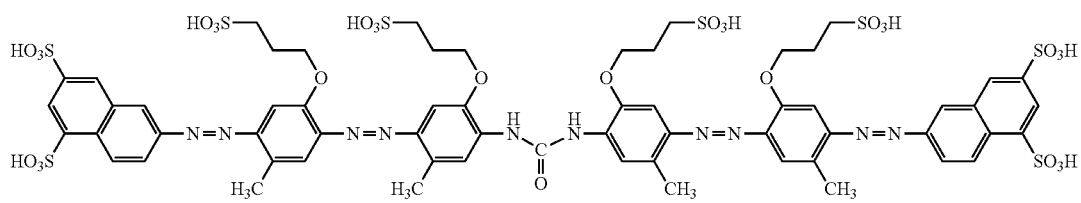
[Compound Example 1-18]
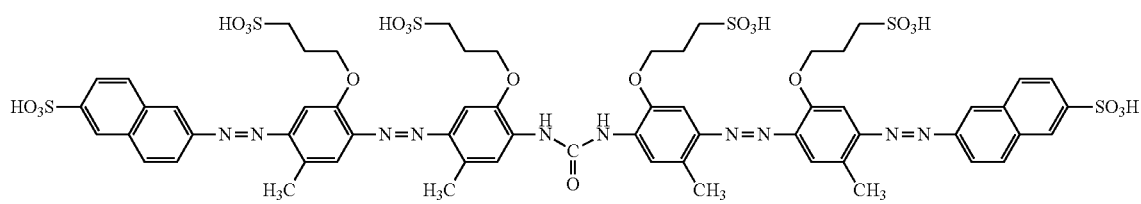
[Compound Example 1-19]
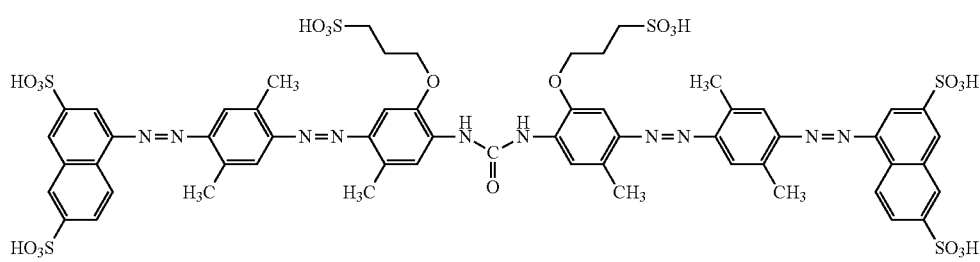
[Compound Example 1-20]
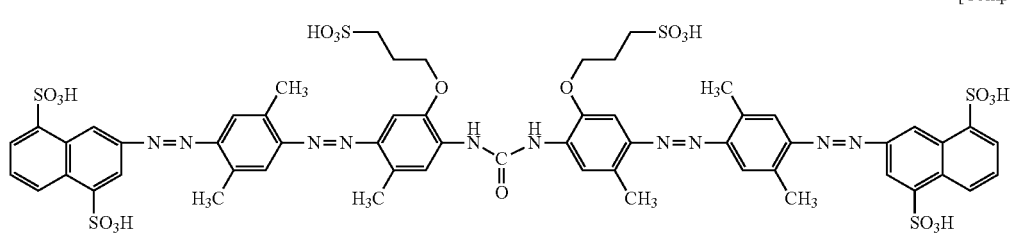
[Compound Example 1-21]
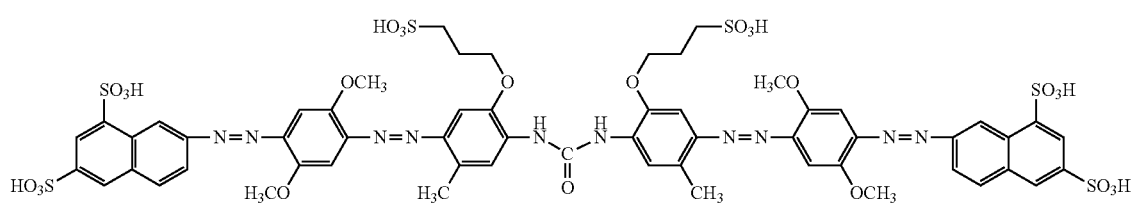

-continued

[Compound Example 1-22]

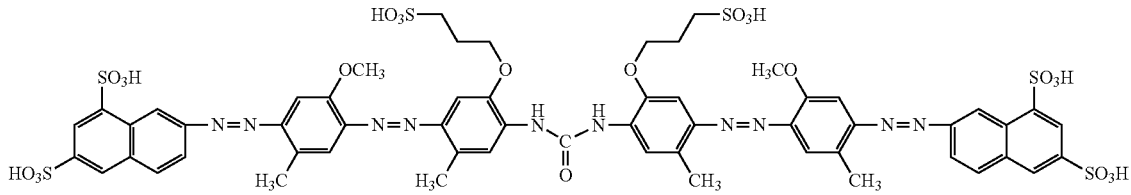

[Compound Example 1-23]

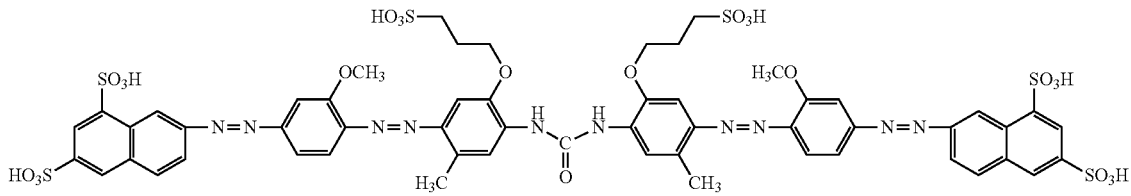

[Compound Example 1-24]

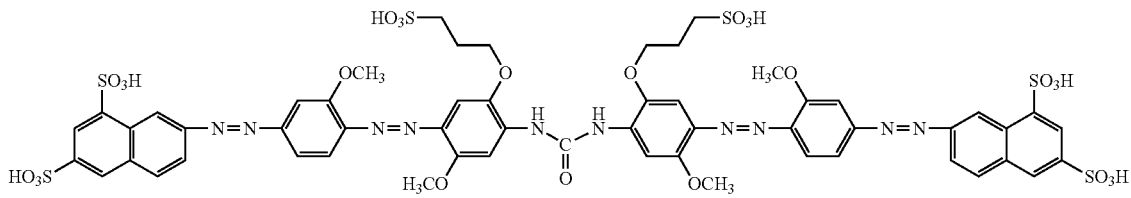

[Compound Example 1-25]

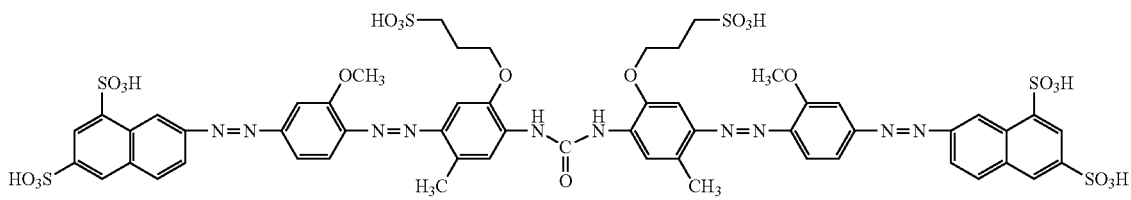

[Compound Example 1-26]

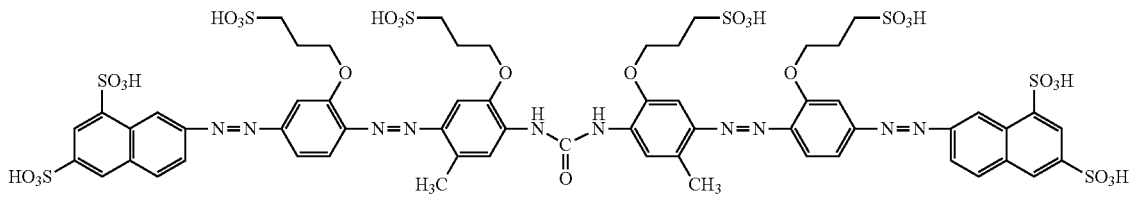

One of these azo compounds represented by Formula (1) may be singly used, or two or more of these may be used together.

(Compound B)

The polarizer of the present disclosure contains, together with the azo compound represented by Formula (1) used as the compound A, at least one of azo compounds represented by Formulas (2-I), (2-II), (3), (4-I), (4-II), (5-I) and (5-II), different from Formula (I), as the compound B, in the base.

The azo compound represented by Formula (2-I) or Formula (2-II) has the following structural Formula. It is noted that the azo compound represented by Formula (2-II) has the same structure as the azo compound represented by Formula (2-I) except that O of an —OCH₃ group and O of an —OH group are bonded to each other via copper (Cu).

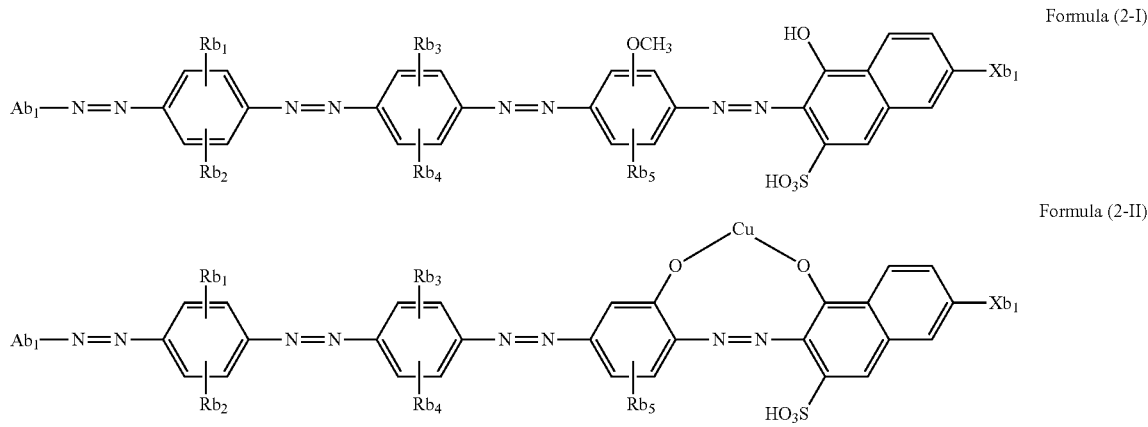

Formula (2-I)

Formula (2-II)

In Formula (2-I) or (2-II), $Ab_1$ represents a phenyl group or a naphthyl group having at least one substituent of a sulfo group or a carboxy group; $Rb_1$ to $Rb_5$ each independently represent a hydrogen atom, a lower alkyl group, a lower alkoxy group or a lower alkoxy group having a sulfo group; and $Xb_1$ represents an amino group, a phenylamino group, a phenylazo group, a naphthotriazole group or a benzoylamino group optionally having at least one substituent selected from the group consisting of a lower alkyl, a lower alkoxy group, a sulk) group, an amino group, a lower alkylamino group, a hydroxyl group, a carboxy group and a carboxyethyl amino group.

In Formula (2-I) or Formula (2-II), if $Ab_1$ is a phenyl group, the phenyl group preferably has at least one sulfo group or carboxy group as substituent. If the phenyl group has two substituents, at least one of the substituents is a sulfo group or a carboxy group, and the other substituent is preferably selected from the group consisting of a sulfo group, a carboxy group, a lower alkyl group, a lower alkoxy group, a lower alkoxy group having a sulfo group, a hydroxyl group, a nitro group, a benzoyl group, an amino group, an acetylamino group and a lower alkylamino group-substituted amino group, is more preferably selected from the group consisting of a sulfo group, a methyl group, an ethyl group, a methoxy group, an ethoxy group, a hydroxyl group, a carboxy group, a nitro group, an amino group, a 3-sulfopropoxy group and a 4-sulfobutoxy group, and is particularly preferably selected from the group consisting of a sulfo group, a methyl group, a methoxy group, a carboxy group and a 3-sulfopropoxy group. The lower alkoxy group having a sulfo group is preferably straight alkoxy like a 3-sulfopropoxy group or a 4-sulfobutoxy group, and the substitution position of the sulfo group is preferably a terminal of the alkoxy group. If the phenyl group has a sulfo group as the substituent, the number of sulfo groups is preferably one or two, and the substitution positions of the sulfo groups are not especially limited, and if the number of sulfo groups is one, the substitution position is preferably the 4-position of the phenyl group, and if the number of sulfo groups is two, the positions are preferably a combination of the 2- and 4-positions or the 3- and 5-positions of the phenyl group.

In Formula (2-I) or Formula (2-II), if $Ab_1$ is a naphthyl group, the naphthyl group preferably has at least one sulfo group as substituent. If the naphthyl group has at least two substituents, at least one of the substituents is a sulfo group, and the other substituent is preferably selected from the group consisting of a sulfo group, a hydroxyl group, a carboxy group and a lower alkoxy group having a sulfo group. The lower alkoxy group having a sulfo group is preferably straight chain alkoxy, and the substitution position of the sulfo group is preferably a terminal of the alkoxy group. Such a lower alkoxy group having a sulfo group is more preferably a 3-sulfopropoxy group or 4-sulfobutoxy group, and particularly preferably a 3-sulfopropoxy group. If the number of sulfo groups substituted in the naphthyl group is two, the substitution positions of the sulfo groups are preferably a combination of the 4- and 8-positions or a combination of the 6- and 8-positions of the naphthyl group, and is more preferably a combination of the 6- and 8-positions. If the number of sulfo groups substituted in the naphthyl group is three, the substitution positions of the sulfo groups are preferably a combination of the 3-, 6- and 8-positions.

In Formula (2-I) or Formula (2-II), $Rb_1$ to $Rb_5$ each independently represent a hydrogen atom, a lower alkyl group, a lower alkoxy group or a lower alkoxy group having a sulfo group. The lower alkoxy group having a sulfo group is preferably straight chain alkoxy, and the substitution position of the sulfo group is preferably a terminal of the alkoxy group. $Rb_1$ to $Rb_5$ each independently represent preferably a hydrogen atom, a methyl group, an ethyl group, a methoxy group, an ethoxy group, a 3-sulfopropoxy group or a 4-sulfobutoxy group, and particularly preferably a sulfo group, a methyl group, a methoxy group, a carboxy group or a 3-sulfopropoxy group. In particular, $Rb_5$ is preferably a methoxy group because the polarization performance of the polarizer or the polarizing plate of the present disclosure is thus remarkably improved.

In Formula (2-I) or Formula (2-II), $Xb_1$ represents an amino group, a phenylamino group, a phenylazo group, a naphthotriazole group or a benzoylamino group optionally having at least one substituent selected from the group consisting of a lower alkyl group, a lower alkoxy group, a sulfo group, an amino group, a lower alkylamino group, a hydroxyl group, a carboxy group and a carboxyethyl amino group.

If $Xb_1$ is the amino group optionally having at least one substituent, the amino group is unsubstituted, or preferably has one or two substituents selected from the group consisting of a lower alkyl group, a lower alkoxyl group, a sulfo group, an amino group and a lower alkylamino group, and more preferably has one or two substituents selected from the group consisting of a methyl group, a methoxy group, a sulfo group, an amino group and a lower alkylamino group.

If $Xb_1$ is the phenylamino group optionally having at least one substituent, the phenylamino group is unsubstituted, or preferably has one or two substituents selected from the group consisting of a lower alkyl group, a lower alkoxyl group, a sulfo group, an amino group and a lower alkylamino group, and more preferably has one or two substituents selected from the group consisting of a methyl group, a methoxy group, a sulfo group and an amino group.

If $Xb_1$ is the phenylazo group optionally having at least one substituent, the phenylazo group is unsubstituted, or preferably has one to three substituents selected from the group consisting of a hydroxyl group, a lower alkyl group, a lower alkoxy group, an amino group and a carboxyethyl amino group, and more preferably has one to three substituents selected from the group consisting of a methyl group, a methoxy group, amino and a hydroxyl group.

If $Xb_1$ is the naphthotriazole group optionally having at least one substituent, the naphthotriazole group is unsubstituted, or preferably has one or two substituents selected from the group consisting of a sulfo group, an amino group and a carboxy group, and more preferably has one or two sulfo groups as the substituent.

If $Xb_1$ is the benzoylamino group optionally having at least one substituent, the benzoylamino group is unsubstituted, or preferably has one substituent selected from the group consisting of a hydroxyl group, an amino group and a carboxyethyl amino group, and more preferably has one or two hydroxyl groups or amino groups as the substituent.

Preferably, $Xb_1$ is a benzoylamino group or a phenylamino group optionally having at least one of the aforementioned substituents, and most preferably, $Xb_1$ is a phenylamino group optionally having the substituent. If the benzoylamino group or the phenylamino group has the substituent, the position of the substituent is not especially limited, and in the phenylamino group, one of the substituents is preferably in the p-position to the amino group, and on the other hand, in the benzoylamino group, one of the substituents is preferably in the p-position to the carbonyl group.

Among azo compounds represented by Formula (2-I) and Formula (2-II), are azo compound represented by the following Formula (2') is preferred, and if such the azo compound is used, the polarization performance of the resultant polarizer can be further improved.

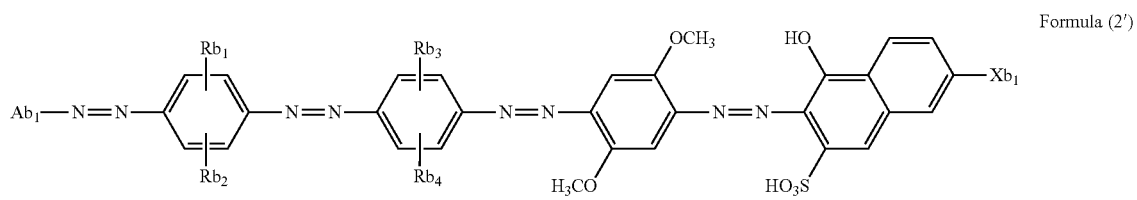

Formula (2')

In Formula (2'), $Ab_1$, $Rb_1$ to $Rb_4$ and $Xb_1$ are the same as defined in Formula (2-I) or Formula (2-II) above.

Among azo compounds represented by Formula (2), an azo compound represented by the following Formula (2") is preferred, and if such an azo compound is used, the polarization performance of the resultant polarizer can be further more improved.

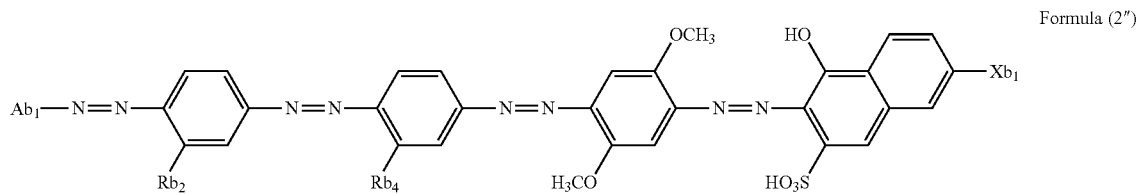

Formula (2")

In Formula (2″), $Ab_1$, $Rb_2$, $Rb_4$ and $Xb_1$ are the same as defined in Formula (2-I) or Formula (2-II) above.

The azo compound represented by Formula (2-I) or (2-II) can be produced by, for example, a method(s) described in International Publication No. WO2012/108169, International Publication No. WO2012/108173 or the like, but the production method is not limited to these.

Specific examples of the azo compound represented by Formula (2-I) or (2-II) include the following azo compounds described in, for example, International Publication No. WO2012/108169 and International Publication No. WO2012/108173.

[Compound Example 2-1]

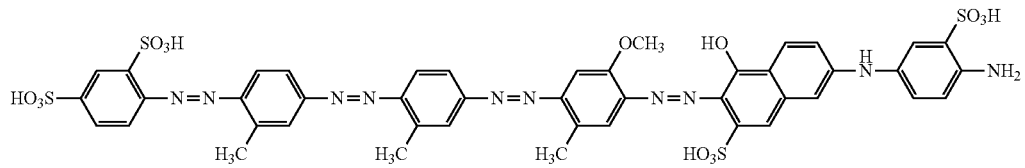

[Compound Example 2-2]

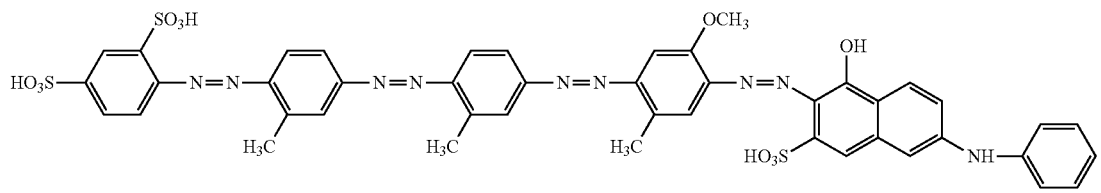

[Compound Example 2-3]

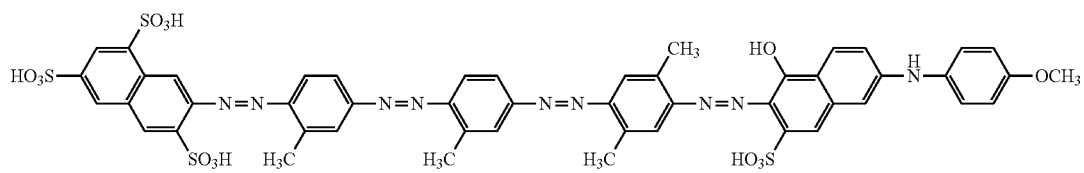

[Compound Example 2-4]

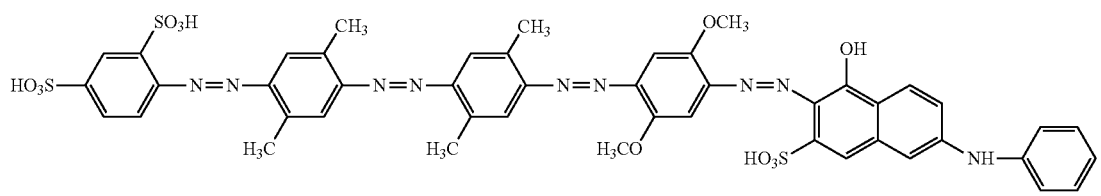

[Compound Example 2-5]

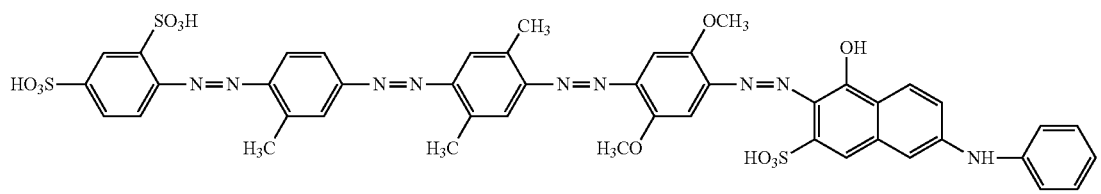

[Compound Example 2-6]

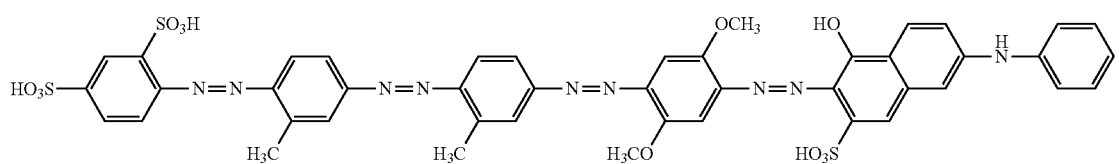

[Compound Example 2-7]

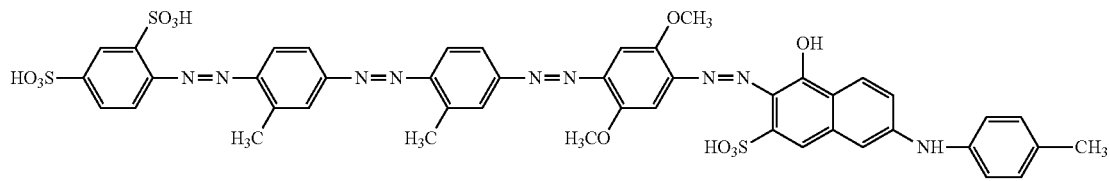

-continued
[Compound Example 2-8]
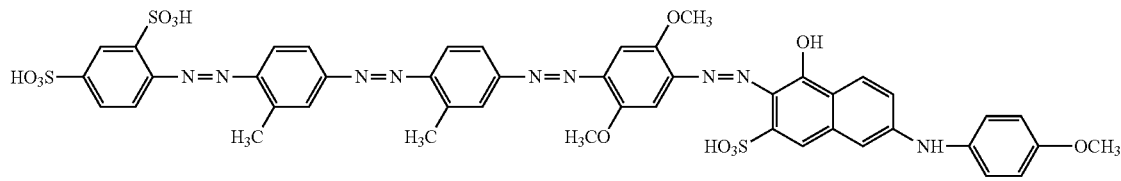
[Compound Example 2-9]
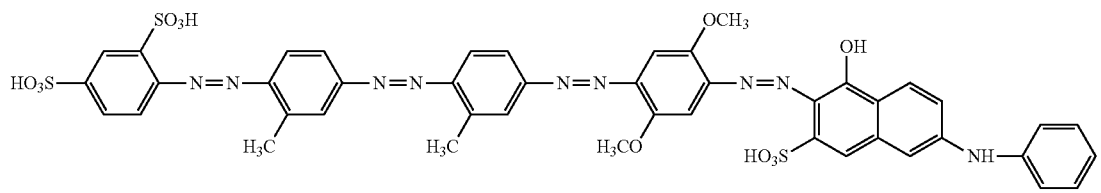
[Compound Example 2-10]
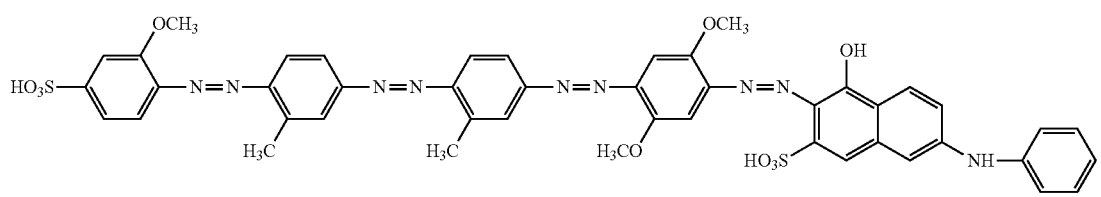
[Compound Example 2-11]
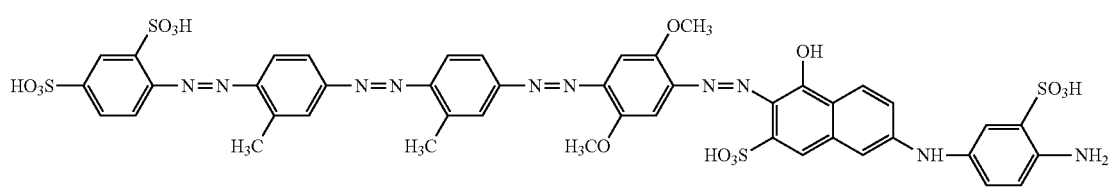
[Compound Example 2-12]
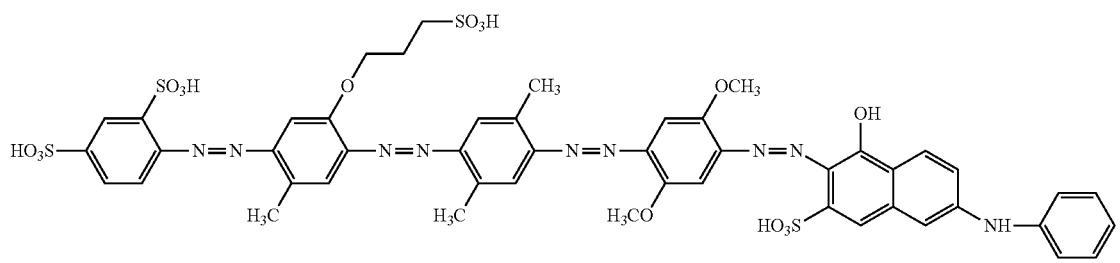
[Compound Example 2-13]
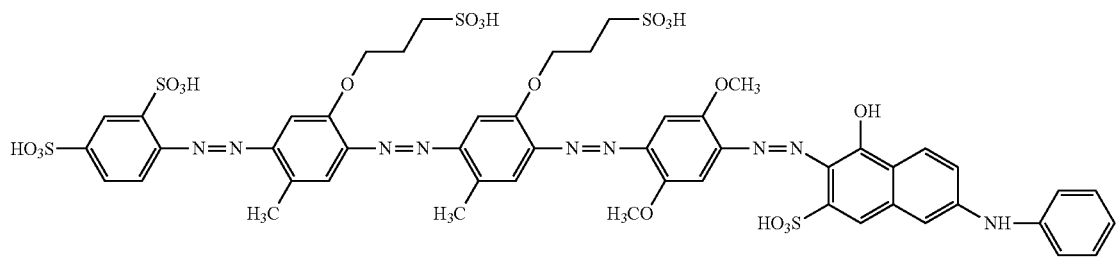
[Compound Example 2-14]
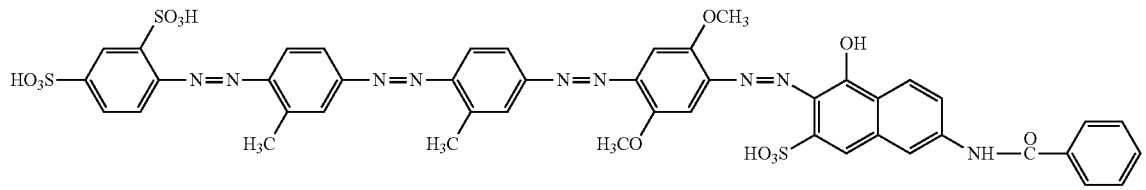

-continued
[Compound Example 2-15]
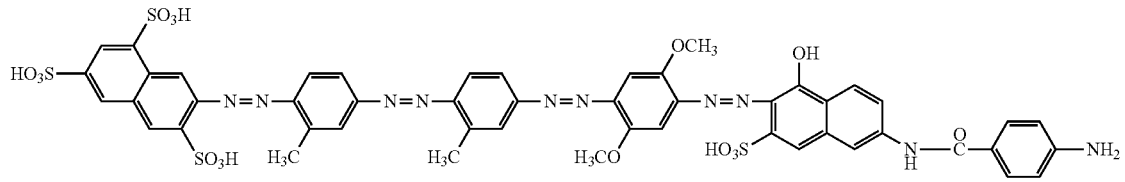
[Compound Example 2-16]
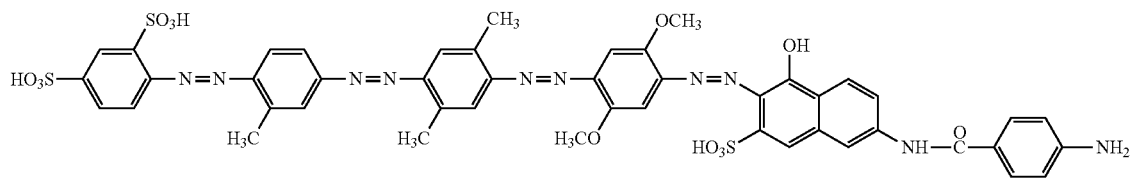
[Compound Example 2-17]
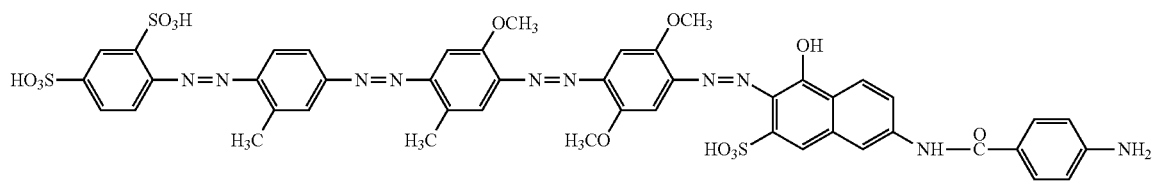
[Compound Example 2-18]
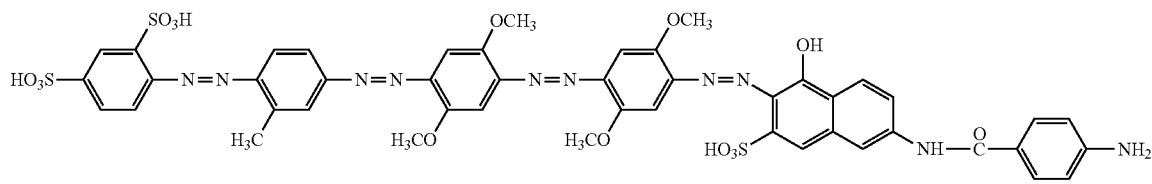
[Compound Example 2-19]
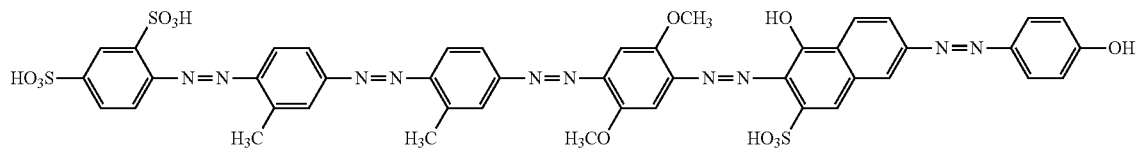
[Compound Example 2-20]
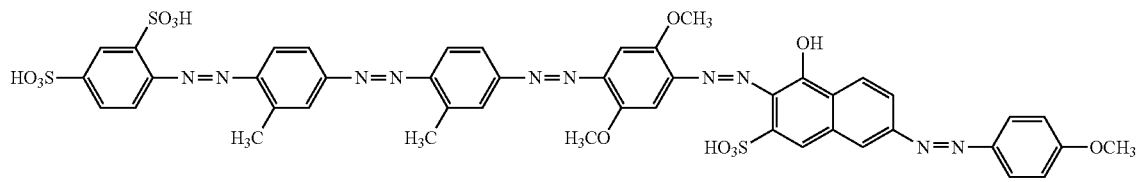
[Compound Example 2-21]
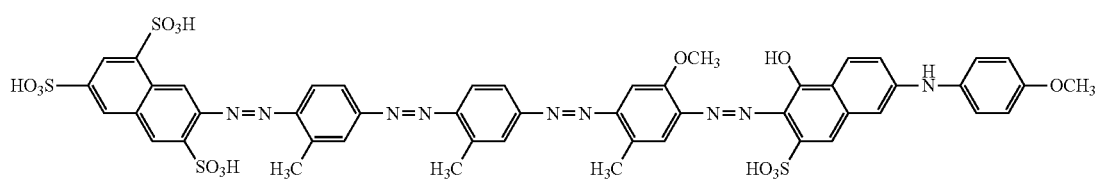

[Compound Example 2-22]
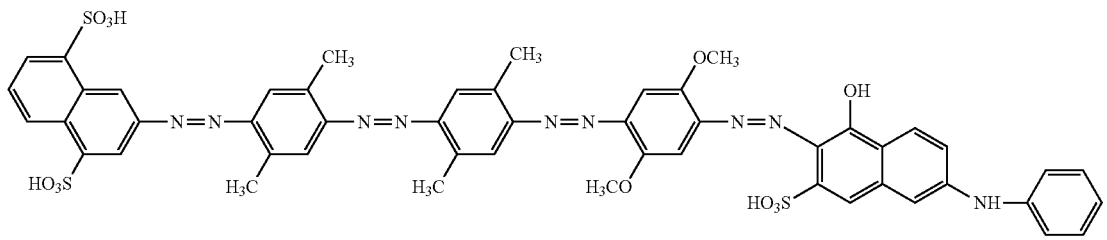
[Compound Example 2-23]
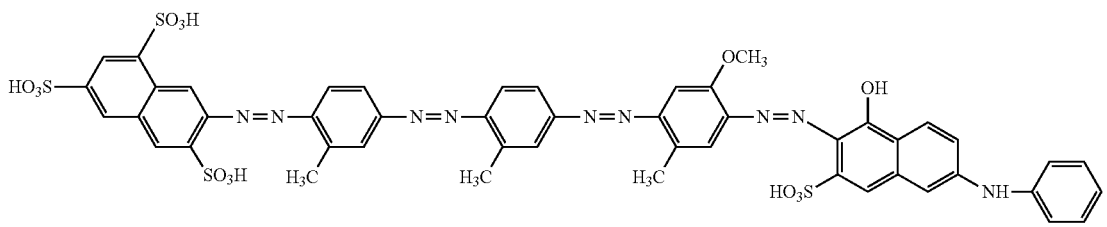
[Compound Example 2-24]
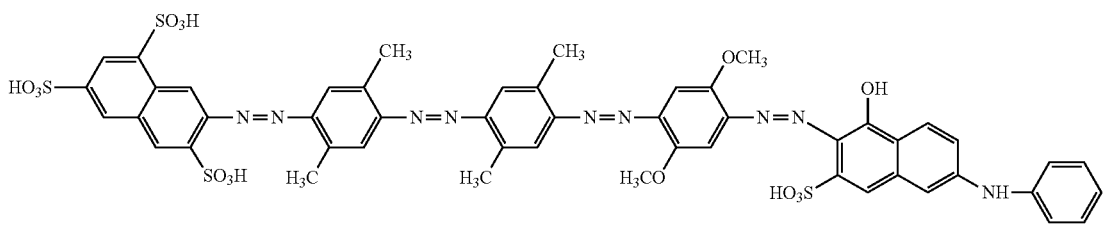
[Compound Example 2-25]
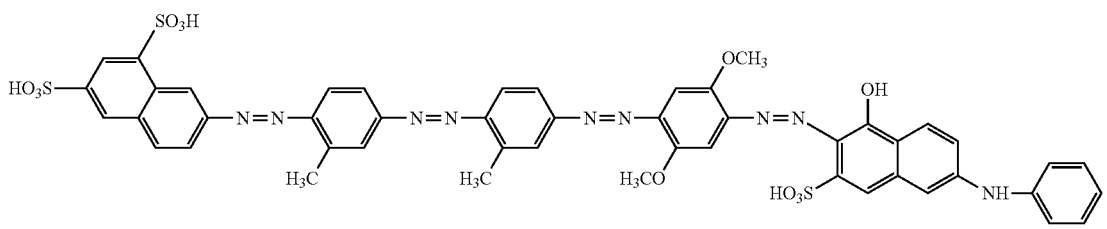
[Compound Example 2-26]
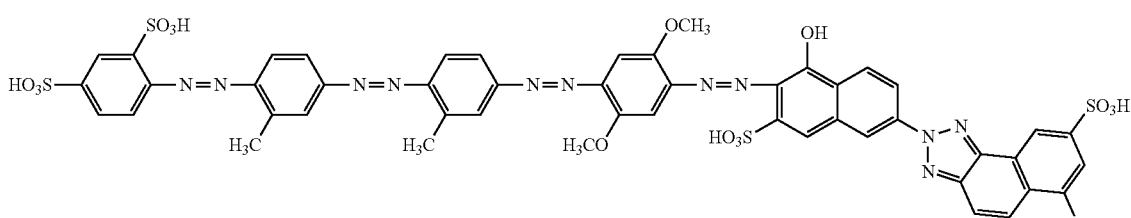
[Compound Example 2-27]
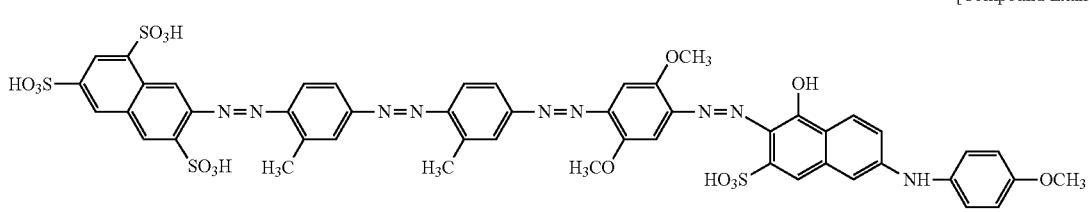

[Compound Example 2-28]
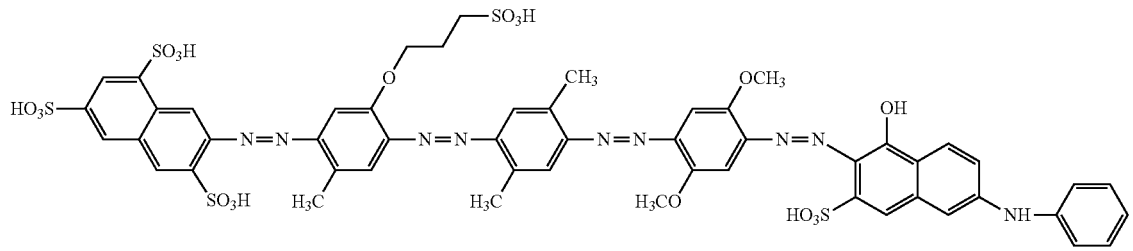
[Compound Example 2-29]
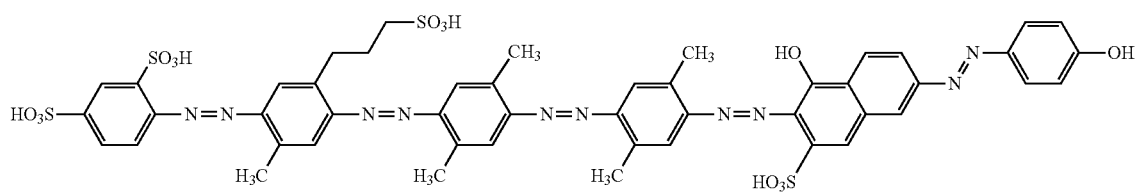
[Compound Example 2-30]
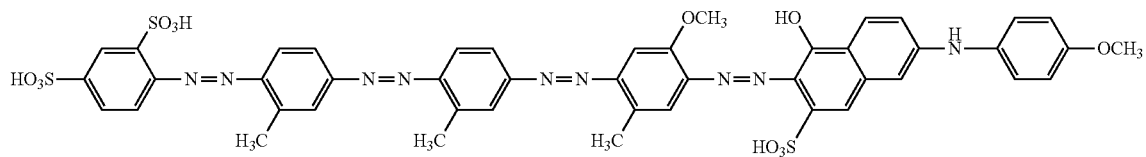
[Compound Example 2-31]
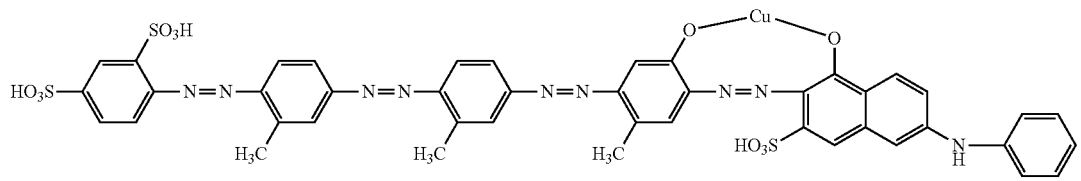
[Compound Example 2-32]
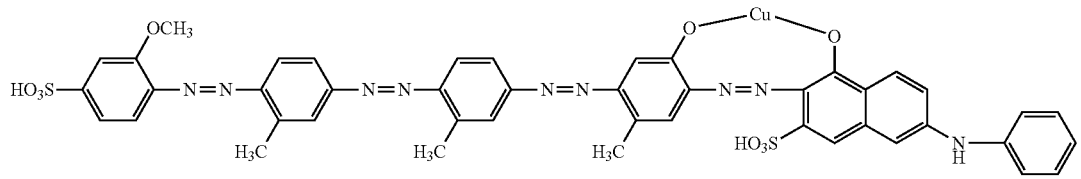
[Compound Example 2-33]
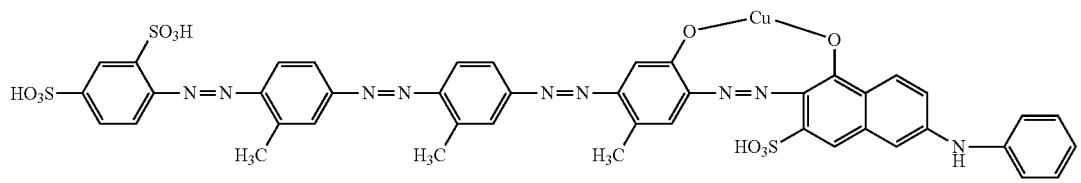
[Compound Example 2-34]
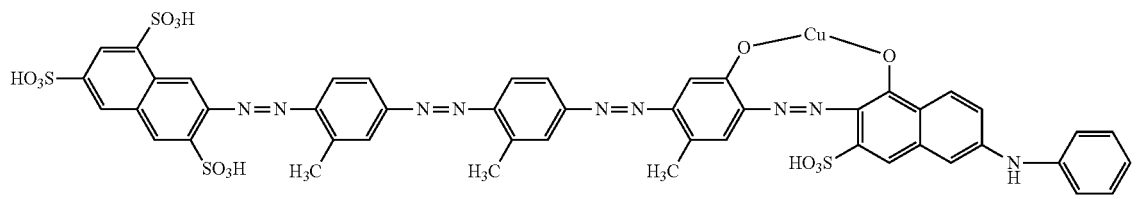

-continued
[Compound Example 2-35]
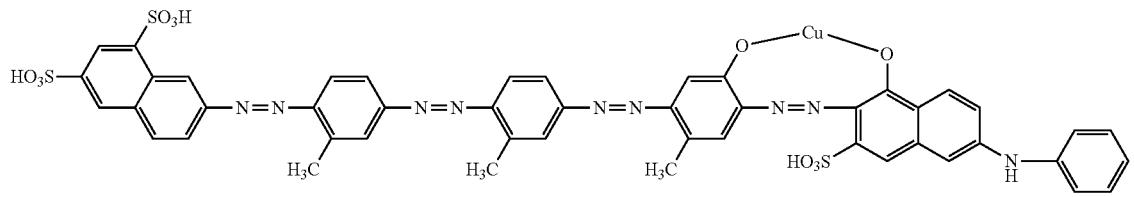
[Compound Example 2-36]
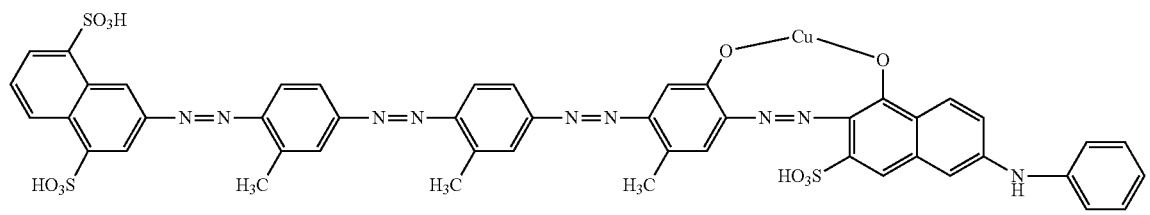
[Compound Example 2-37]
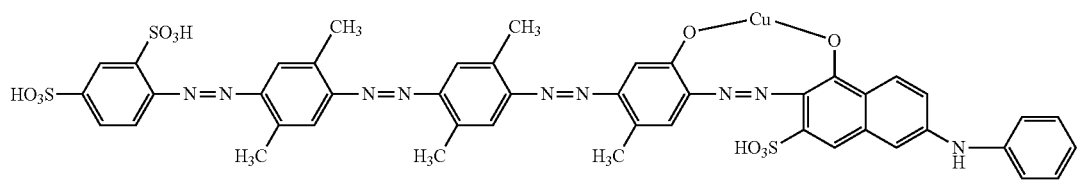
[Compound Example 2-38]
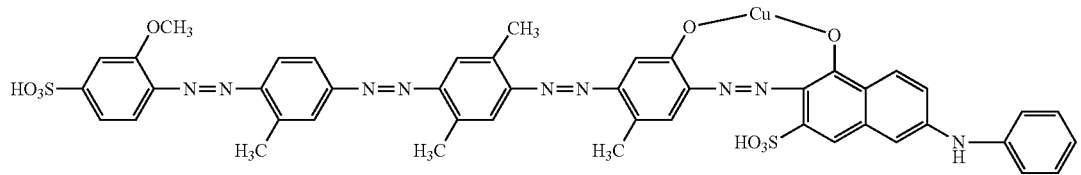
[Compound Example 2-39]
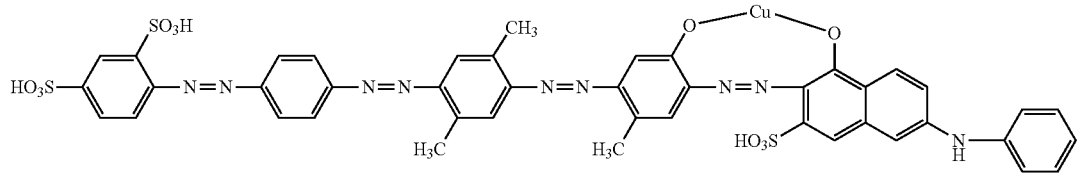
[Compound Example 2-40]
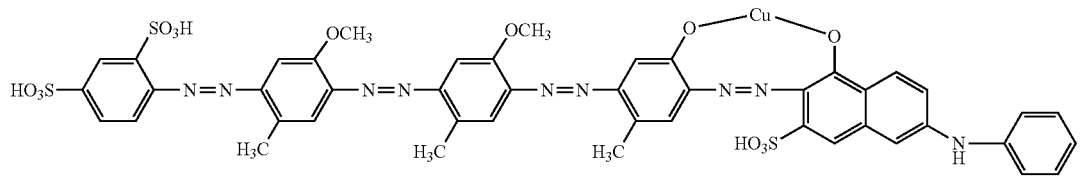
[Compound Example 2-41]
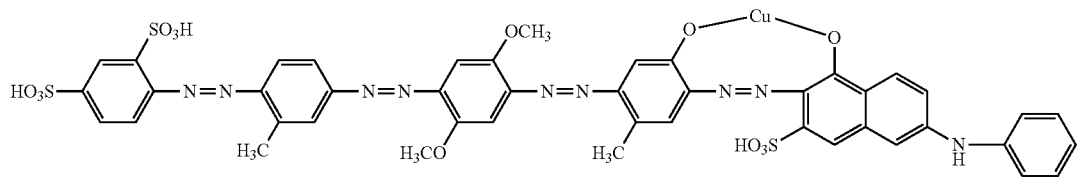

-continued
[Compound Example 2-42]
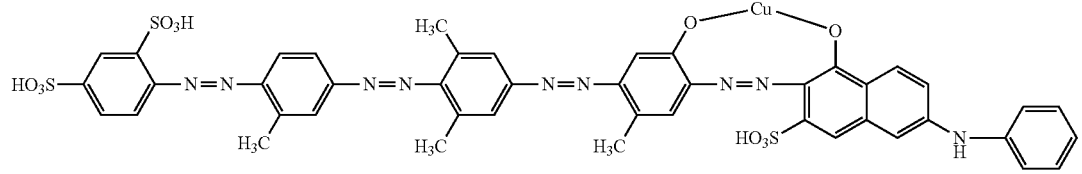
[Compound Example 2-43]
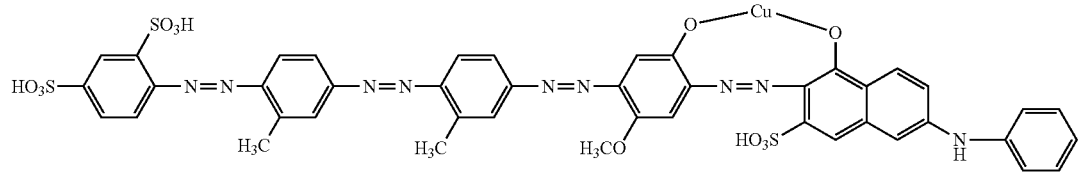
[Compound Example 2-44]
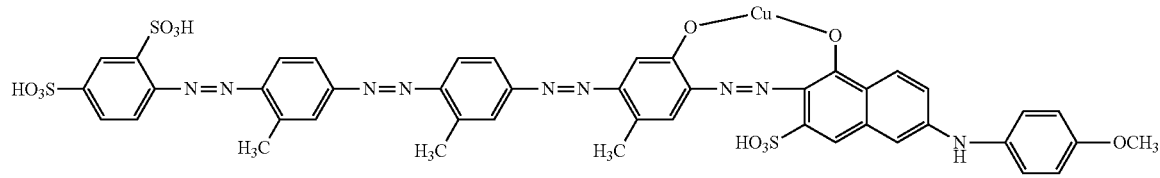
[Compound Example 2-45]
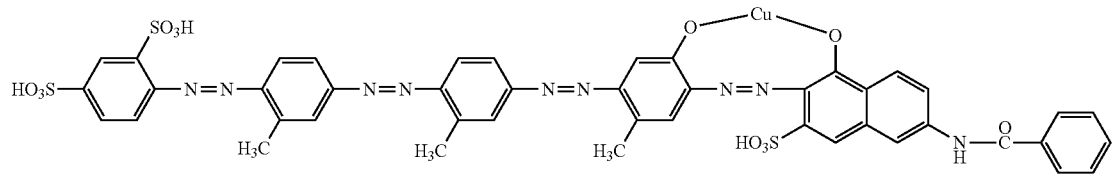
[Compound Example 2-46]
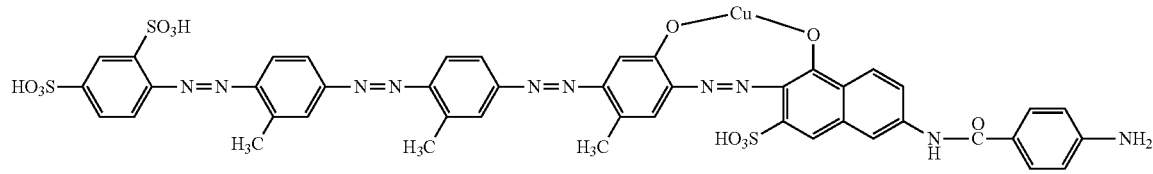
[Compound Example 2-47]
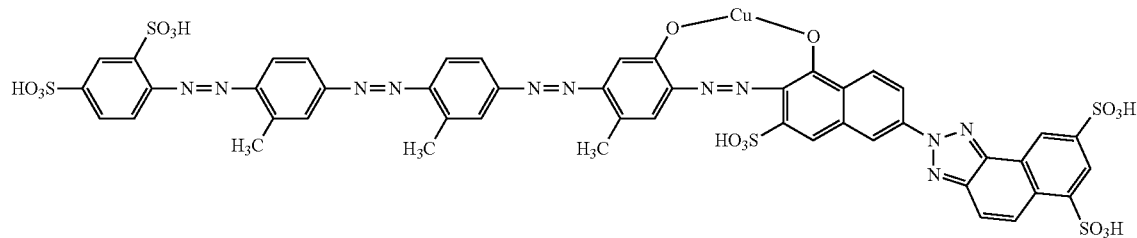
[Compound Example 2-48]
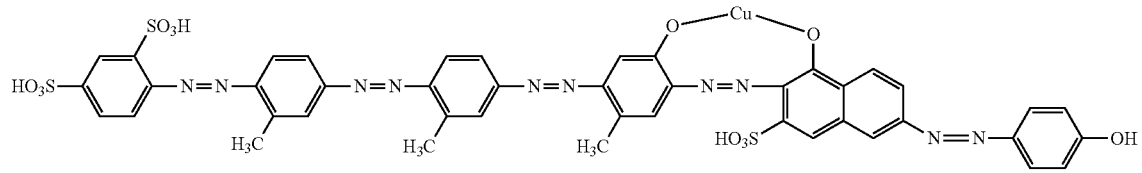

The azo compound represented by Formula (3) has the following structural Formula:

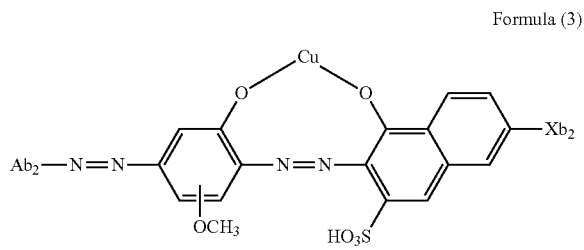

Formula (3)

In Formula (3), $Ab_2$ represents a phenyl group or a naphthyl group having at least one substituent of a sulfo group or a carboxy group; and $Xb_2$ represents a phenylamino group, a phenylazo group, a naphthotriazole group or a benzoylamino group optionally having at least one substituent selected from the group consisting of a lower alkyl, a lower alkoxy group, a hydroxyl group, a carboxy group, a sulfo group, an amino group and a substituted amino group.

As described above, in Formula (3), $Ab_2$ represents a phenyl group or a naphthyl group having at least one substituent of a sulfo group or a carboxy group. If the phenyl group or the naphthyl group has at least two substituents, at least one of the substituents is a sulfo group or a carboxy group, and the other substituent is preferably selected from the group consisting of a sulfo group, a lower alkyl group, a lower alkoxy group, a lower alkoxy group having a sulfo group, a carboxy group, a nitro group, an amino group and a substituted amino group, and is more preferably selected from the group consisting of a sulfo group, a methyl group, an ethyl group, a methoxy group, an ethoxy group, a carboxy group, a nitro group and an amino group, and is particularly preferably selected from the group consisting of a sulfo group, a carboxy group, a lower alkyl group and a lower alkoxy group. The lower alkoxy group having a sulfo group is preferably a straight chain alkoxy group, and the substitution position of the sulfo group is preferably a terminal of the alkoxy group. Such a lower alkoxy group having a sulfo group is more preferably a 3-sulfopropoxy group or 4-sulfobutoxy group, and particularly preferably a 3-sulfopropoxy group. The number of substituents of the phenyl group is preferably one or two, and on the other hand, the number of substituents of the naphthyl group is preferably two or three. The positions of these substituents are not especially limited, and if the number of substituents of the phenyl group is one, the position is preferably the 4-position of the phenyl group, and if the number of substituents is two, the positions are preferably a combination of the 2- and 4-positions or a combination of the 3- and 5-positions of the phenyl group. On the other hand, the naphthyl group preferably has two or three sulfo groups as the substituents, and if the number of sulfo groups substituted in the naphthyl group is two, the substitution positions of the sulfo groups are preferably a combination of the 4- and 8-positions or a combination of the 6- and 8-positions of the naphthyl group, and is more preferably a combination of the 6- and 8-positions. If the number of sulfo groups substituted in the naphthyl group is three, the substitution positions of the sulfo groups are preferably a combination of the 3-, 6- and 8-positions.

In Formula (3), $Xb_2$ represents a phenylamino group, a phenylazo group, a naphthotriazole group or a benzoylamino group optionally having at least one substituent selected from the group consisting of a lower alkyl group, a lower alkoxy group, a hydroxyl group, a carboxy group, a sulfo group, an amino group and a substituted amino group.

If $Xb_2$ is the phenylamino group optionally having at least one substituent, the phenylamino group is unsubstituted, or preferably has at least one substituent selected from the group consisting of a methyl group, a methoxy group, an amino group, a substituted amino group and sulfo group, and more preferably is unsubstituted or has a methoxy group as the substituent. If the phenylamino group has the substituent, the position of the substituent is not especially limited, and one of the substituents is preferably in the p-position to the amino group bonded to the phenyl group.

If $Xb_2$ is the benzoylamino group optionally having at least one substituent, the benzoylamino group is unsubstituted, or preferably has at least one substituent selected from the group consisting of an amino group, a substituted amino group and a hydroxyl group, and more preferably has an amino group as the substituent. If the benzoylamino group has the substituent, the position of the substituent is not especially limited, and one of the substituents is preferably in the p-position to the carbonyl group bonded to the phenyl group.

If $Xb_2$ is the phenylazo group optionally having at least one substituent, the phenylazo group is unsubstituted, or preferably has at least one substituent selected from the group consisting of a hydroxyl group, an amino group, a methyl group, a methoxy group and a carboxy group, and more preferably has a hydroxyl group as the substituent If $Xb_2$ is the naphthotriazole group optionally having at least one substituent, the naphthotriazole group is unsubstituted, or preferably has a sulfo group as the substituent.

Among azo compounds represented by Formula (3), an azo compound represented by the following Formula (3') is preferred, and if such the azo compound is used, the polarization performance of the resultant polarizer can be further unproved.

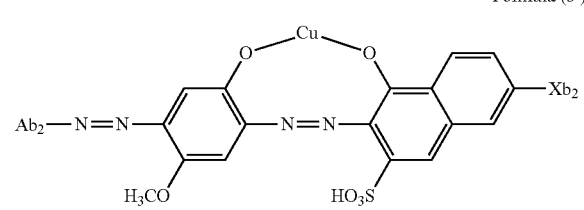

Formula (3')

In Formula (3'), $Ab_2$ and $Xb_2$ are the same as defined in Formula (3) above.

The azo compound represented by Formula (3) can be produced by known diazotization and coupling as those described in, for example, Japanese Patent Publication No. 64-5623, Japanese Patent No. 4033443, Japanese Patent No. 2985408, Japanese Patent No. 3378296 and International Publication No. WO2007/145210, but the production method is not limited to these.

Specific examples of the azo compound represented by Formula (3) include the following azo compounds:
[Compound Example 3-1]
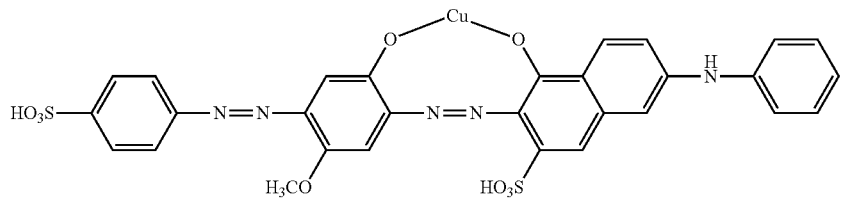
[Compound Example 3-2]
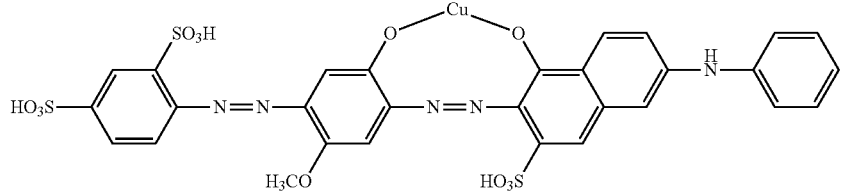
[Compound Example 3-3]
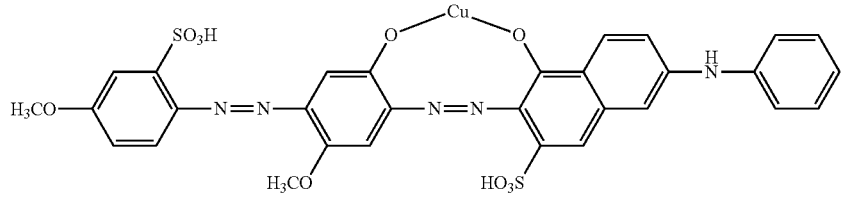
[Compound Example 3-4]
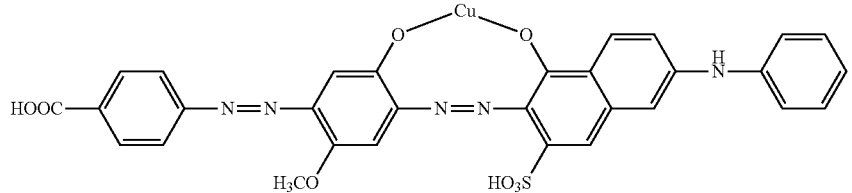
[Compound Example 3-5]
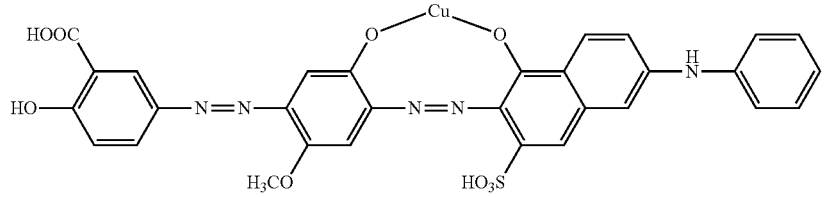
[Compound Example 3-6]
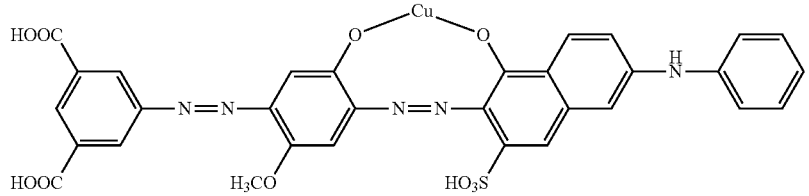
[Compound Example 3-7]
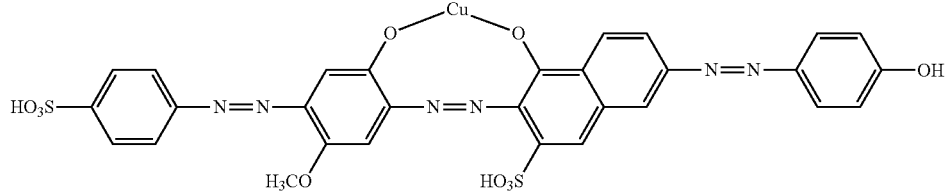

[Compound Example 3-8]
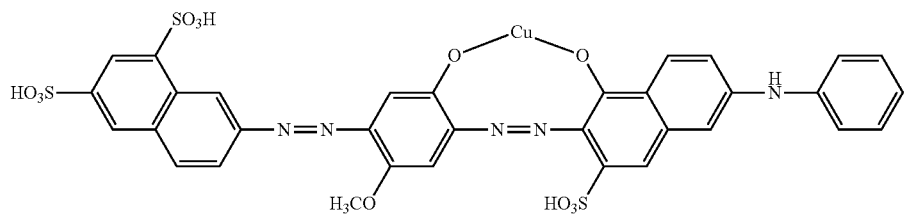
[Compound Example 3-9]
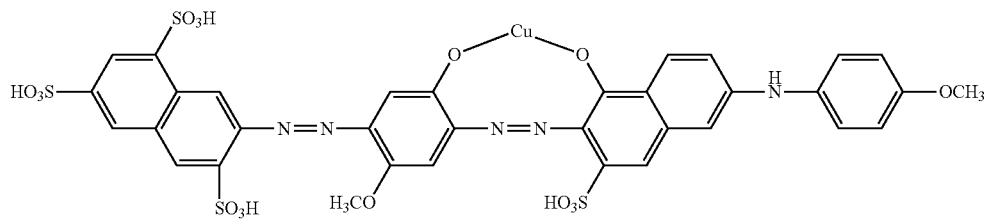
[Compound Example 3-10]
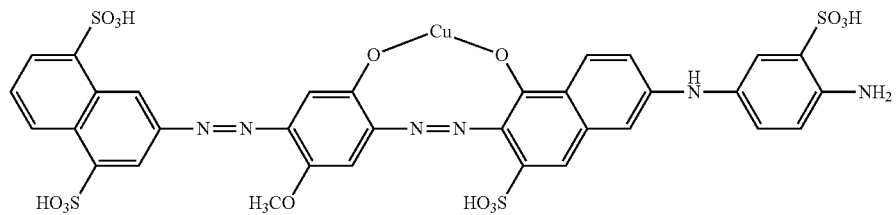
[Compound Example 3-11]
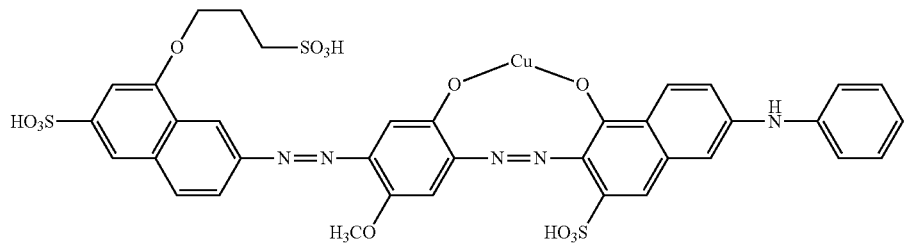
[Compound Example 3-12]
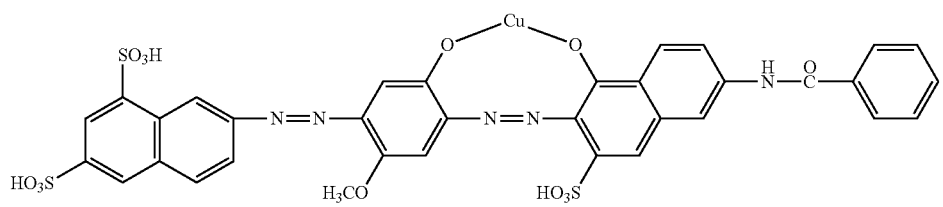
[Compound Example 3-13]
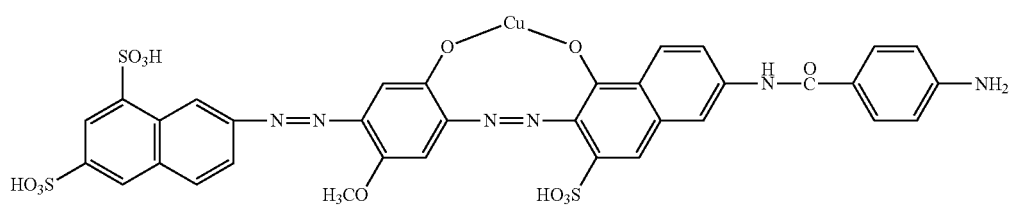
[Compound Example 3-14]
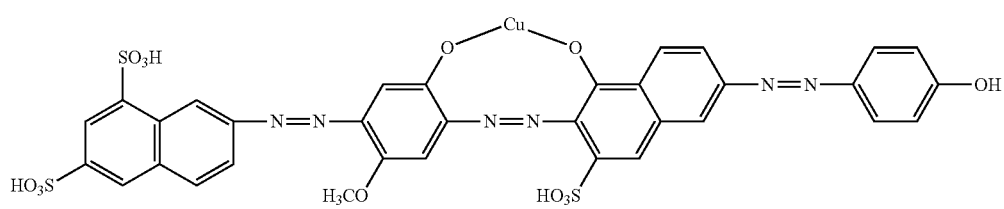

[Compound Example 3-15]

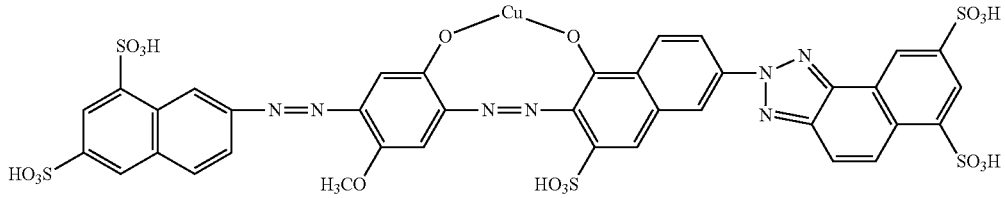

The azo compound represented by Formula (4-I) or Formula (4-II) has the following structural Formula. It is noted that the azo compound represented by Formula (4-II) has the same structure as the azo compound represented by Formula (4-I) except that O of an —OCH₃ group and O of an —OH group are bonded to each other via copper (Cu).

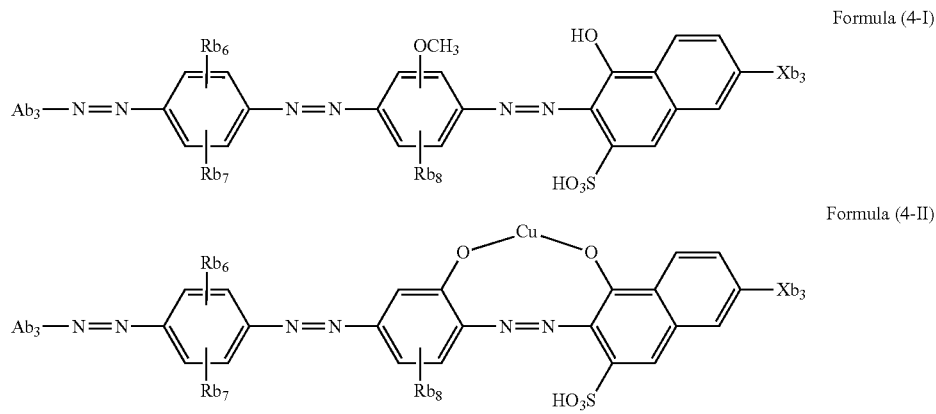

Formula (4-I)

Formula (4-II)

In Formula (4-I) and Formula (4-II), $Ab_3$ represents a phenyl group or a naphthyl group having at least one substituent of a sulfo group or a carboxy group;
$Rb_6$ to $Rb_8$ each independently represent a hydrogen atom, a lower alkyl group, a lower alkoxy group or a lower alkoxyl group having a sulfo group; and
$Xb_3$ represents an amino group, a phenylamino group, a phenylazo group, a benzoyl group, a benzoylamino group or a naphthotriazole group optionally having at least one substituent selected from the group consisting of a lower alkyl group, a lower alkoxy group, a hydroxyl group, a carboxy group, a sulfo group, an amino group, a substituted amino group and an aminonaphthyl group.

As described above, in Formula (4-I) or Formula (4-II), $Ab_3$ represents a phenyl group or a naphthyl group having at least one sulfo group or carboxy group. If the phenyl group or the naphthyl group has at least two substituents, at least one of the substituents is a sulfo group or a carboxy group, and the other substituent is preferably selected from the group consisting of a sulfo group, a lower alkyl group, a lower alkoxy group, a lower alkoxy group having a sulfo group, a carboxy group, a nitro group, an amino group and a substituted amino group, and is more preferably selected from the group consisting of a sulfo group, a methyl group, an ethyl group, a methoxy group, an ethoxy group, a carboxy group, a nitro group and an amino group, and is particularly preferably selected from the group consisting of a sulfo group, a carboxy group, a methyl group, a methoxy group and a nitro group. The lower alkoxy group having a sulfo group is preferably a straight chain alkoxy, and the substitution position of the sulfo group is preferably a terminal of the alkoxy group. Such a lower alkoxy group having a sulfo group is more preferably a 3-sulfopropoxy group or 4-sulfobutoxy group, and particularly preferably a 3-sulfopropoxy group. The number of substituents of the phenyl group is preferably one or two, and on the other hand, the number of substituents of the naphthyl group is preferably two or three. The positions of these substituents are not especially limited, and if the number of substituents of the phenyl group is one, the position is preferably the 4-position of the phenyl group, and if the number of substituents is two, the positions are preferably a combination of the 2- and the 4-positions or a combination of the 3- and 5-positions of the phenyl group. On the other hand, the naphthyl group preferably has two or three sulfo groups as the substituents, and if the number of sulfo groups substituted in the naphthyl group is two, the substitution positions of the sulfo groups are preferably a combination of the 4- and 8-positions or a combination of the 6- and 8-positions of the naphthyl group, and is more preferably a combination of the 6- and 8-positions. If the number of sulfo groups substituted in the naphthyl group is three, the substitution positions of the sulfo groups are preferably a combination of the 3-, 6- and 8-positions.

In Formula (4-I) or Formula (4-II), $Rb_6$ to Rb8 each independently represent a hydrogen atom, a lower alkyl group, a lower alkoxy group or a lower alkoxy group having a sulfa group. The lower alkoxy group having a sulfo group is preferably a straight chain alkoxy such as an ethoxy group having a sulfo group, a propoxyl group having a sulfo group or a butoxy group having a sulfo group. Besides, the substitution position of the sulfo group is preferably a terminal of the alkoxy group, and the lower alkoxy group having a sulfo group is preferably a 3-sulfopropoxy group or 4-sulfobutoxy group, and particularly preferably a 3-sulfopropoxy group. In order to further improve the polarization property, each of $Rb_6$ to $Rb_8$ is preferably a hydrogen atom, a methyl group, a methoxy group or a 3-sulfopropoxy group, and is more preferably a hydrogen atom, a methyl group or a methoxy group. In order to much more improve the polarization property, $Rb_3$ is further preferably a methyl group or a methoxy group, and particularly preferably a methoxy group. The substitution positions of the phenyl groups substituted for $Rb_6$ to $Rb_8$ are preferably a combination of the 2- and 5-positions or the 3- and 6-positions of the phenyl group. Incidentally, with respect to $Rb_8$, in terms of a relationship between $OCH_3$ and $Rb_8$, they are respectively substituted in the 2- and 5-positions or the 3- and 6-positions of the phenyl group.

In Formula (4-I) or Formula (4-II), $Xb_3$ represents an amino group, a phenylamino group, a phenylazo group, a benzoyl group, a benzoylamino group or a naphthotriazole group optionally having at least one substituent selected from the group consisting of a lower alkyl group, a lower alkoxy group, a hydroxyl group, a carboxy group, a sulfo group, an amino group, a substituted amino group and an aminonaphthyl group.

If $Xb_3$ is the amino group optionally having at least one substituent, the amino group is unsubstituted, or preferably has at least one substituent selected from the group consisting of a lower alkyl group, a lower alkoxy group, a carboxy group, a sulfo group, a substituted amino group and an aminonaphthyl group, and more preferably has at least one substituent selected from the group consisting of a methyl group, an ethyl group, a methoxy group and an ethoxy group.

$Xb_3$ is the phenylamino group optionally having at least one substituent, the phenylamino group is unsubstituted, or preferably has at least one substituent selected from the group consisting of a methyl group, a methoxy group, an amino group, a substituted amino group and a sulfo group, more preferably has at least one substituent selected from the group consisting of a hydrogen atom, a methoxy group, a sulfo group and an amino group, and particularly preferably has a methoxy group as the substituent. If the phenylamino group has the substituent, the position of the substituent is not especially limited, and one of the substituents is preferably in the p-position to the amino group bonded to the phenyl group.

If $Xb_3$ is the phenylazo group optionally having at least one substituent, the phenylazo group is unsubstituted, or preferably has at least one substituent selected from the group consisting of a hydroxyl group, an amino group, a methyl group, a methoxy group and a carboxy group, and particularly preferably has a hydroxyl group or an amino group as the substituent.

If $Xb_3$ is the benzoyl group or the benzoylamino group optionally having at least one substituent, the benzoyl group or the benzoylamino group is unsubstituted, or preferably has at least one substituent selected from the group consisting of an amino group, a substituted amino group and a hydroxyl group, and particularly preferably has an amino group as the substituent. If the benzoyl group or the benzoylamino group has the substituent, the position of the substituent is not especially limited, and one of the substituents is preferably in the p-position to the carbonyl group bonded to the phenyl group.

If $Xb_3$ is the naphthotriazole group optionally having at least one substituent, the naphthotriazole group is unsubstituted, or preferably has one, two or three sulfo groups as the substituent.

Among azo compounds represented by Formula (4-I), an azo compound represented by the following Formula (4') is preferred. If the azo compound represented by Formula (4') is used, the polarization performance of the resultant polarizer can be further improved.

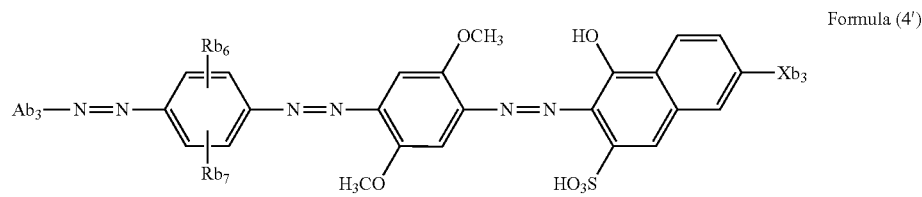

Formula (4')

In Formula (4'), $Ab_3$, $Rb_6$, $Rb_7$ and $Xb_3$ are the same as defined in Formula (4-I) above.

Among the azo compounds represented by Formula (4-I) or Formula (4-II), when the azo compound represented by Formula (4-II) in particular is used, the polarization performance can be further more improved.

The azo compound represented by Formula (4-I) or Formula (4-II) can be produced by any of known methods described in, for example, Japanese Laid-Open Patent Publication No. 3-12606, Japanese Laid-Open Patent Publication No. 5-295281, Japanese Laid-Open Patent Publication No. 10-259311, International Publication No. WO2007/145210 and the like, but the production method is not limited to these.
Specific examples of the azo compound represented by Formula (4-I) or Formula (4-II) include the following azo compounds:
[Compound Example 4-1]
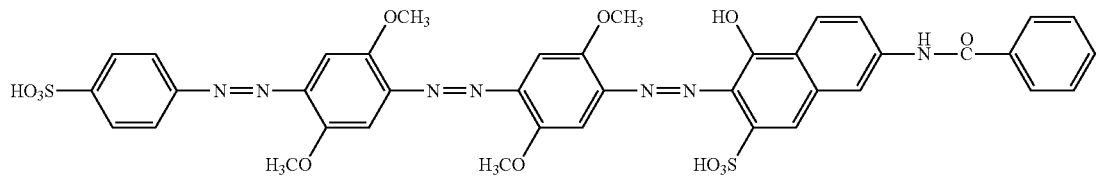
[Compound Example 4-2]
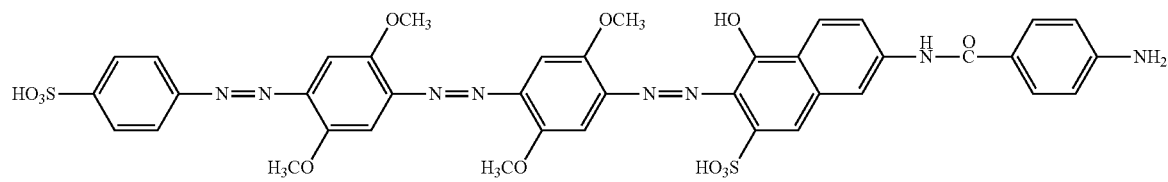
[Compound Example 4-3]
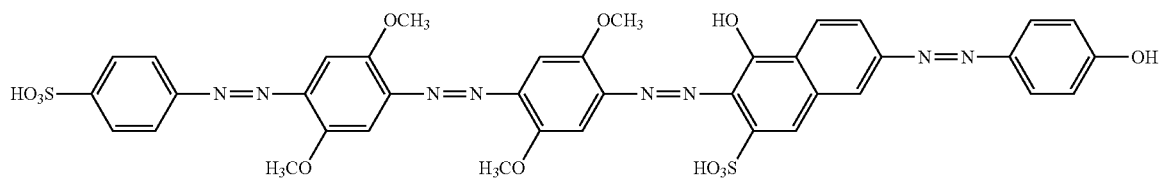
[Compound Example 4-4]
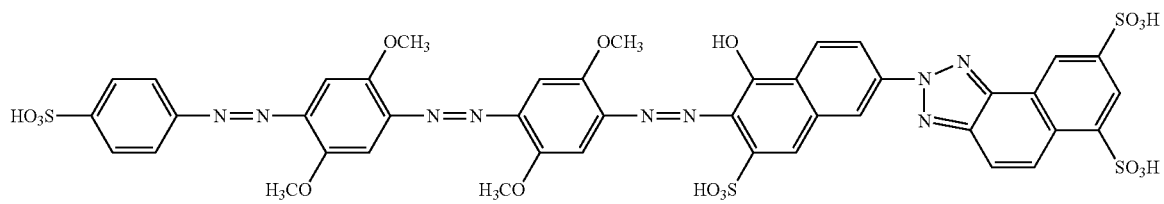
[Compound Example 4-5]
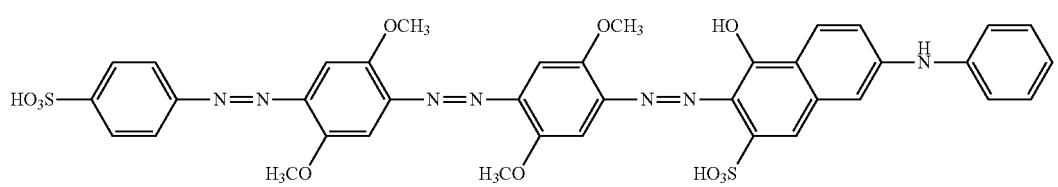
[Compound Example 4-6]
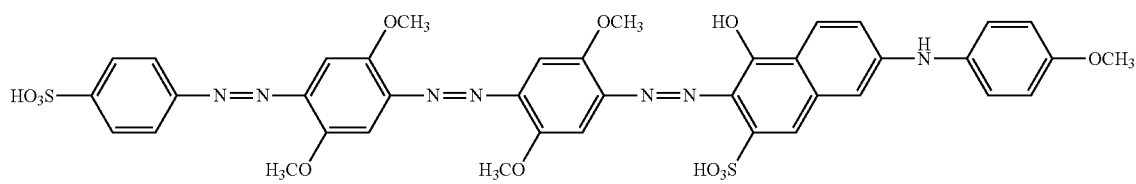
[Compound Example 4-7]
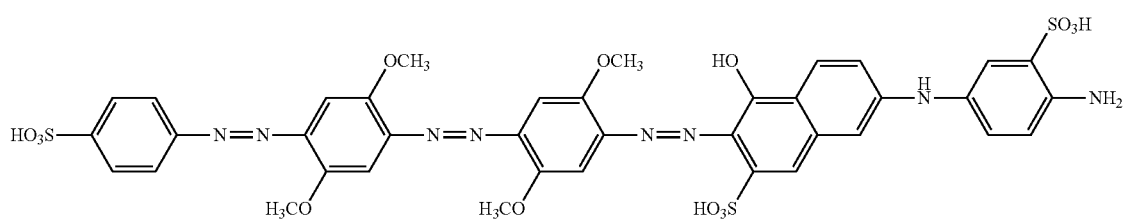

[Compound Example 4-8]
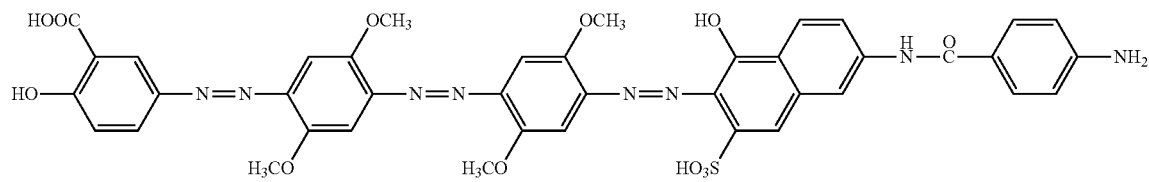
[Compound Example 4-9]
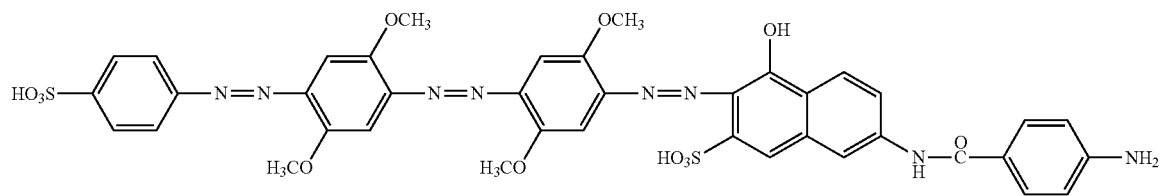
[Compound Example 4-10]
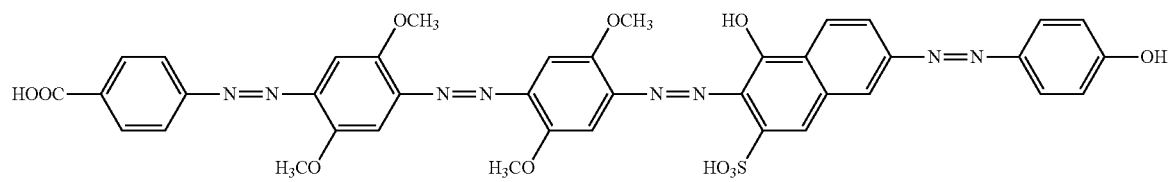
[Compound Example 4-11]
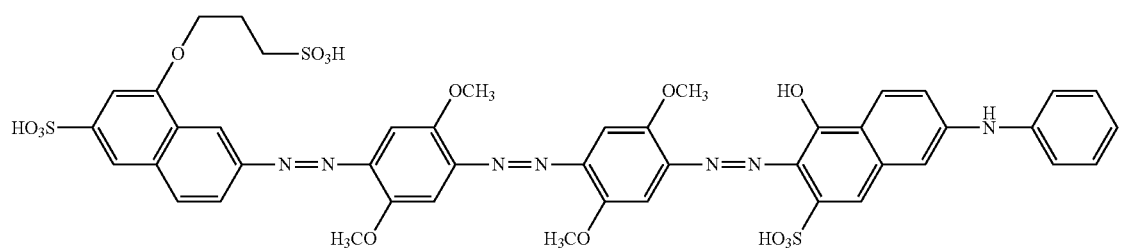
[Compound Example 4-12]
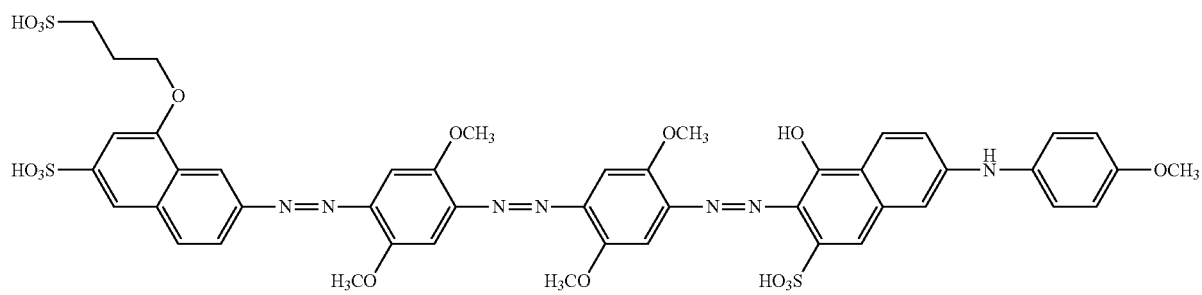
[Compound Example 4-13]
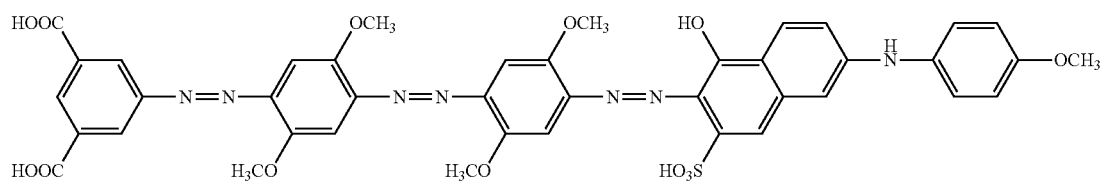

-continued
[Compound Example 4-14]
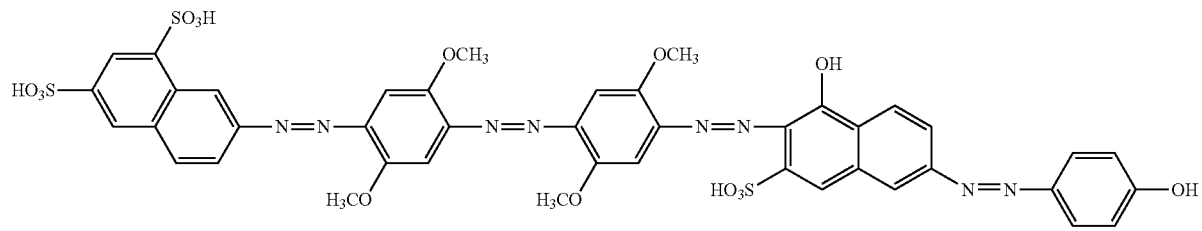
[Compound Example 4-15]
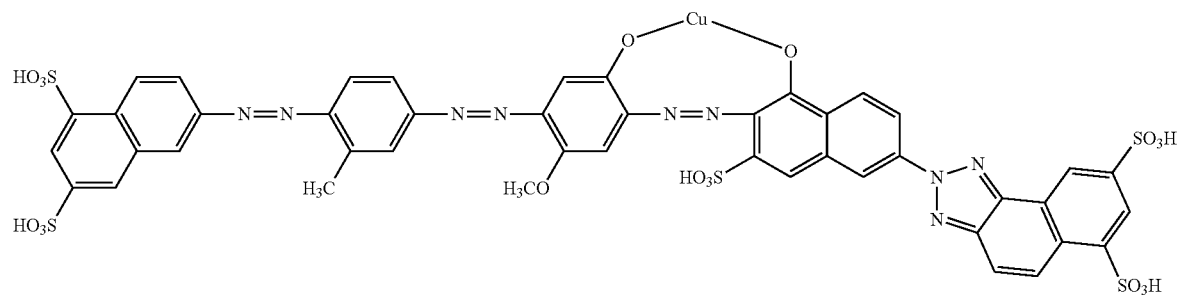
[Compound Example 4-16]
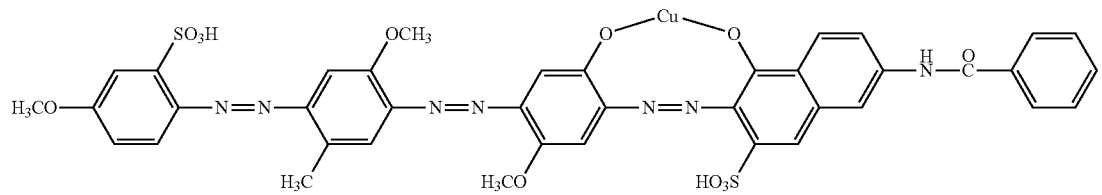
[Compound Example 4-17]
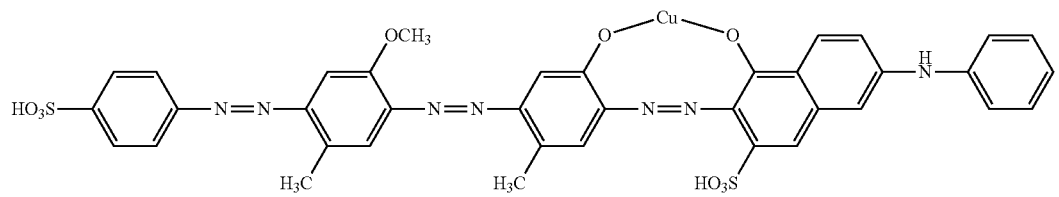
[Compound Example 4-18]
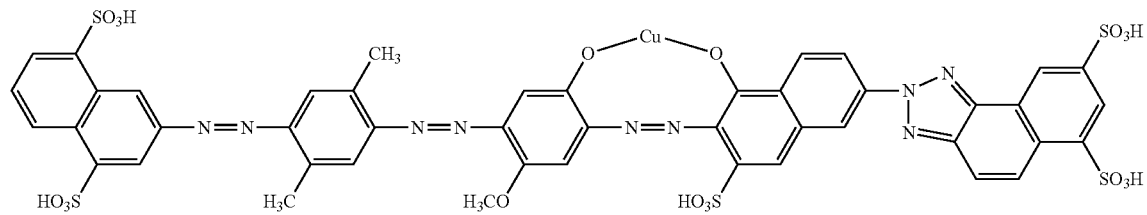
[Compound Example 4-19]
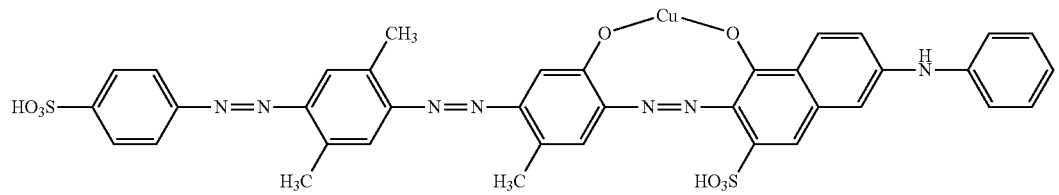

[Compound Example 4-20]

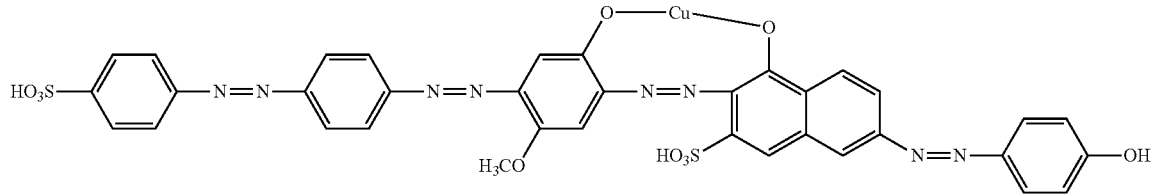

[Compound Example 4-21]

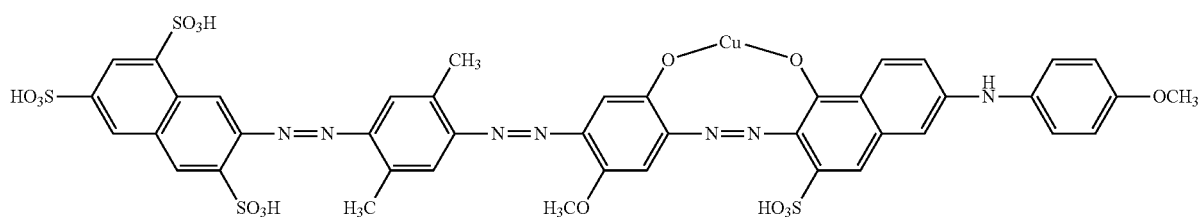

[Compound Example 4-22]

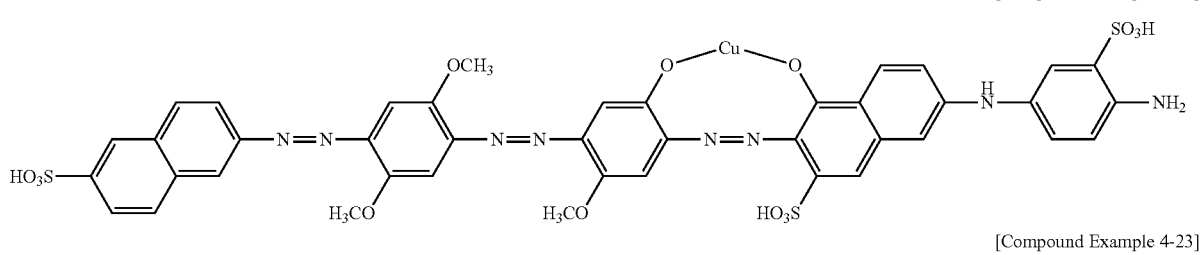

[Compound Example 4-23]

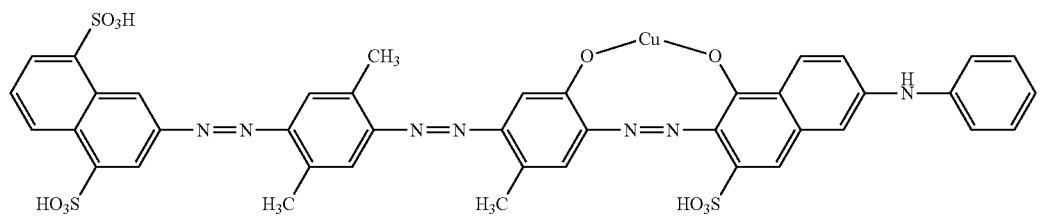

The azo compound represented by Formula (5-I) or Formula (5-II) has the following structural Formula. It is noted that the azo compound represented by Formula (5-II) has the same structure as the azo compound represented by Formula (5-I) except that O of a $Rg_1$ group and O of an —OH group are bonded to each other via copper (Cu).

Formula (5-I)

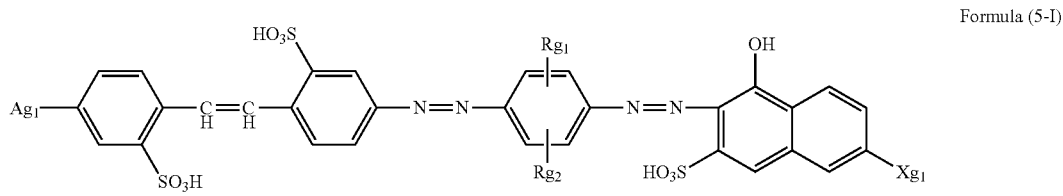

Formula (5-II)

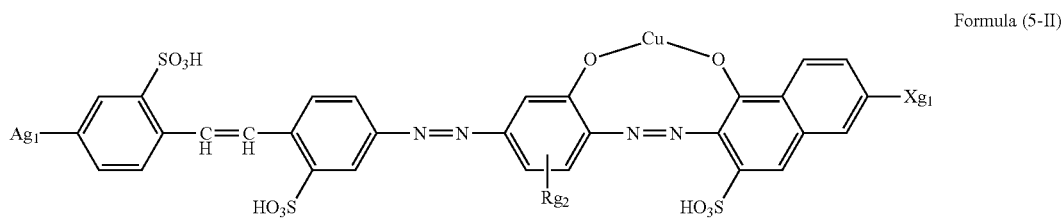

In Formula (5-I) or Formula (5-II), $Ag_1$ represents a nitro group or an amino group.

$Xg_1$ represents: an amino group optionally having at least one substituent selected from the group consisting of a lower alkyl group, a lower alkoxy group and a sulfo group;

a benzoyl group or a benzoylamino group optionally having at least one substituent selected from the group consisting of a lower alkyl group, a lower alkoxy group, a sulfo group, an amino group and a substituted amino group;

a phenylamino group optionally having at least one substituent selected from the group consisting of a lower alkyl group, a lower alkoxy group, a sulfo group, an amino group and a substituted amino group;

a phenylazo group optionally having at least one substituent selected from the group consisting of a lower alkyl group, a lower alkoxy group, a sulfo group, a hydroxyl group, an amino group and a substituted amino group; or a naphthotriazole group optionally having at least one substituent selected from the group consisting of a lower alkyl group, a lower alkoxy group, a sulfo group, an amino group and a substituted amino group, $Rg_1$ and $Rg_2$ of Formula (5-I) each independently represent a hydrogen atom, a hydroxyl group, a lower alkyl group, a lower alkoxy group or a lower alkoxy group having a sulfo group, and $Rg_2$ of Formula (5-II) represents a hydrogen atom, a hydroxyl group, a lower alkyl group, a lower alkoxy group or a lower alkoxy group having a sulfo group.

In Formula (5-I), $Rg_1$ and $Rg_2$ each independently represent a hydrogen atom, a hydroxyl group, a lower alkyl group, a lower alkoxy group or a lower alkoxy group having a sulfa group, and in Formula (5-II), $Rg_2$ represents a hydrogen atom, a hydroxyl group, a lower alkyl group, a lower alkoxy group or a lower alkoxy group having a sulfo group in the same manner as in Formula (5-I). The lower alkoxy group having a sulfo group is preferably a straight chain alkoxy, and the substitution position of the sulfa group is preferably a terminal of the alkoxy group. The lower alkoxy group having a sulfo group is preferably a 3-sulfopropoxy group or 4-sulfobutoxy group, and particularly preferably a 3-sulfopropoxy group.

In Formula (5-I) or Formula (5-II), $Ag_1$ represents a nitro group or an amino group. $Ag_1$ is preferably a nitro group because the polarization performance is thus further improved.

In Formula (5-I) or Formula (5-II), if $Xg_1$ is the amino group optionally having at least one substituent, the amino group is unsubstituted, or has at least one substituent selected from the group consisting of a lower alkyl group, a lower alkoxy group and a sulfo group.

If $Xg_1$ is the benzoyl group or the benzoylamino group optionally having at least one substituent, the benzoyl group or the benzoylamino group is unsubstituted, or has at least one substituent selected from the group consisting of a lower alkyl group, a lower alkoxy group, a sulfo group, an amino group and a substituted amino group, and preferably has at least one substituent selected from the group consisting of an amino group, a methyl group and a methoxy group.

If $Xg_1$ is the phenylamino group optionally having at least one substituent, the phenylamino group is unsubstituted, or has at least one substituent selected from the group consisting of a lower alkyl group, a lower alkoxy group, a sulfo group, an amino group and a substituted amino group, and preferably is unsubstituted or has at least one substituent selected from the group consisting of an amino group, a methyl group and a methoxy group. If the phenylamino group has the substituent, the position of the substituent is not especially limited, and one of the substituents is preferably in the p-position to the amino group bonded to the phenyl group.

If $Xg_1$ is the phenylazo group optionally having at least one substituent, the phenylazo group is unsubstituted, or has at least one substituent selected from the group consisting of a lower alkyl group, a lower alkoxy group, a sulfo group, an amino group and a substituted amino group, and preferably has at least one substituent selected from the group consisting of an amino group, a methyl group and a methoxy group.

If $Xg_1$ is the naphthotriazole group optionally having at least one substituent, the naphthotriazole group is unsubstituted, or has at least one substituent selected from the group consisting of a lower alkyl group, a lower alkoxy group, a sulfo group, an amino group and a substituted amino group, and preferably has a sulfo group as the substituent.

Among compounds represented by Formula (5-I) or Formula (5-II), an azo compound represented by the following Formula (5') is preferred. If the azo compound represented by Formula (5') is used, the polarization performance of the resultant polarizer can be further improved.

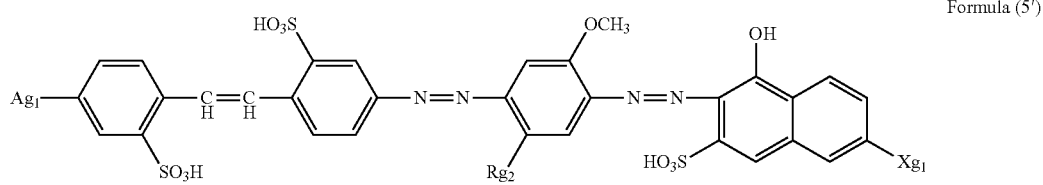

Formula (5')

In Formula (5'), $Ag_1$, $Rb_2$ and $Xg_1$ are the same as defined in Formula (5-I) or Formula (5-II).

In order to further improve optical characteristics, $Rg_2$ is preferably a hydrogen atom, a methyl group, an ethyl group, a methoxy group or an ethoxy group in Formula (5').

The azo compound represented by Formula (5-I) or Formula (5-II) can be produced by, for example, any of known methods described in, for example, Japanese Patent Publication No. 60-156759, Japanese Laid-Open Patent Publication No. 2-61988 and the like, but the production method is not limited to these.

Specific examples of the azo compound represented by Formula (5-I) or Formula (5-II) include the following azo compounds:

[Compound Example 5-1]
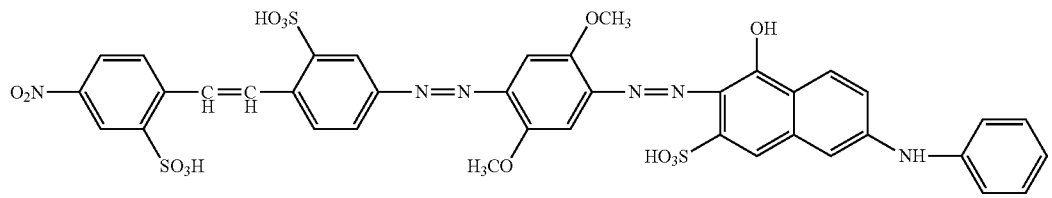
[Compound Example 5-2]
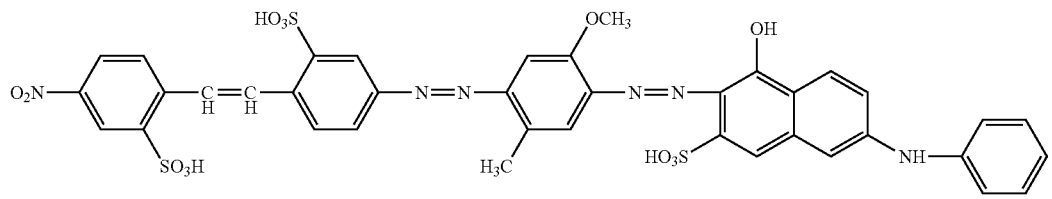
[Compound Example 5-3]
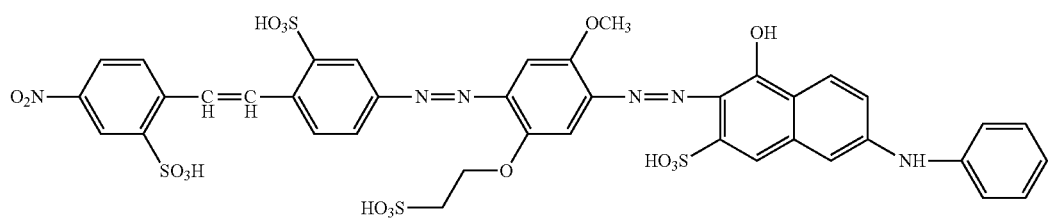
[Compound Example 5-4]
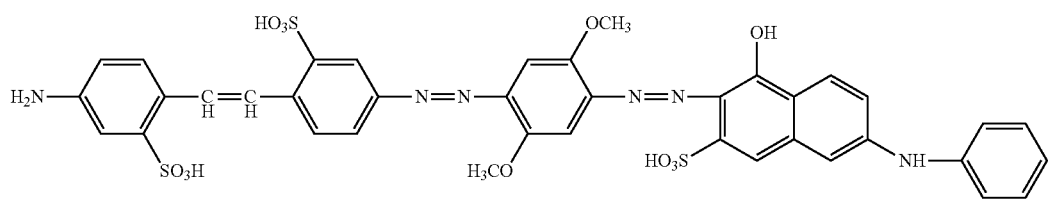
[Compound Example 5-5]
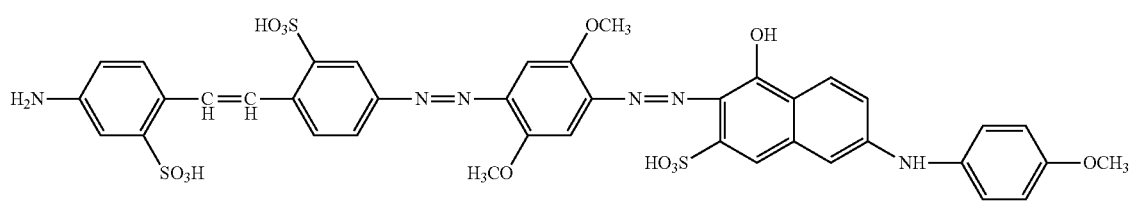
[Compound Example 5-6]
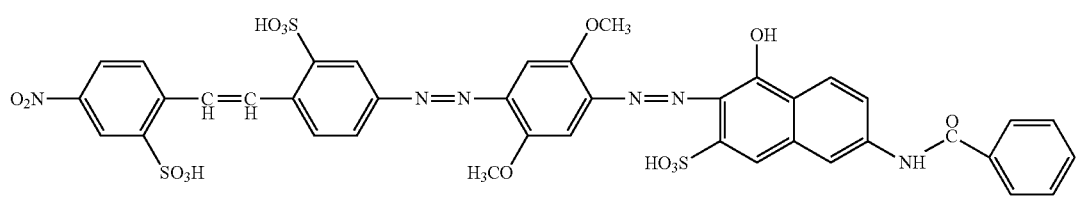
[Compound Example 5-7]
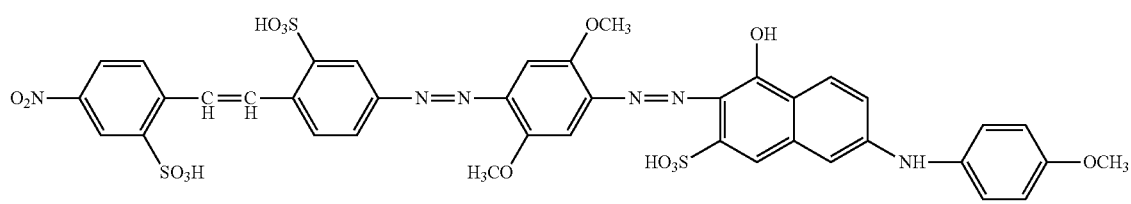

-continued
[Compound Example 5-8]
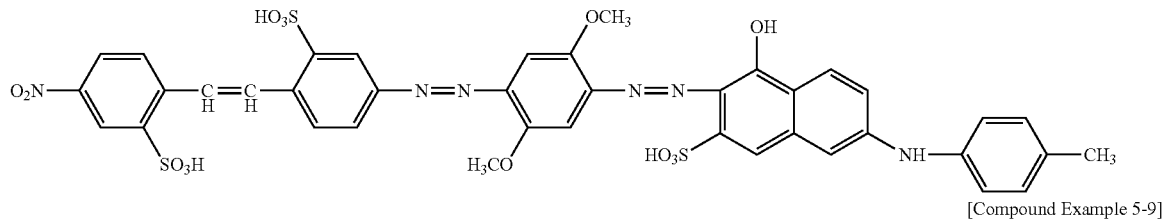
[Compound Example 5-9]
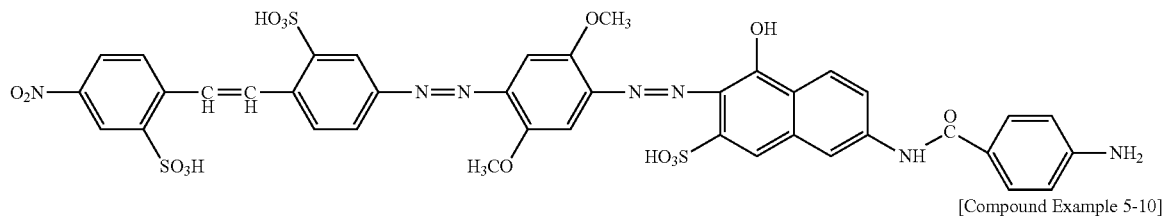
[Compound Example 5-10]
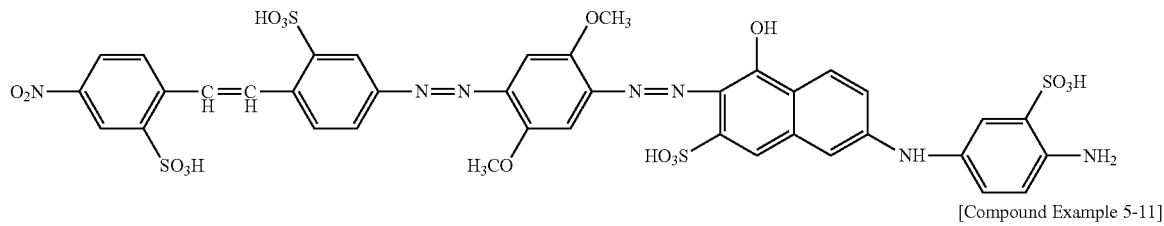
[Compound Example 5-11]
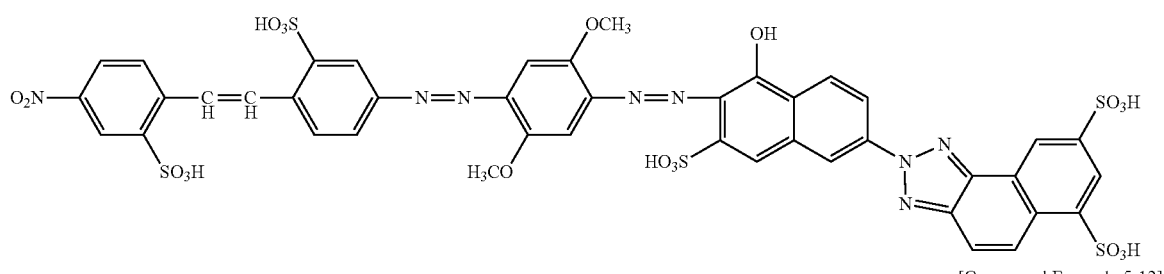
[Compound Example 5-12]
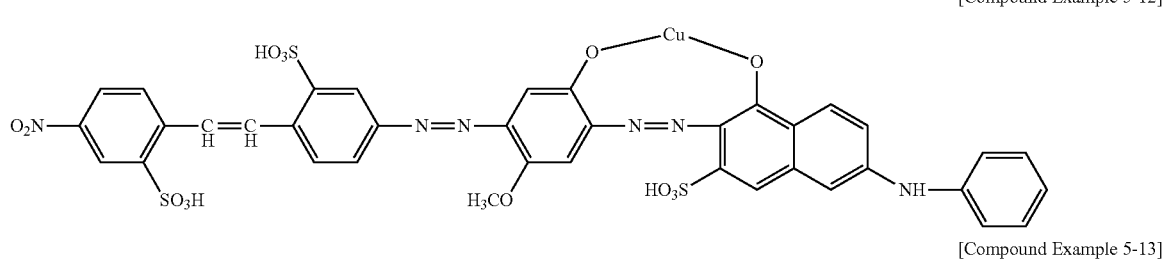
[Compound Example 5-13]
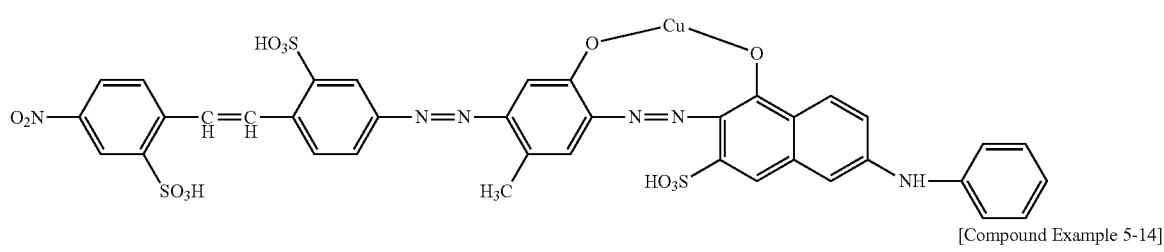
[Compound Example 5-14]
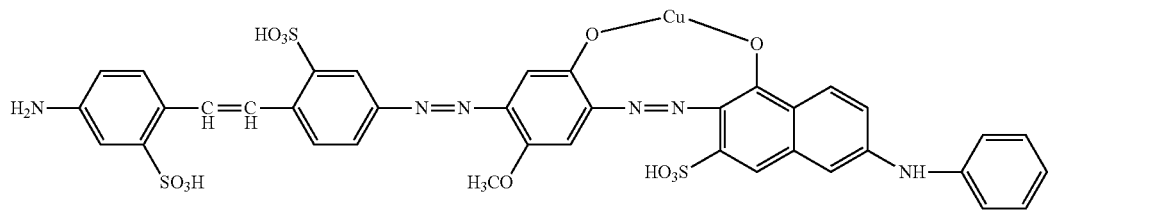

[Compound Example 5-15]

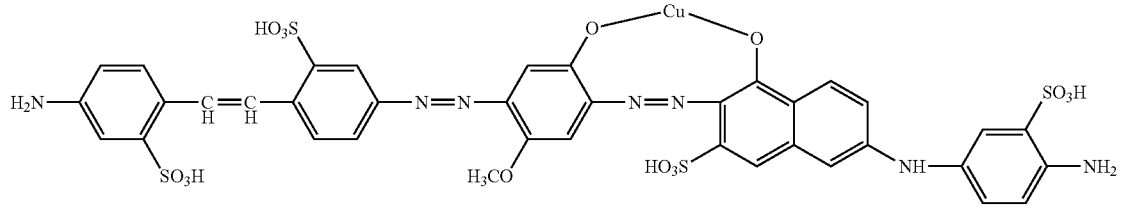

[Compound Example 5-16]

[Compound Example 5-17]

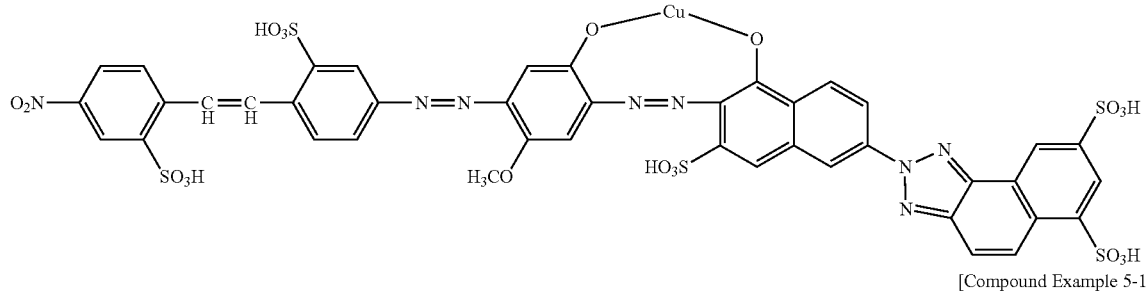

[Compound Example 5-18]

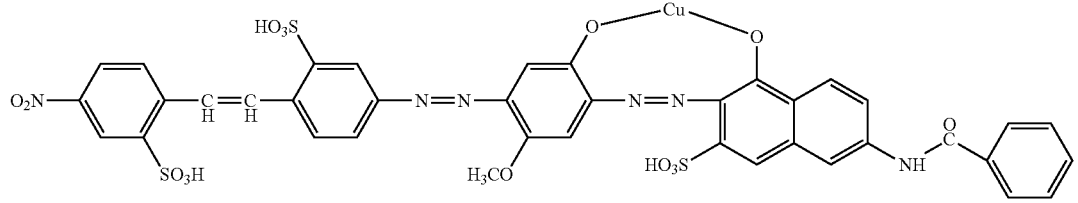

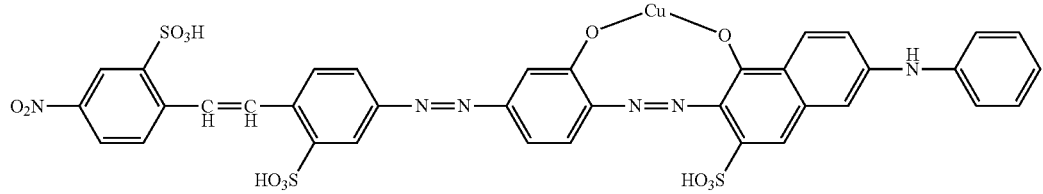

One of these azo compounds represented by Formulas (2-I), (2-II), (3), (4-I), (4-II), (5-I) and (5-II) may be singly used, or two or more of these may be used together.

Since the polarizer of the present disclosure contains the compound A and the compound B, a polarizer or a polarizing plate that has a higher degree of polarization and higher contrast than a conventional dye-based polarizer or polarizing plate, and is excellent in the polarization performance can be realized, and in addition, it exhibits high durability against heat, humidity and light as compared with a conventional dye-based polarizer or polarizing plate.

(Compound C)

In order to improve the polarization performance of the polarizer of the present disclosure, in addition to the compound A and the compound B, at least one of an azo compound represented by the following Formula (6) or a salt thereof (as compound C) is preferably contained.

Formula (6)

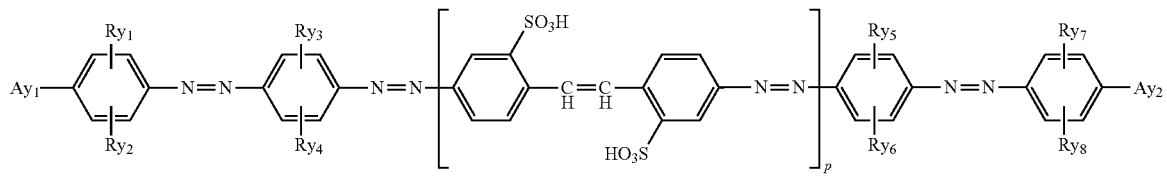

In Formula (6), $Ay_1$ and $Ay_2$ each independently represent a sulfo group, a carboxy group, a hydroxyl group, a lower alkyl group or a lower alkoxyl group; $Ry_1$ to $Ry_8$ each independently represent a hydrogen atom, a sulfo group, a lower alkyl group or a lower alkoxyl group; and p represents an integer of 1 to 3.

In Formula (6), $Ay_1$ and $Ay_2$ each independently represent a sulfo group, a carboxy group, a hydroxyl group, a lower alkyl group or a lower alkoxyl group, and is preferably a sulfo group, a carboxy group or a lower alkoxy group, and is more preferably a sulfo group, a carboxy group, a methoxy group or an ethoxy group, and is further more preferably a sulfo group or a carboxy group.

In Formula (6), $Ry_1$ to $Ry_8$ each independently represent a hydrogen atom, a sulfo group, a lower alkyl group or a lower alkoxyl group, and is preferably a hydrogen atom, a sulfo group, a methyl group, an ethyl group, a methoxy group or an ethoxy group, and is more preferably a hydrogen atom, a sulfo group, a methyl group or a methoxy group.

The azo compound represented by Formula (6) affects transmittance at 400 to 500 nm. In a polarizer, the transmittance on the short wavelength side of 400 to 500 nm and the degree of polarization (dichroism) particularly affect loss of blue color occurring in displaying black color or yellowness of white color occurring in displaying white color. The azo compound represented by Formula (6) does not lower the transmittance on the short wavelength side in a parallel position of the polarizer but can improve the polarization property (dichroism) at 400 to 500 nm and can further reduce the yellowness occurring in displaying white color and loss of blue color occurring in displaying black color. If the polarizer of the present disclosure further contains the azo compound represented by Formula (6) in the base, a polarizer exhibiting more neutral hue and further improved degree of polarization can be obtained.

The azo compound represented by Formula (6) or the salt thereof can be synthesized by, for example, a method(s) described in International Publication No. WO2007/138980 or the like, and alternatively, a commercially available compound can be used.

Examples of the azo compound represented by Formula (6) include, but are not limited to, C.I. Direct Yellow 4, C.I. Direct Yellow 12, C.I. Direct Yellow 72, C.I. Direct Orange 39, Kayarus Supra Orange 39 and an azo compound having a stilbene structure described in International Publication No. WO2007/138980 or the like.

Specific examples of the azo compound represented by Formula (6) include the following:

[Compound Example 6-1]

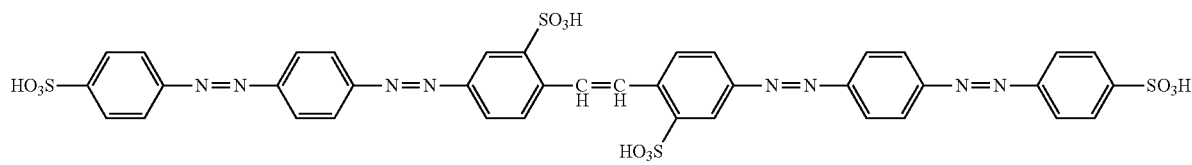

[Compound Example 6-2]

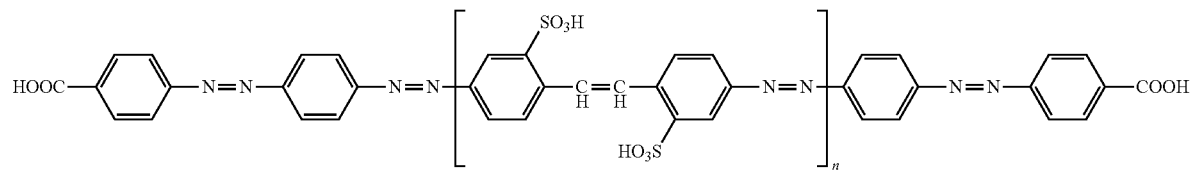

wherein n represents an integer of 1 or 3.

[Compound Example 6-3]

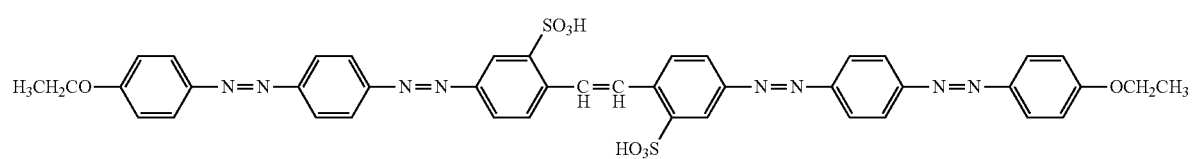

[Compound Example 6-4]

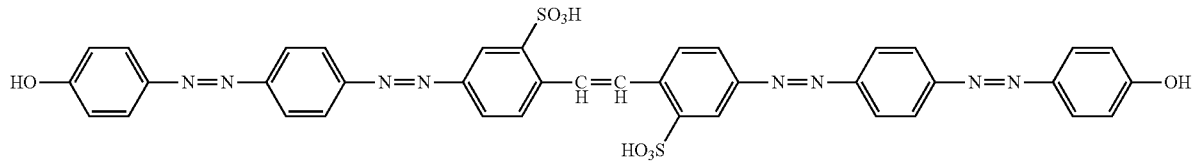

[Compound Example 6-5]

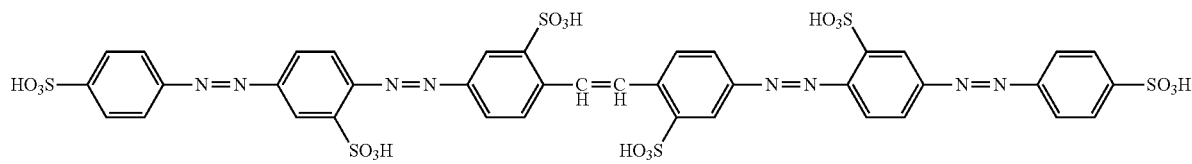

One of these azo compounds represented by Formula (6) may be singly used, or two or more of these may be used together.

Besides, if the azo compound represented by Formula (5-I) or Formula (5-II) is used as the compound B in the polarizer of the present disclosure, at least one of an azo compound represented by the following Formula (7) or a salt thereof is preferably further contained in the base. If the azo compound represented by Formula (5-I) or Formula (5-II) is used together with the azo compound represented by Formula (7), the polarization property can be further improved. In other words, if the compound represented by Formula (1), the azo compound represented by Formula (5-I) or Formula (5-II), the azo compound represented by Formula (7), and optionally the azo compound represented by Formula (6) are used together, a higher performance polarizer can be produced.

consisting of a lower alkyl group, a lower alkoxy group, a sulfo group, an amino group and a substituted amino group;

a phenylamino group optionally having at least one substituent selected from the group consisting of a lower alkyl group, a lower alkoxy group, a sulfo group, an amino group and a substituted amino group;

a phenylazo group optionally having at least one substituent selected from the group consisting of a lower alkyl group, a lower alkoxy group, a sulfo group, a hydroxyl group, an amino group and a substituted amino group; or a naphthotriazole group optionally having at least one substituent selected from the group consisting of a lower alkyl group, a lower alkoxy group, a sulfo group, an amino group and a substituted amino group, m represents an integer of 0 or 1, and n represents an integer of 0 or 1.

Formula (7)

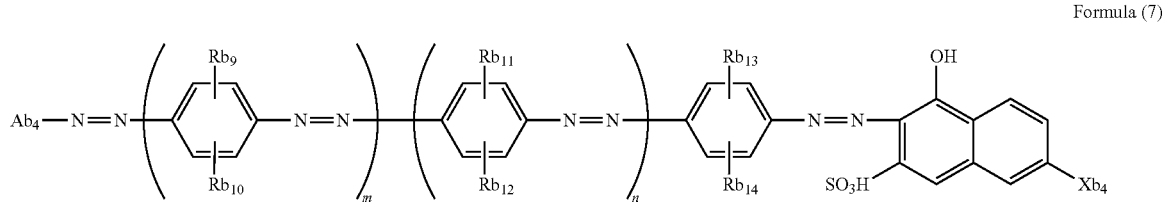

In Formula (7), Aho represents: a phenyl group having at least one substituent selected from the group consisting of a sulfo group, a carboxy group, a lower alkyl group, a lower alkoxy group, a hydroxyl group, a lower alkoxy group having a sulfo group, a sulfo-substituted naphthotriazole group, a nitro group, an amino group and a substituted amino group; or a naphthyl group having at least one substituent selected from the group consisting of a sulfo group, a hydroxyl group and a lower alkoxy group having a sulfo group, $Rb_9$ to $Rb_{14}$ each independently represent a hydrogen atom, a lower alkyl group, a lower alkoxy group or a lower alkoxy group having a sulfo group, $Xb_4$ represents: an amino group optionally having at least one substituent selected from the group consisting of a lower alkyl group, a lower alkoxy group, a sulfo group, an amino group, a lower alkylamino group, a hydroxyl group, a carboxy group and a carboxyethyl amino group;

a benzoyl group or a benzoylamino group optionally having at least one substituent selected from the group As described above, in Formula (7), $Ab_4$ represents: a phenyl group having at least one substituent selected from the group consisting of a sulfo group, a carboxy group, a lower alkyl group, a lower alkoxy group, a hydroxyl group, a lower alkoxy group having a sulfo group, a sulfo-substituted naphthotriazole group, a nitro group, an amino group and a substituted amino group; or a naphthyl group having at least one substituent selected from the group consisting of a sulfo group, a hydroxyl group and a lower alkoxy group having a sulfo group. The phenyl group or the naphthyl group preferably has one or more of the above-described substituents, and more preferably, the phenyl group has one or more substituents of a sulfo group or a carboxy group, and the naphthyl group has one or more sulfo groups as the substituents. In particular, if the phenyl group has two or more substituents selected from a sulfo group and a carboxy group and the naphthyl group has two or more sulfo groups, the durability can be further improved. Besides, for producing a neutral color polarizer, $Ab_4$ is preferably a phenyl group having one or more substituents selected from a sulfa group and a carboxy group.

The azo compound represented by Formula (7) is preferably an azo compound represented by the following Formula (7). In other words, the azo compound represented by Formula (2-I) or the azo compound represented by Formula (4-I) can be used as the azo compound represented by Formula (7). Accordingly, in the polarizer of the present disclosure, the azo compound represented by Formula (5-I) or Formula (5-II) and the azo compound represented by Formula (2-I) or the azo compound represented by Formula (4-I) can be used together as the compound B, and thus, the polarization performance of the polarizer of the present disclosure can be further improved.

Formula (7')

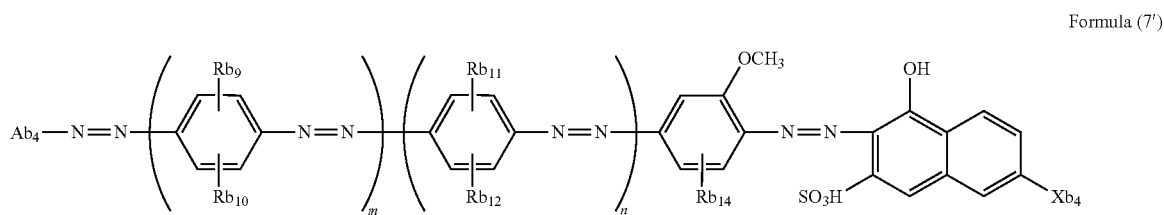

In Formula (7'), $Ab_4$, $Rb_9$ to $Rb_{12}$, $Rb_{14}$ and $Xb_4$ are the same as defined in Formula (7).

The azo compound represented by Formula (7) can be produced by any of known methods described in, for example, Japanese Laid-Open Patent Publication No. 5-295281, Japanese Laid-Open Patent Publication No. 10-259311, Japanese Patent No. 2622748, Japanese Patent No. 3661238, Japanese Patent No. 4452237, Japanese Patent No. 4662853, International Publication No. WO2007/148757, International Publication No. WO2007/145210, International Publication No. WO2012/108169, International Publication No. WO2012/108173 and the like, but the production method is not limited to these.

Specific Examples of the azo compound represented by Formula (7) include the following azo compounds:

[Chemical Example 7-1]

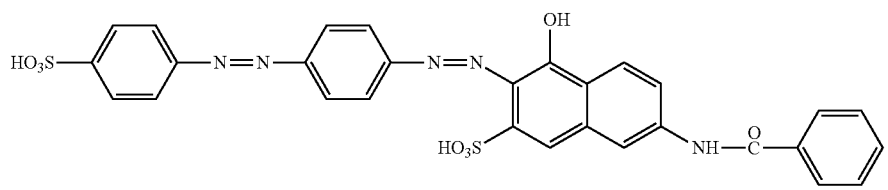

[Chemical Example 7-2]

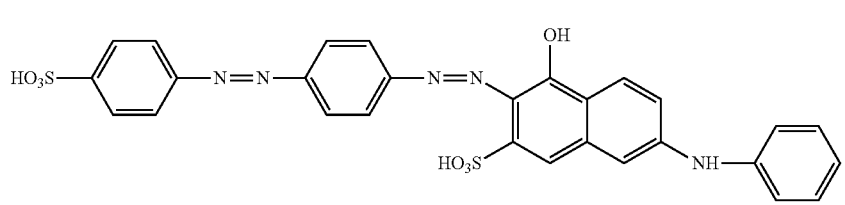

[Chemical Example 7-3]

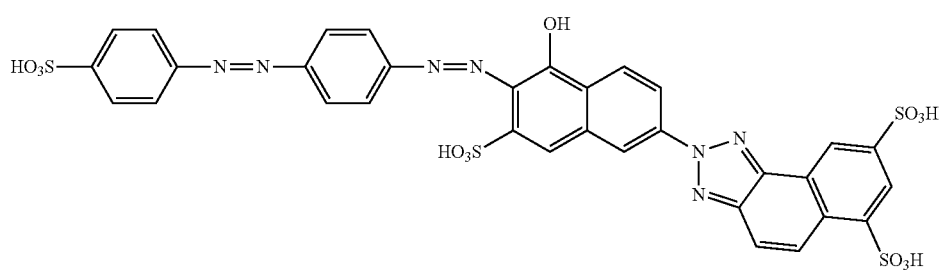

-continued
[Chemical Example 7-4]
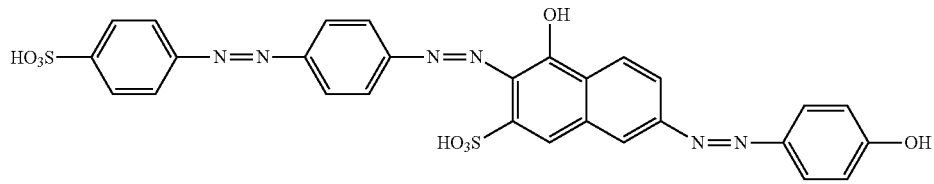
[Chemical Example 7-5]
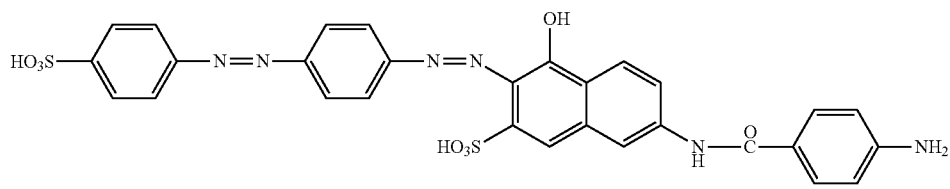
[Chemical Example 7-6]
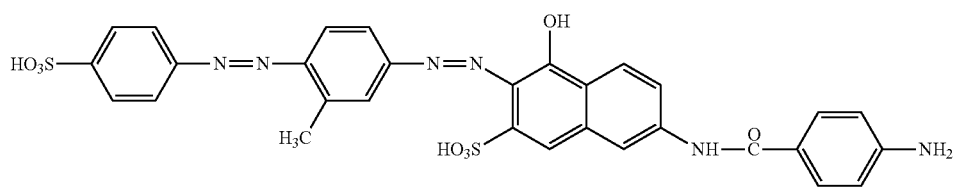
[Chemical Example 7-7]
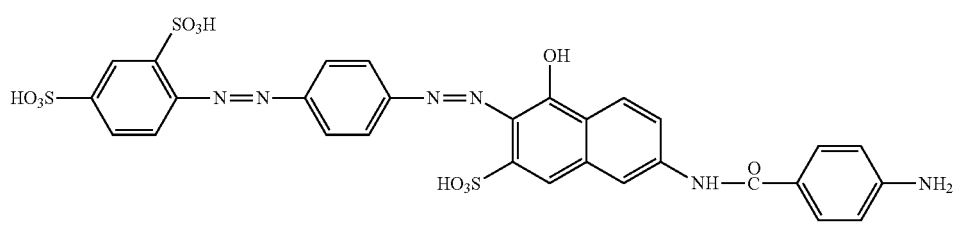
[Chemical Example 7-8]
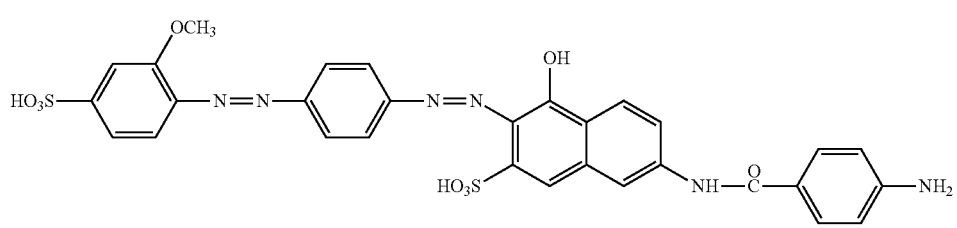
[Chemical Example 7-9]
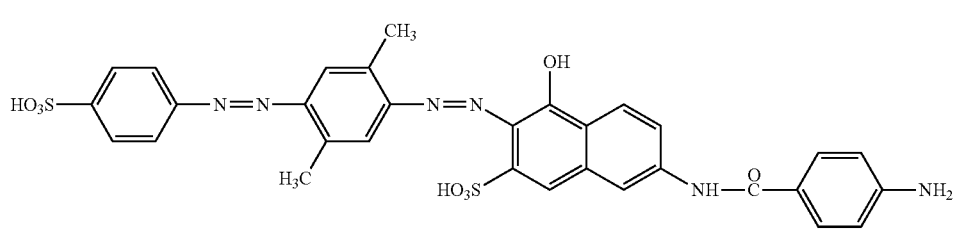
[Chemical Example 7-10]
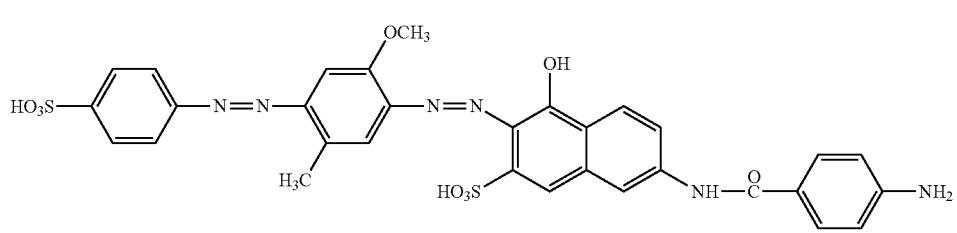

[Chemical Example 7-11]
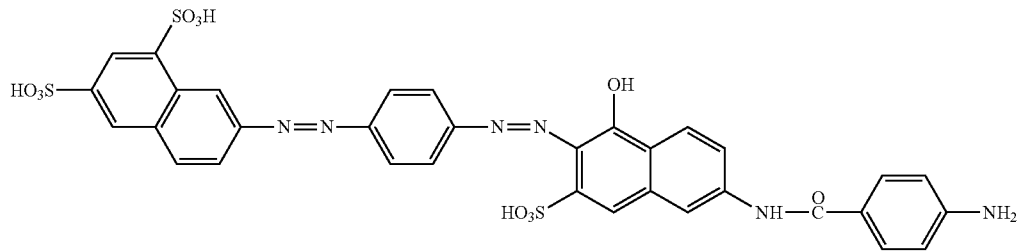
[Chemical Example 7-12]
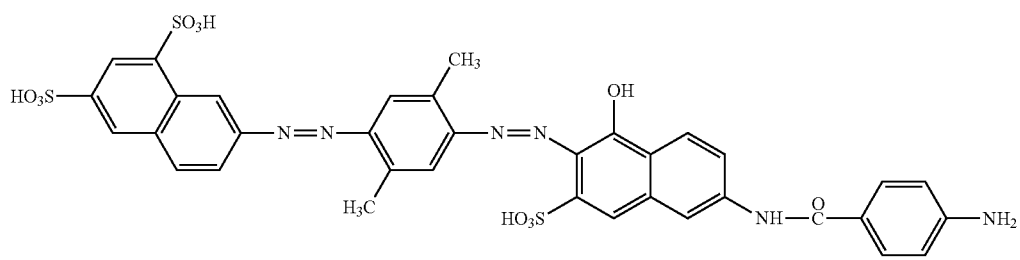
[Compound Example 7-13]
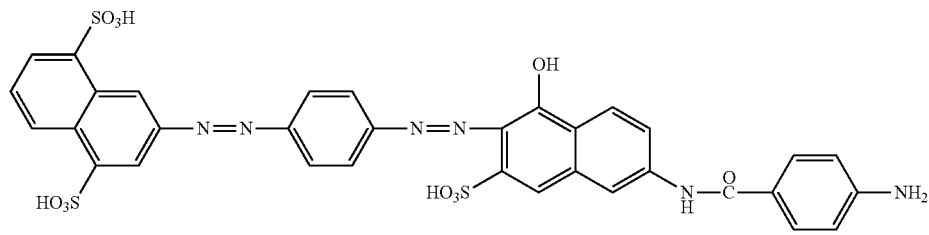
[Compound Example 7-14]
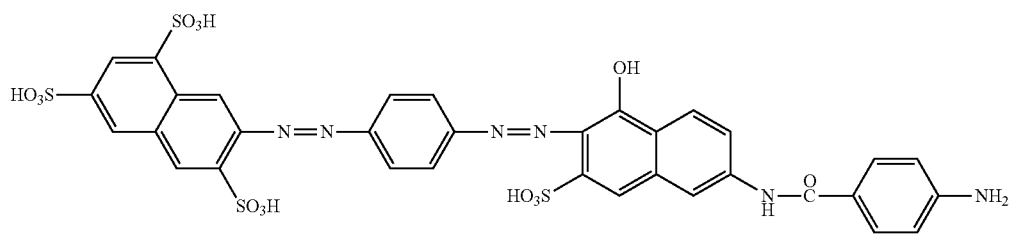
[Compound Example 7-15]
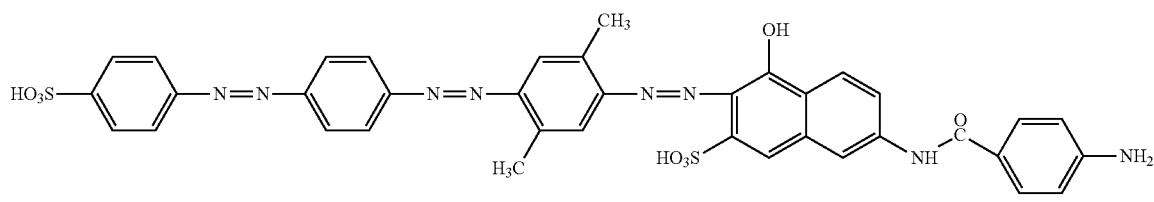
[Compound Example 7-16]
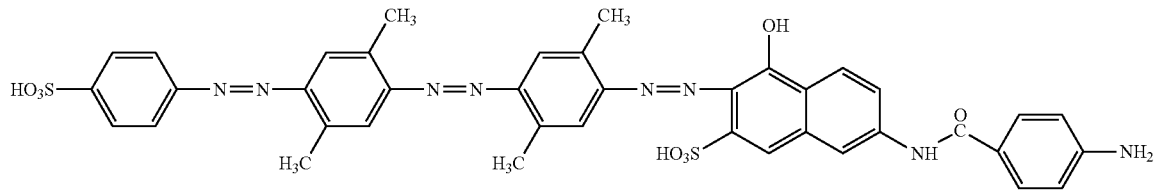

[Compound Example 7-17]
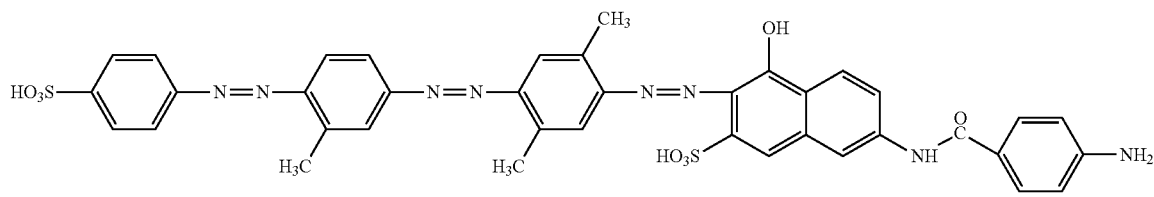
[Compound Example 7-18]
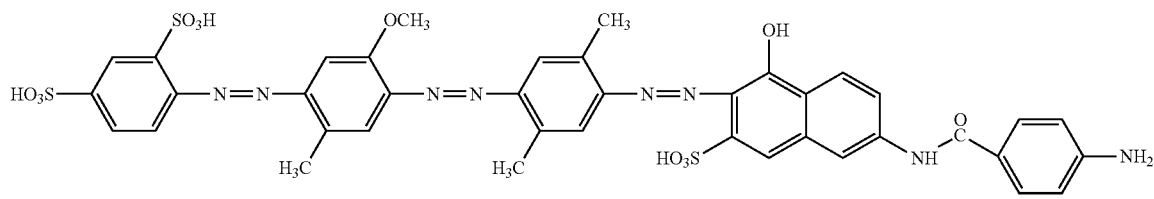
[Compound Example 7-19]
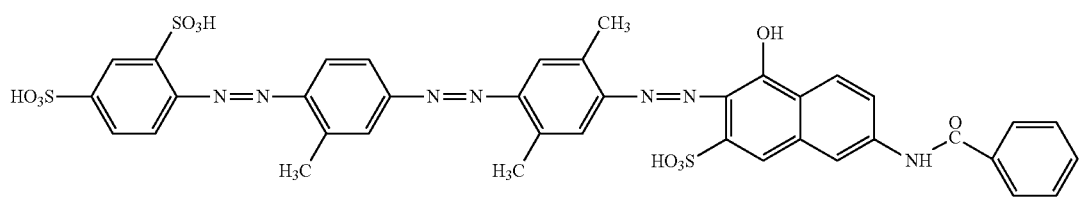
[Compound Example 7-20]
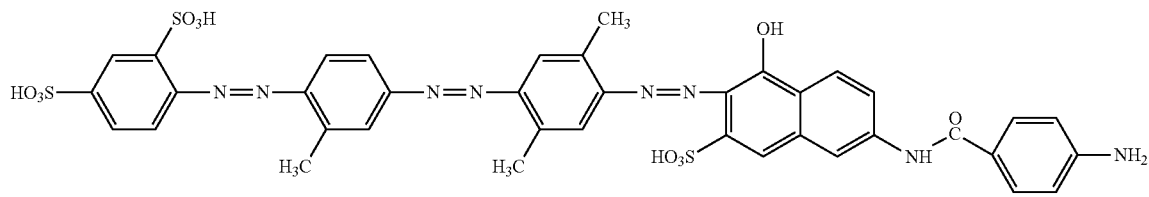
[Compound Example 7-21]
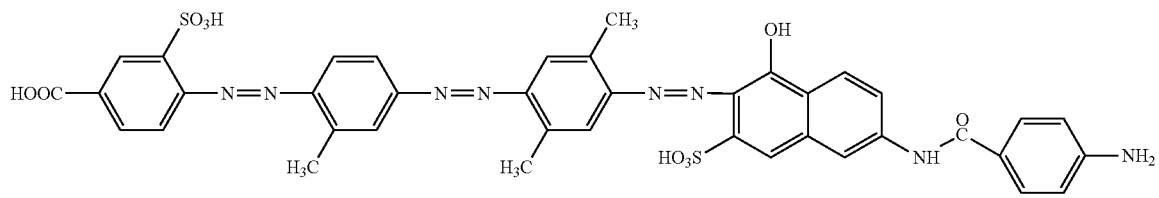
[Compound Example 7-22]
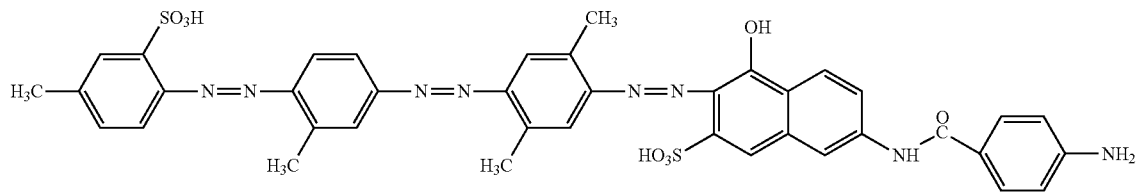
[Compound Example 7-23]
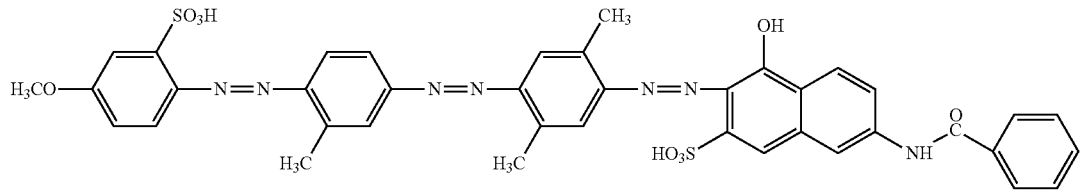

[Compound Example 7-24]
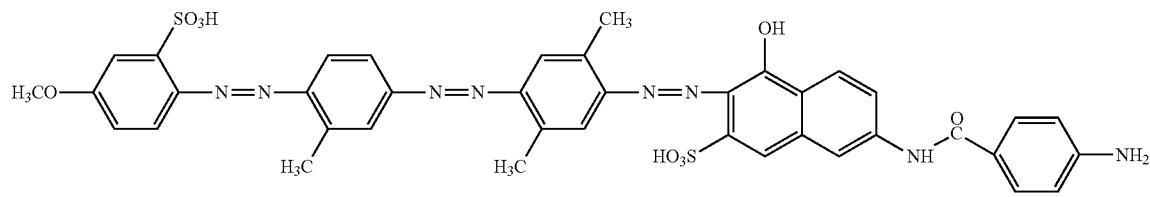
[Compound Example 7-25]
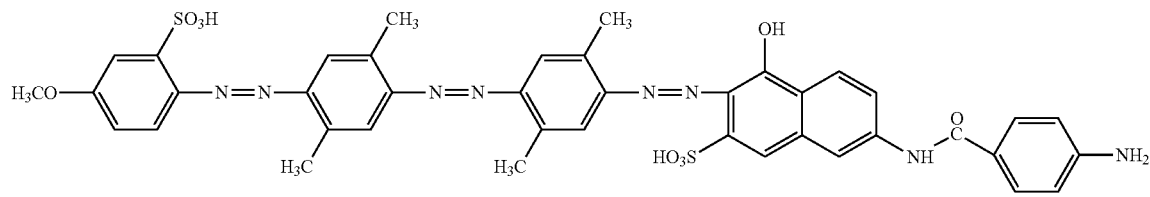
[Compound Example 7-26]
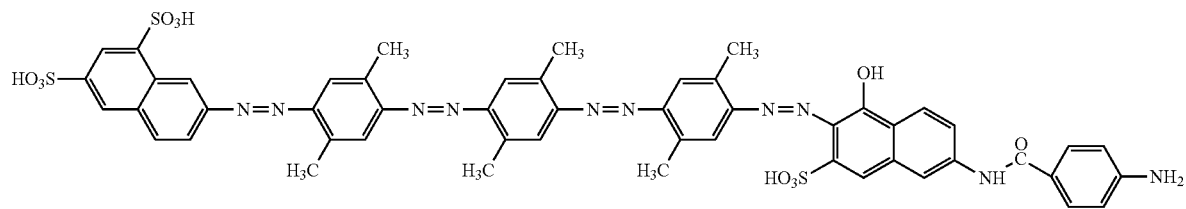
[Compound Example 7-27]
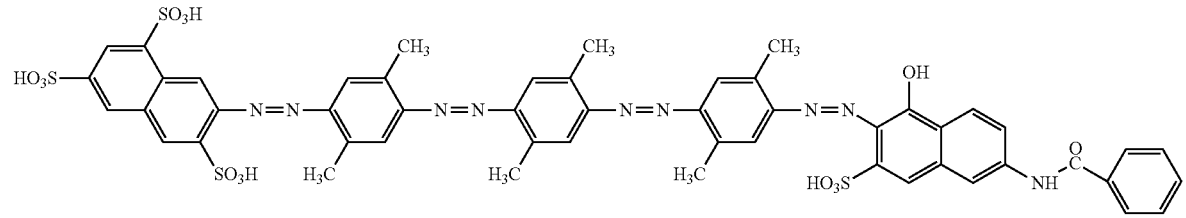
[Compound Example 7-28]
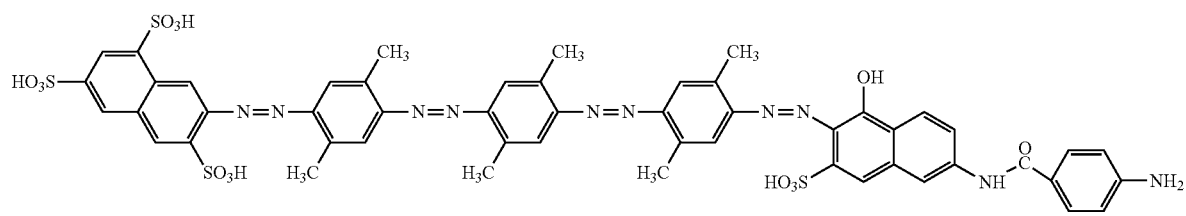
[Compound Example 7-29]
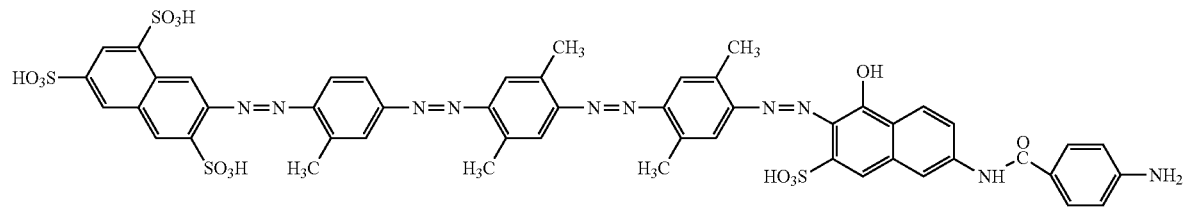
[Compound Example 7-30]
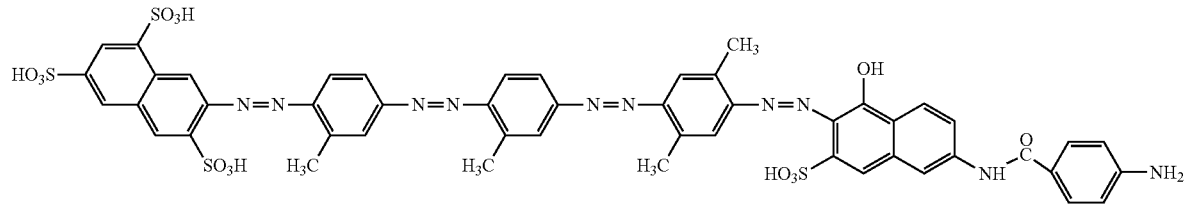

[Compound Example 7-31]
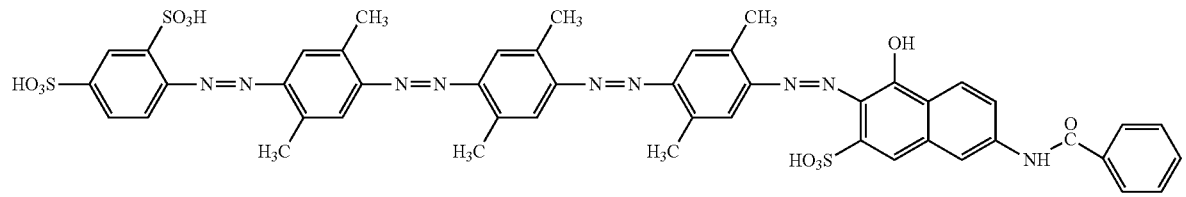
[Compound Example 7-32]
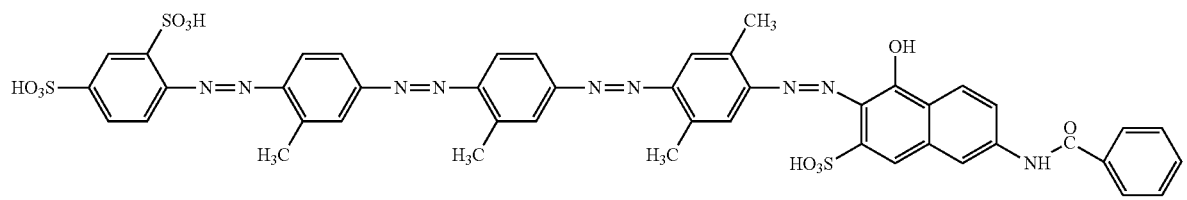
[Compound Example 7-33]
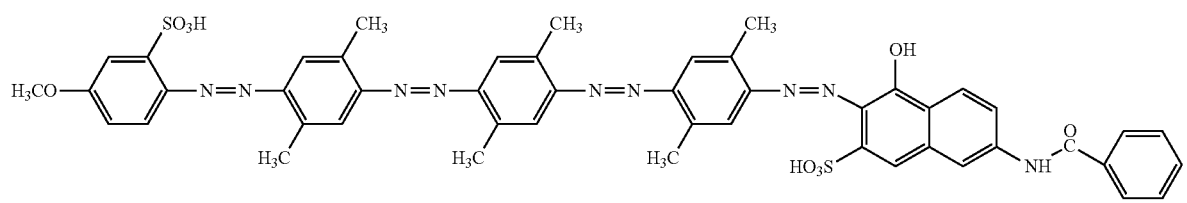
[Compound Example 7-34]
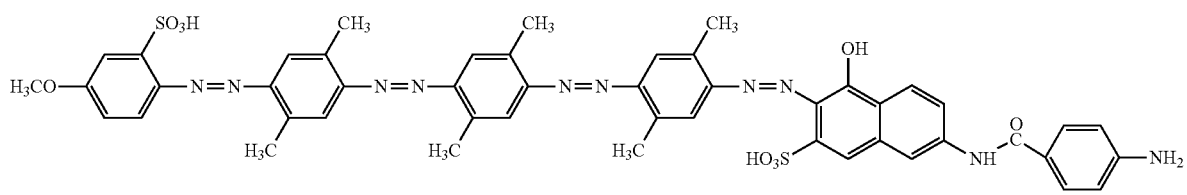
[Compound Example 7-35]
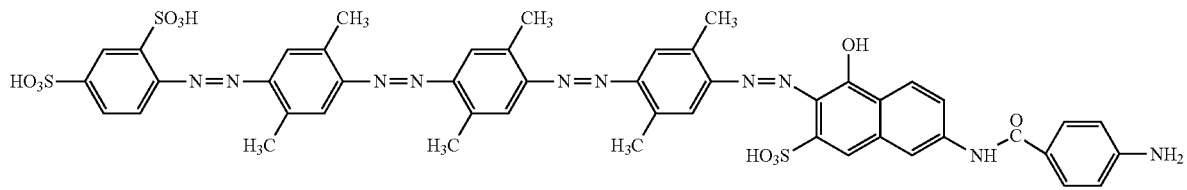
[Compound Example 7-36]
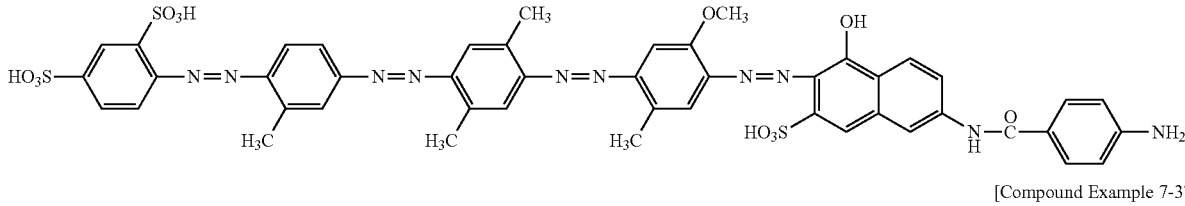
[Compound Example 7-37]
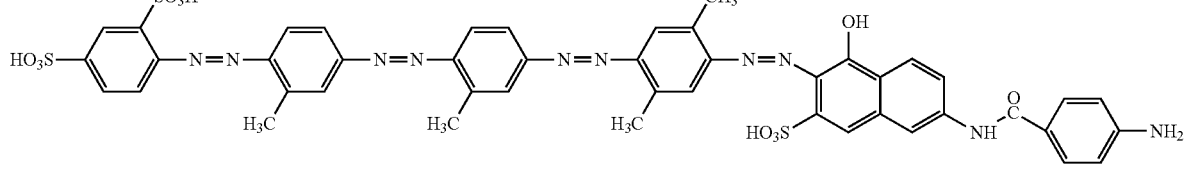

[Compound Example 7-38]
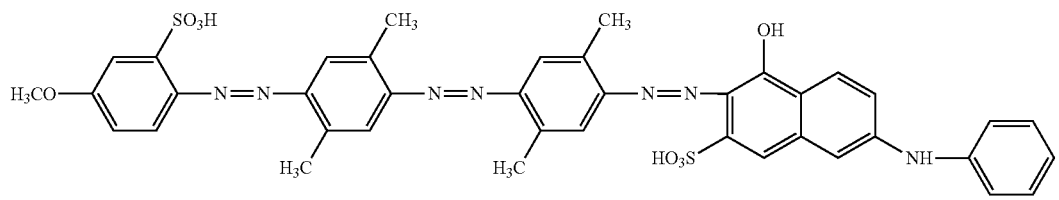
[Compound Example 7-39]
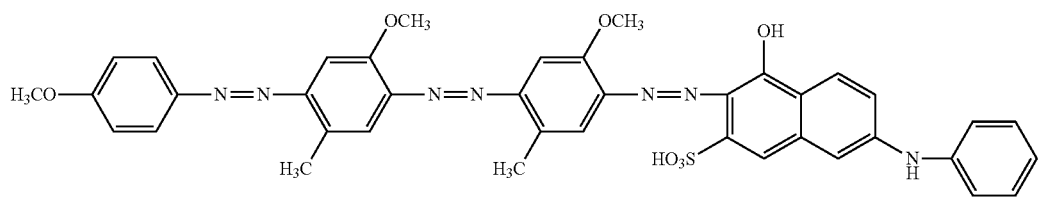
[Compound Example 7-40]
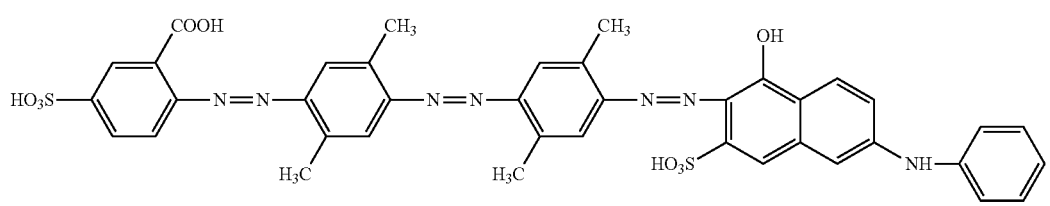
[Compound Example 7-41]
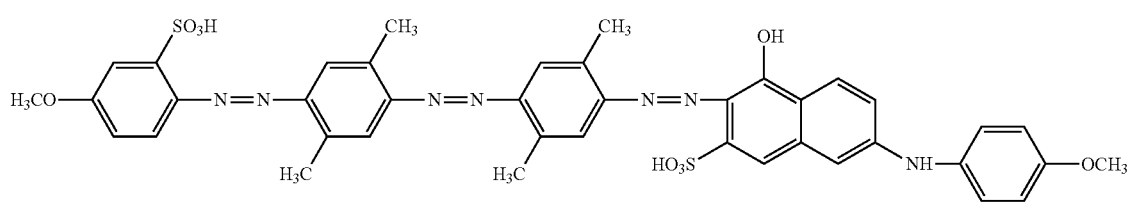
[Compound Example 7-42]
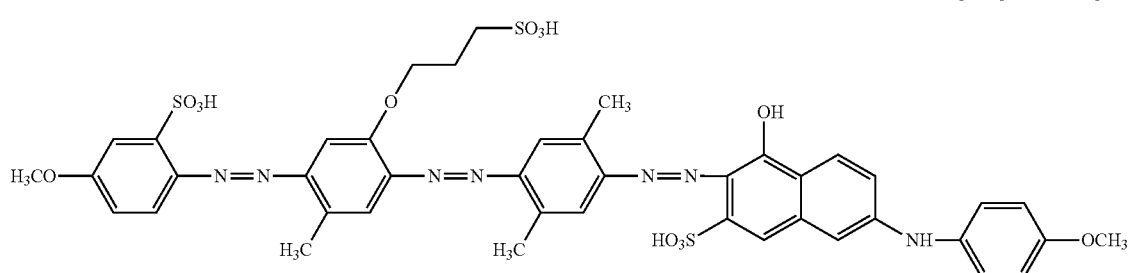
[Compound Example 7-43]
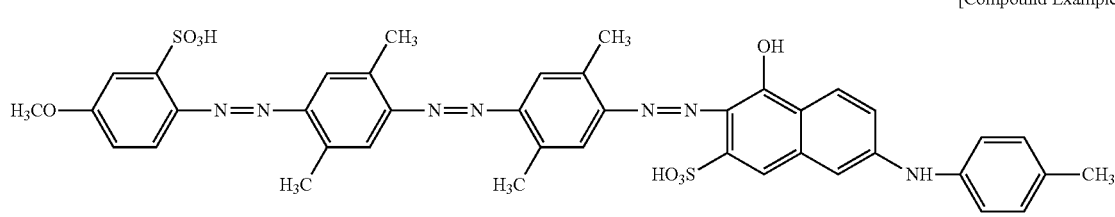
[Compound Example 7-44]
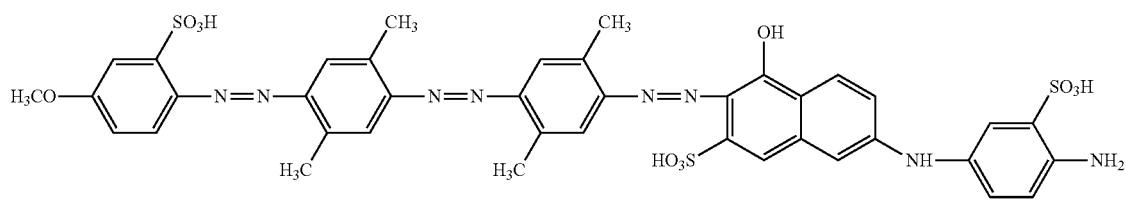

[Compound Example 7-45]
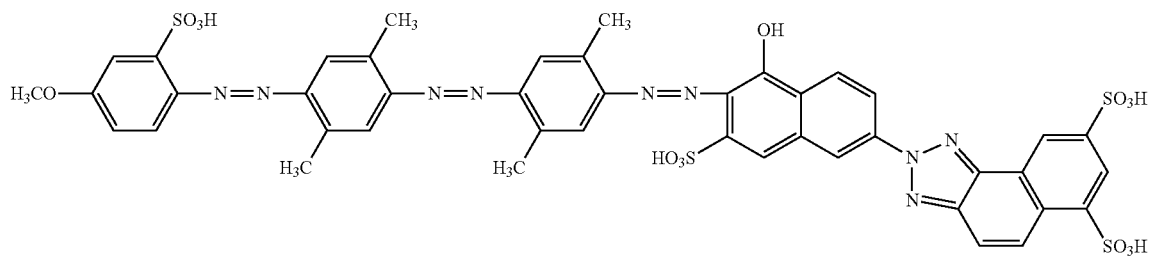
[Compound Example 7-46]
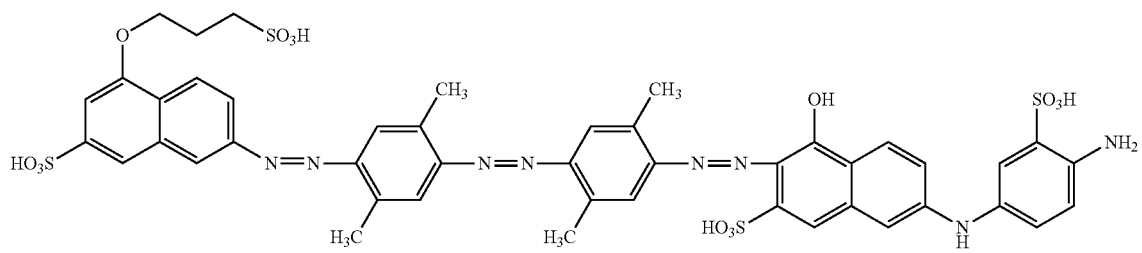
[Compound Example 7-47]
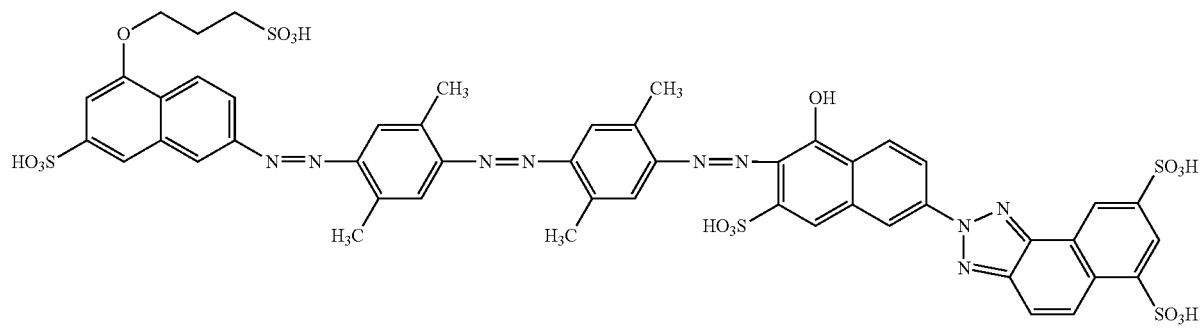
[Compound Example 7-48]
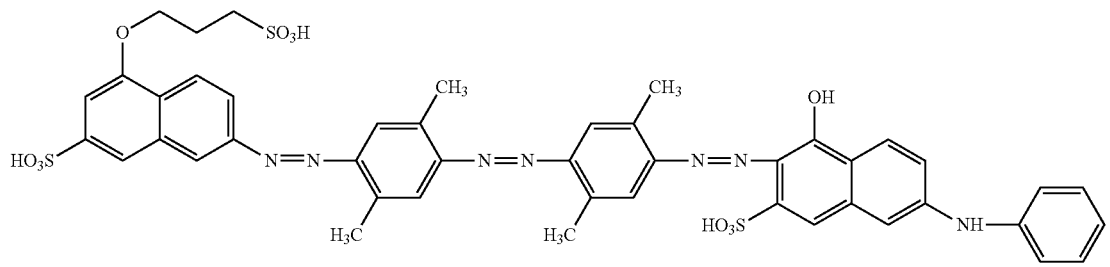
[Chemical Example 7-49]
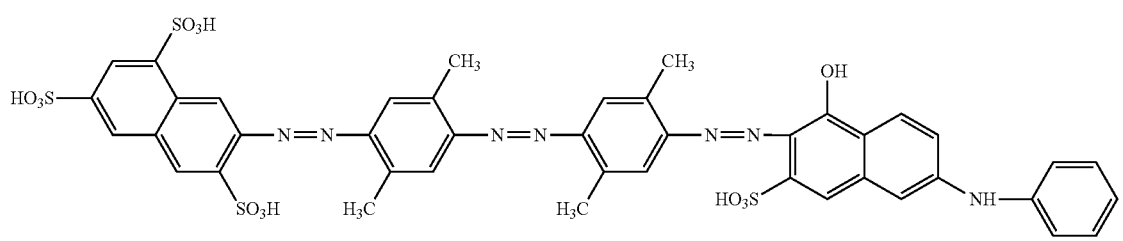

[Chemical Example 7-50]
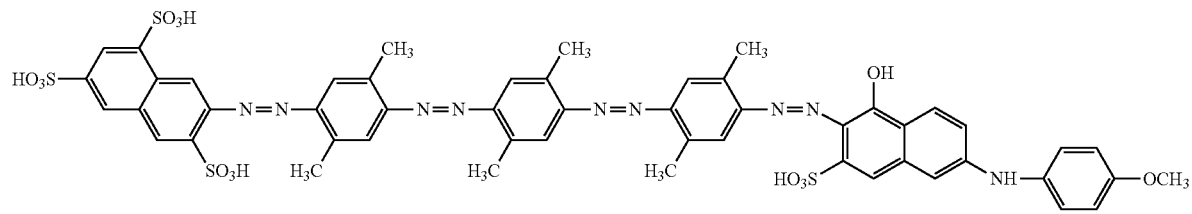
[Chemical Example 7-51]
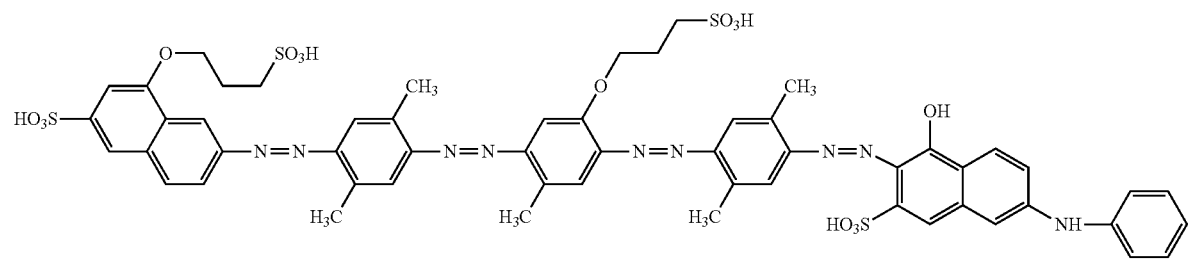
[Chemical Example 7-52]
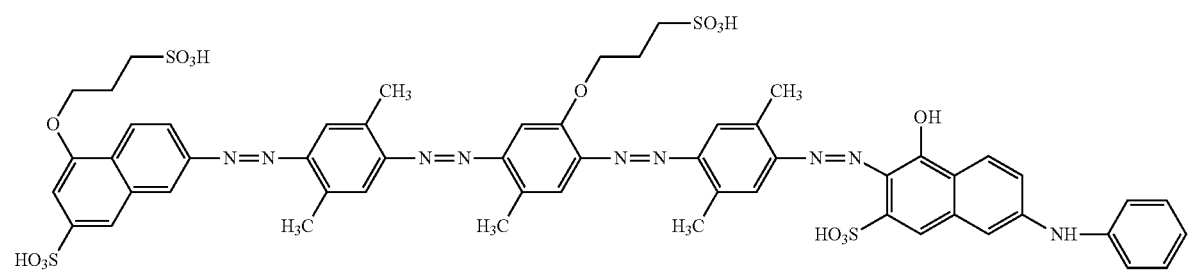
[Chemical Example 7-53]
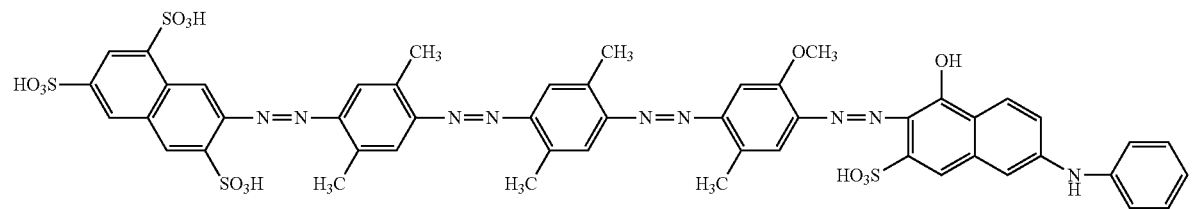
[Chemical Example 7-54]
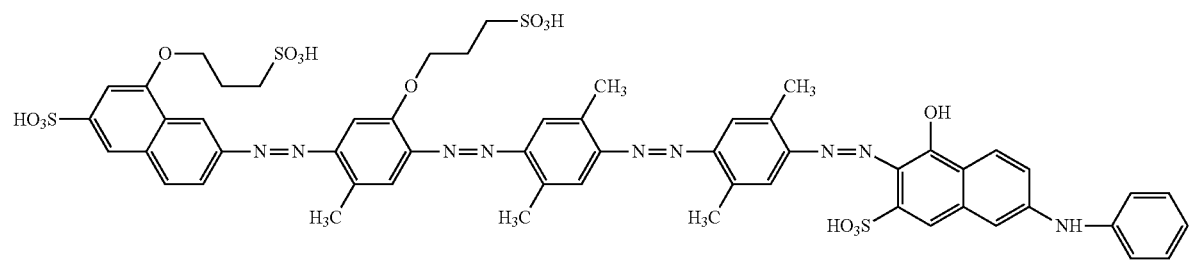
[Compound Example 7-55]
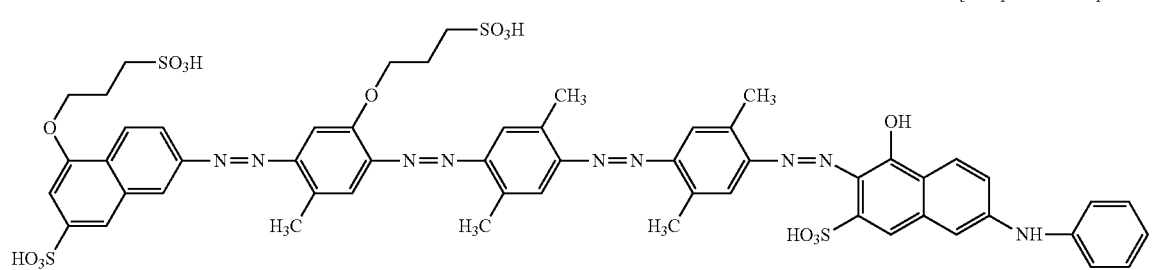

[Compound Example 7-56]
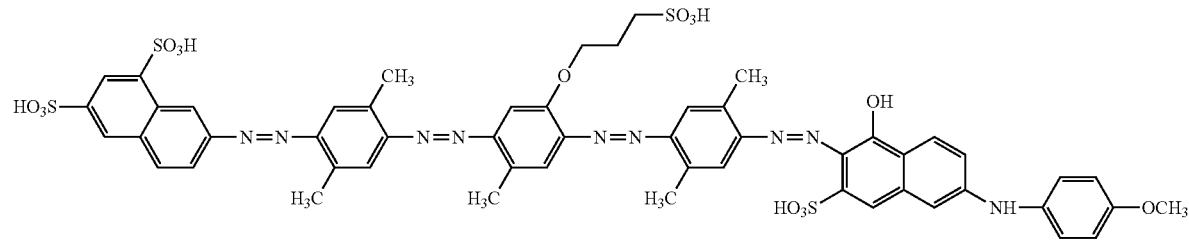
[Compound Example 7-57]
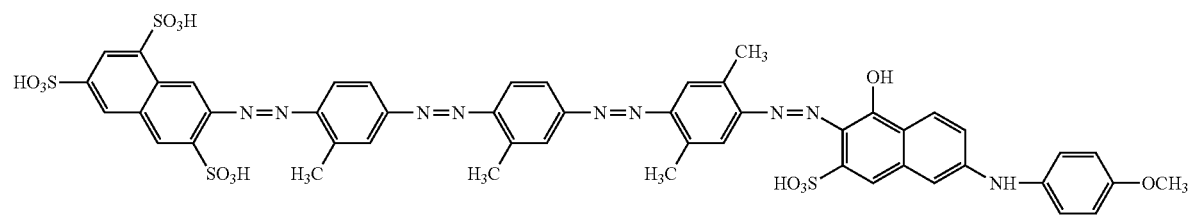
[Compound Example 7-58]
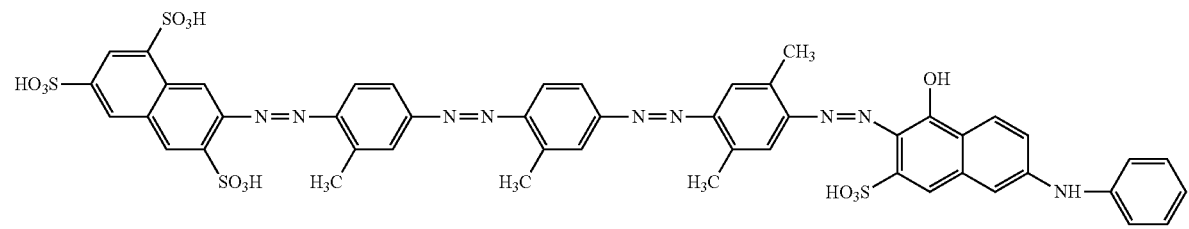
[Compound Example 7-59]
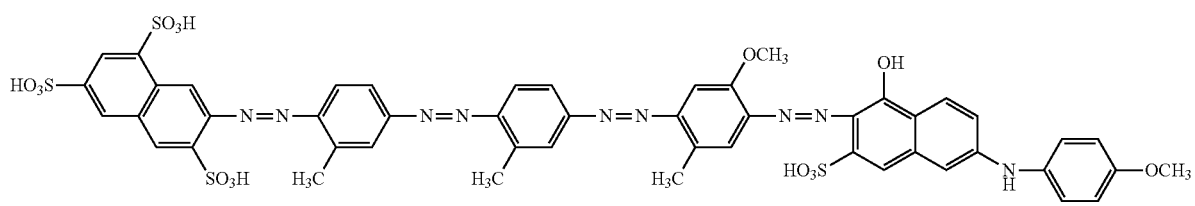
[Compound Example 7-60]
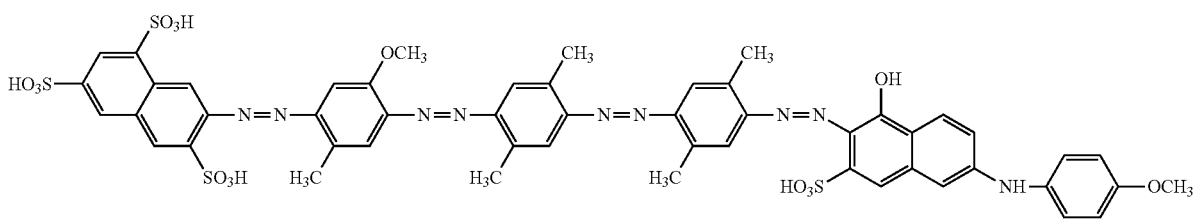
[Chemical Example 7-61]
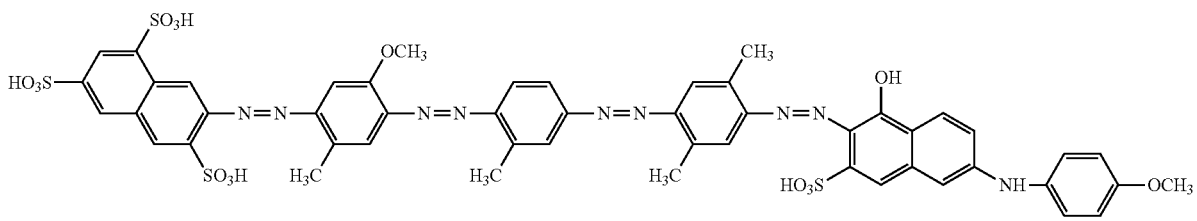

[Chemical Example 7-62]
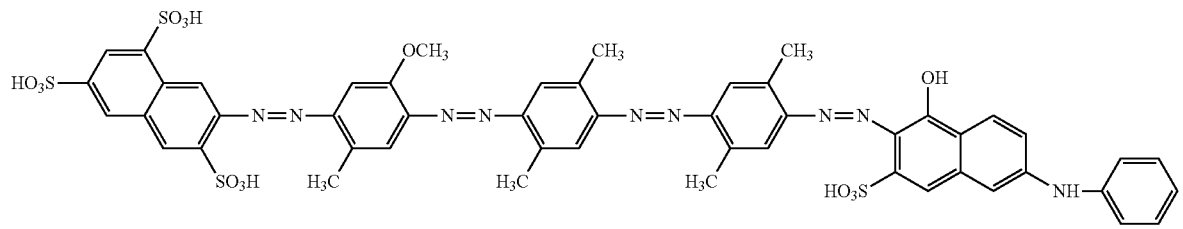
[Chemical Example 7-63]
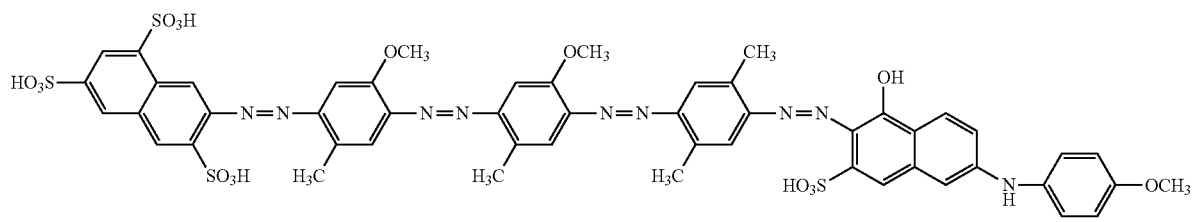
[Chemical Example 7-64]
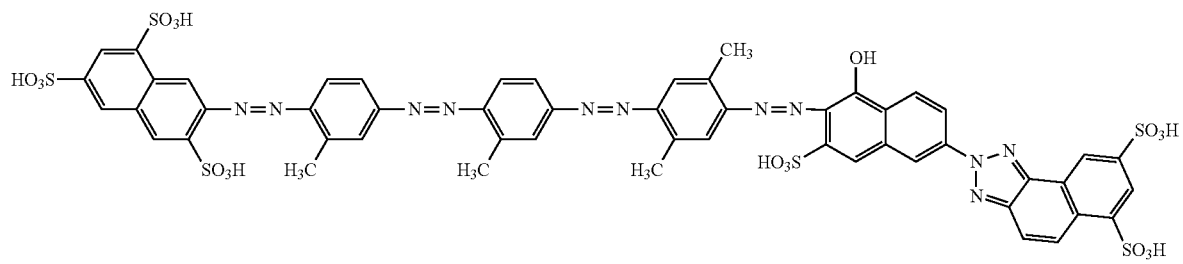
[Chemical Example 7-65]
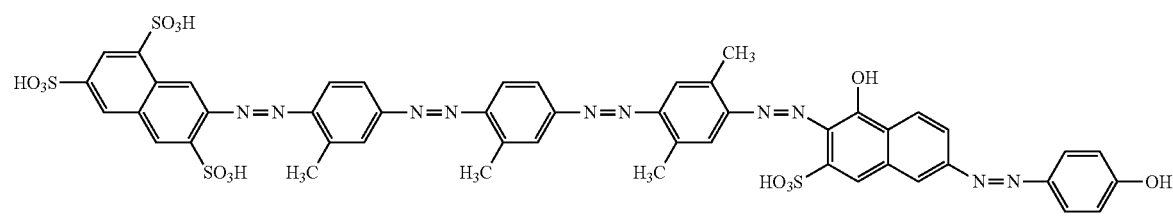
[Chemical Example 7-66]
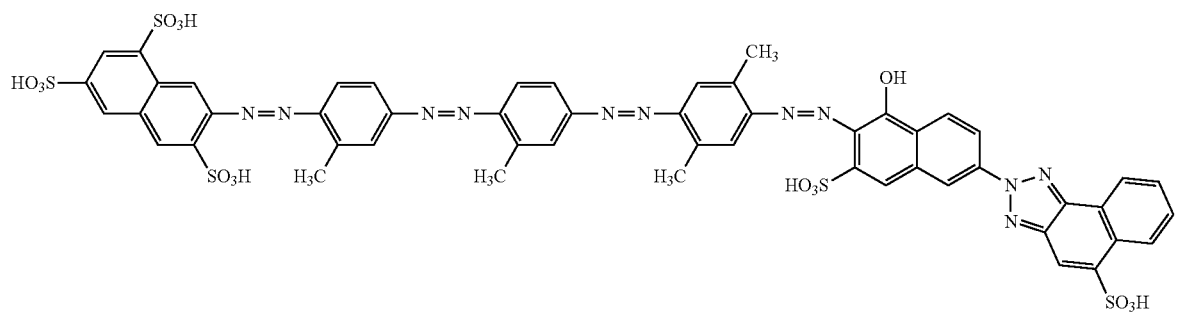
[Chemical Example 7-67]
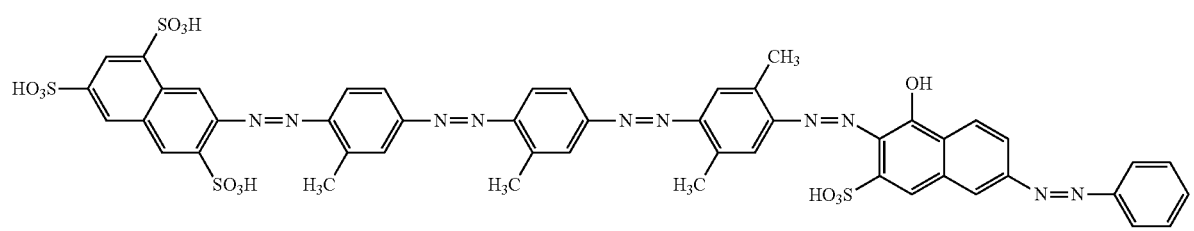

[Chemical Example 7-68]
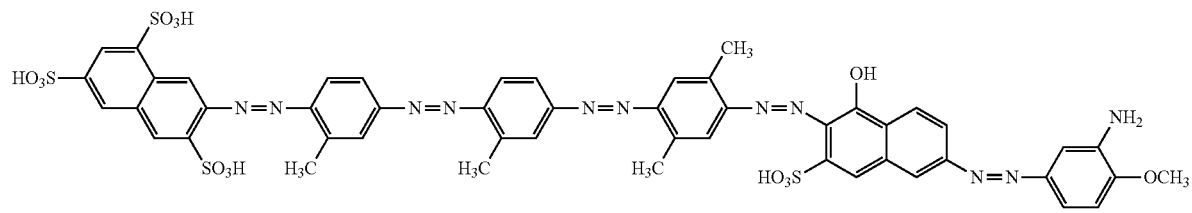
[Chemical Example 7-69]
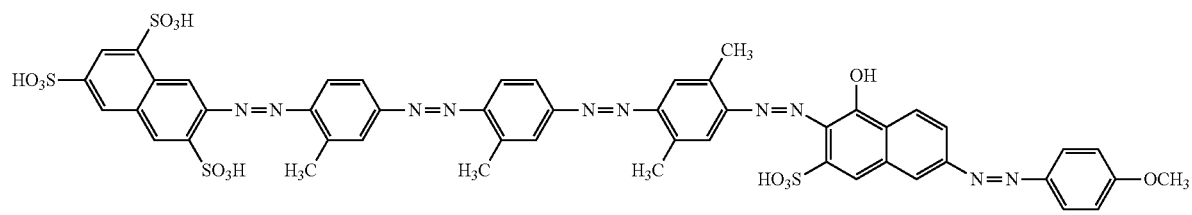
[Chemical Example 7-70]
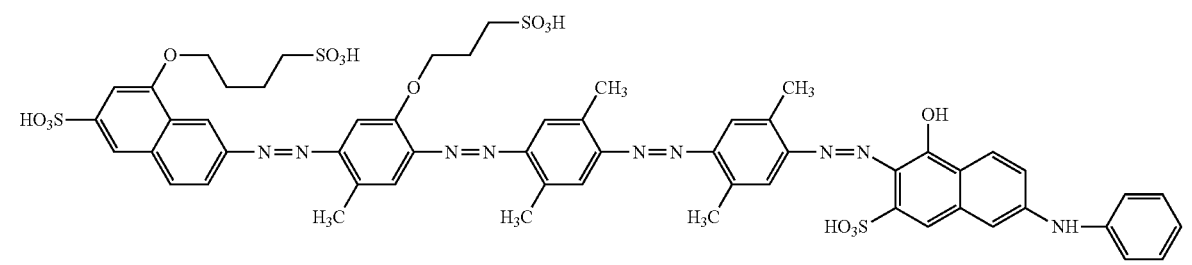
[Chemical Example 7-71]
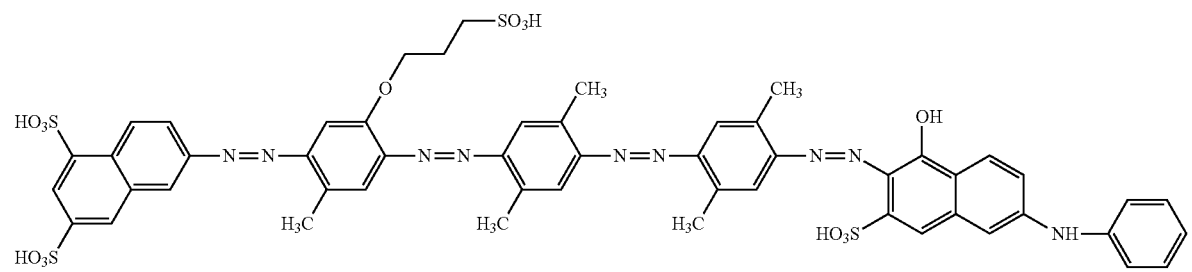
[Chemical Example 7-72]
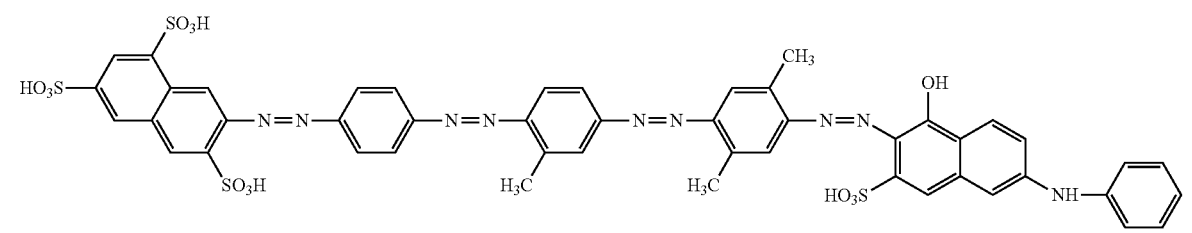
[Chemical Example 7-73]
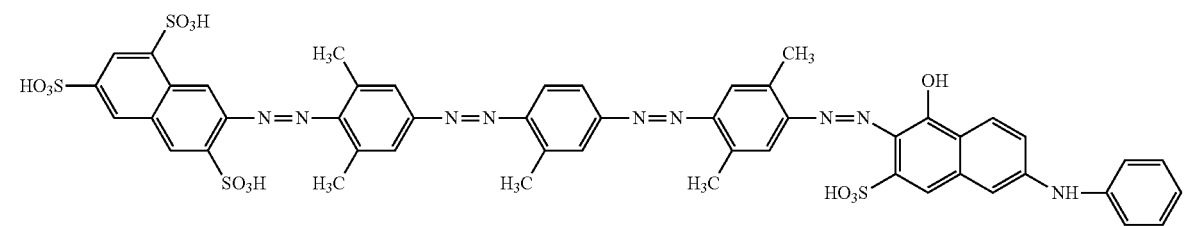

[Chemical Example 7-74]
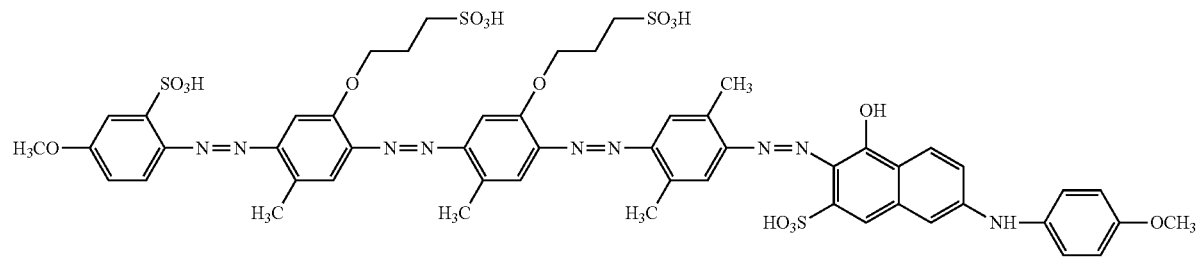
[Chemical Example 7-75]
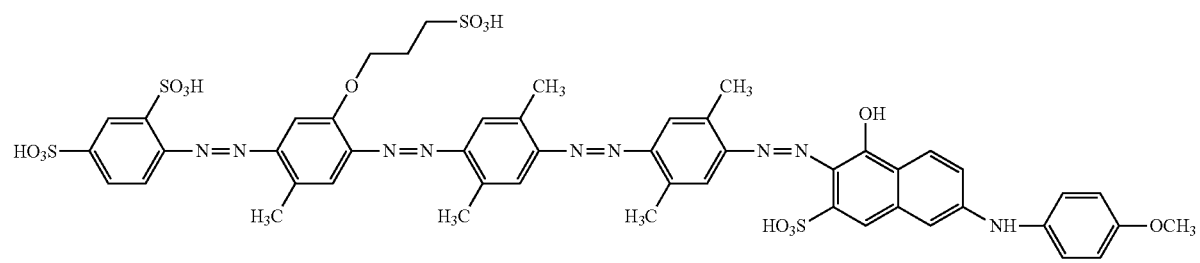
[Chemical Example 7-76]
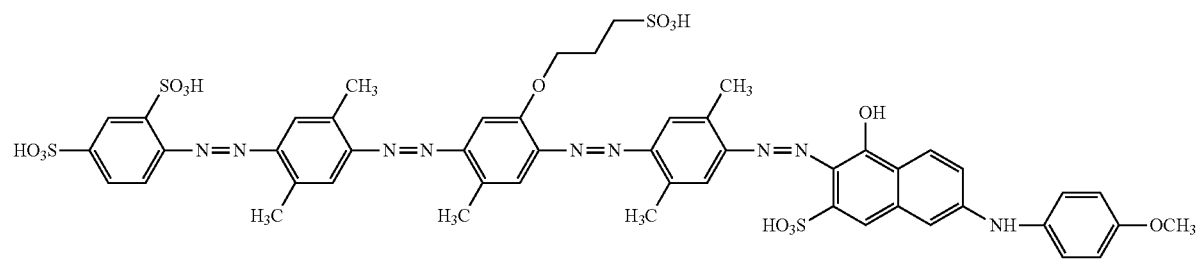
[Chemical Example 7-77]
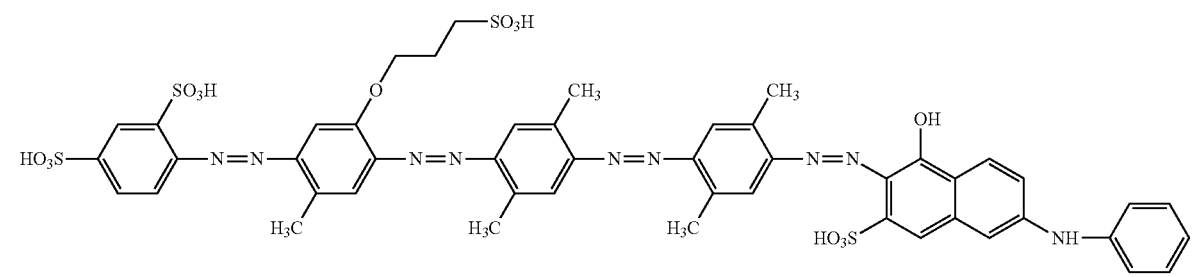
[Chemical Example 7-78]
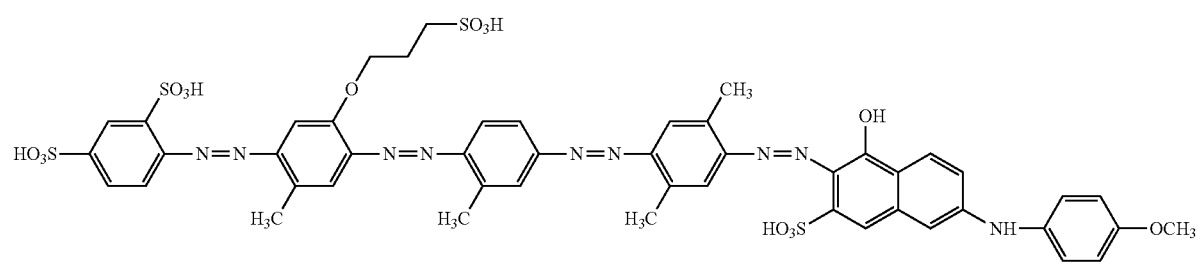

-continued
[Chemical Example 7-79]
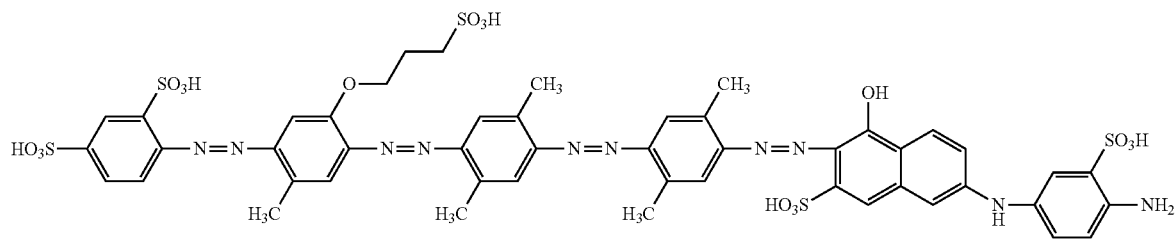
[Chemical Example 7-80]
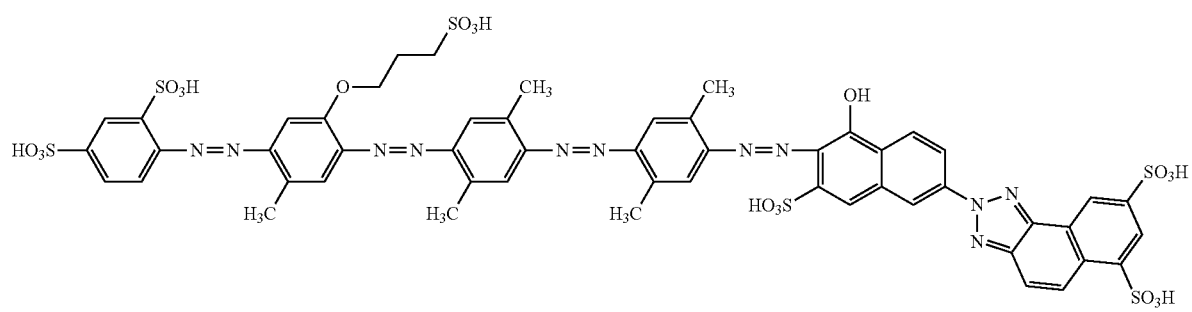
[Chemical Example 7-81]
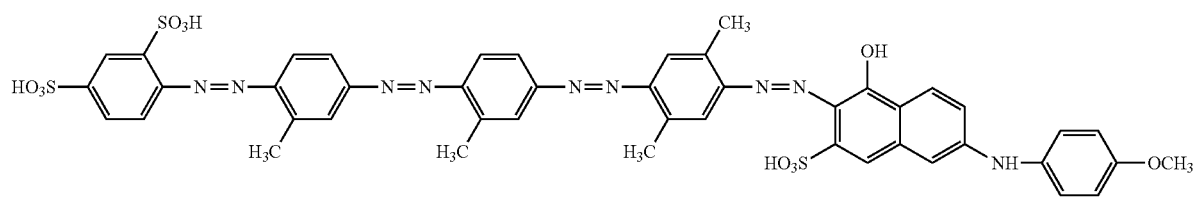
[Chemical Example 7-82]
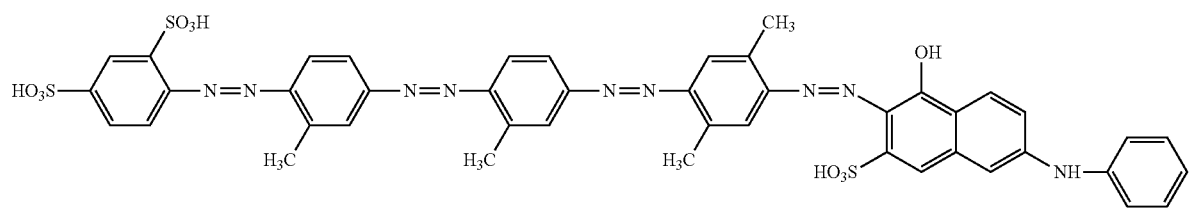
[Chemical Example 7-83]
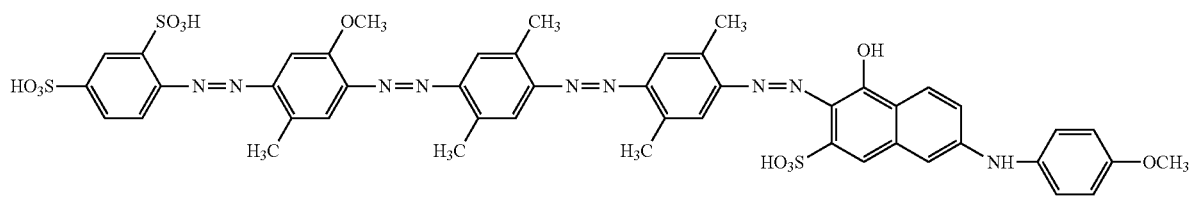
[Chemical Example 7-84]
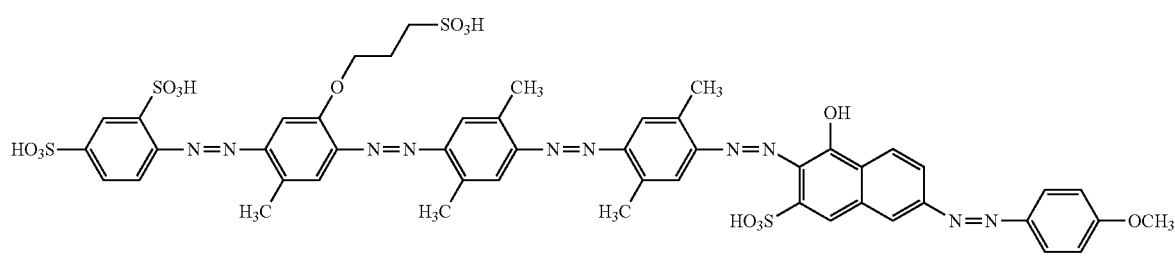

[Chemical Example 7-85]
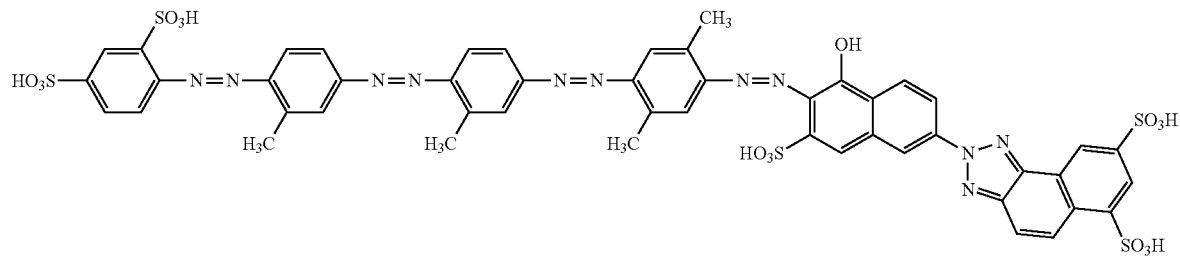
[Chemical Example 7-86]
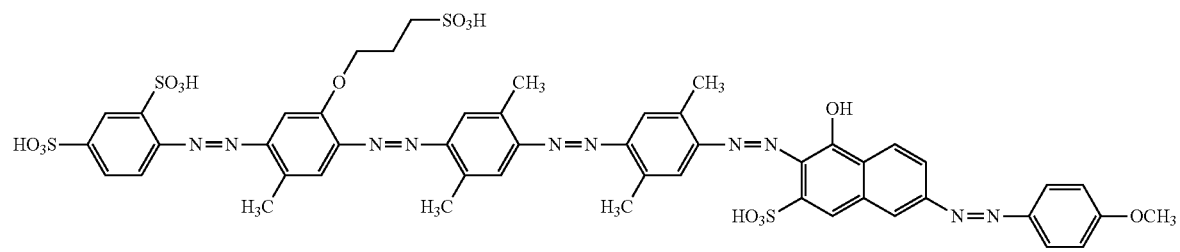
[Chemical Example 7-87]
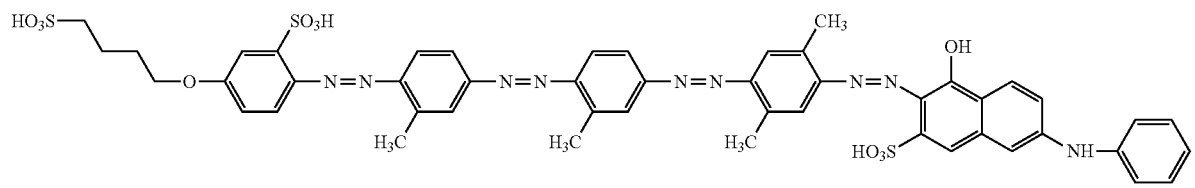
[Chemical Example 7-88]
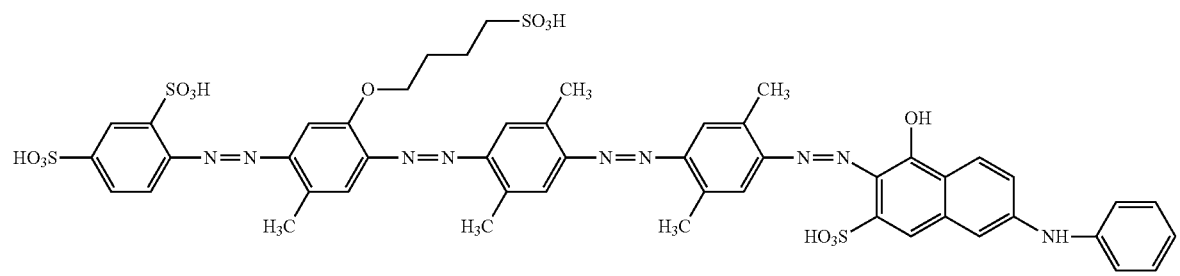
[Chemical Example 7-89]
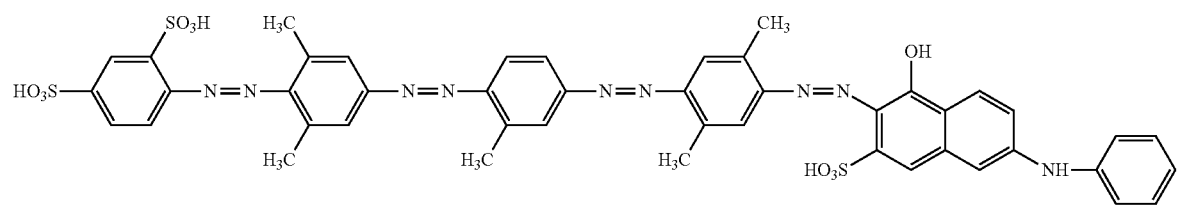
[Chemical Example 7-90]
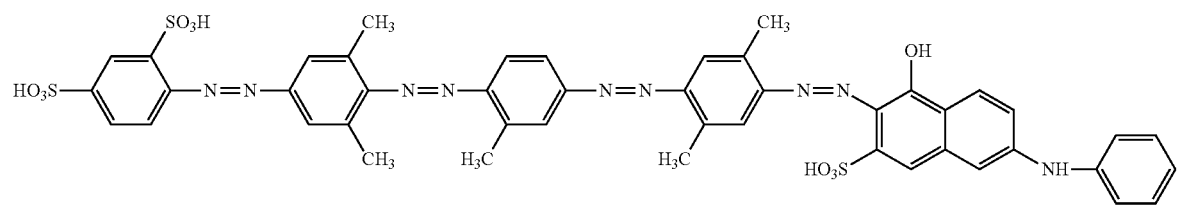

[Chemical Example 7-91]

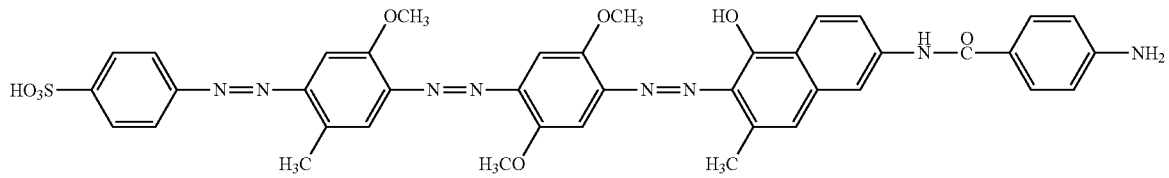

One of these azo compounds represented by Formula (7) may be singly used, or two or more of these may be used together.

Besides, the polarizer of the present disclosure may optionally contain, in addition to the azo compounds represented by Formulas (1) to (7), at least one of azo compounds described in a commercial available color index (C.I.) such as C.I. Direct Yellow 28, C.I. Direct Yellow 44, C.I. Direction Orange 6 and C.I. Direct Orange 26 as another dichroic dye. One of such azo compounds may be singly used, or two or more of these may be used together.

Besides, the polarizer of the present disclosure may optionally contain, in the base, iodine as a dichroic pigment as long as the desired durability is not impaired. The content of iodine in the base is not especially limited as long as the desired durability is not impaired, and may be appropriately adjusted.

In the present disclosure, the azo compounds represented by Formulas (1) to (7), the azo compounds listed in the C.I., and the azo compounds mentioned as the compound examples above may be in the form of a free acid or in the form of a salt. Examples of the salt include alkali metal salts such as a lithium salt, a sodium salt and a potassium salt, and organic salts such as an ammonium salt and an amine salt, and a sodium salt is preferably used.

The polarizer of the present disclosure contains, in the base, at least one azo compound represented by Formula (1) and at least one of the azo compounds represented by Formula (2-I) to Formula (5-II). Besides, the polarizer of the present disclosure may optionally further contain at least one azo compound represented by Formula (6). In addition, the polarizer of the present disclosure may also optionally further contain any of the dichroic dyes listed in the C.I. and/or the iodines as dichroic pigment. Besides, if the polarizer of the present disclosure uses the compound represented by Formula (5-I) or Formula (5-II), it may optionally further contain the azo compound represented by Formula (7) in the base. According to the polarizer of the present disclosure, performances such as single transmittance can be set in preferable ranges described below.

In the polarizer of the present disclosure, a mixing ratio among the used azo compounds is suitably adjusted so as to cause the resultant transmittance to fall in the preferable range described below. The polarization performance of a polarizer is varied not only depending on the mixing ratio among the respective azo compounds used in the polarizer but also depending on various factors including the degree of swelling and a stretch ratio of the base to which the azo compounds are adsorbed, a dyeing time, a dyeing temperature, pH at the time of dyeing, the influence of a salt, and the like. Therefore, the mixing ratio among the respective azo compounds can be determined in accordance with the degree of swelling of the base, the temperature, the time and pH at the time of dyeing, the type of the salt, the concentration of the salt, and the stretch ratio. Such adjustment of the mixing ratio can be appropriately performed based on description given below.

(Transmittance)

The polarizer of the present disclosure preferably has specific transmittance. The transmittance at each wavelength is measured in accordance with JIS Z 8722:2009. For measuring the transmittance, a measurement sample (for example, a polarizer or a polarizing plate) is measured for spectral transmittance at intervals of 5 nm or 10 nm in a wavelength range of 400 to 700 nm, and the resultant spectral transmittance is corrected based on the luminous efficiency using a 2-degree visual field (illuminant C).

(Single Transmittance)

The polarizer of the present disclosure preferably has single transmittance of 35% to 70%. The single transmittance is transmittance obtained from a single measurement sample (for example, a polarizer or a polarizing plate) as transmittance corrected based on the luminous efficiency in accordance with JIS Z 8722:2009. As the performance of a polarizing plate, higher transmittance is required, but if the single transmittance is 35% to 70%, brightness can be expressed without causing any problem when a polarizer having this single transmittance is used in a display device. The single transmittance exceeding 70% is not preferable because the degree of polarization may be greatly lowered in some cases. On the other hand, since there is a tendency that as the transmittance is higher, the degree of polarization is lower, the single transmittance is more preferably 35% to 60%, further more preferably 37% to 55% and particularly preferably 39% to 50% from the viewpoint of balance with the degree of polarization.

The degree of polarization of the polarizer here is preferably 50% to 100%, more preferably 80% to 100%, further more preferably 95% to 100% and particularly preferably 99% to 100%. A higher degree of polarization is preferred, but in the relationship between the degree of polarization and the transmittance, depending on whether the brightness is regarded more significant or the degree of polarization (or contrast) is regarded more significant, the transmittance and the degree of polarization can be suitably adjusted so that the polarizer can be applied to a display device or the like.

Next, production method for the polarizer will be concretely described on the assumption, for example, that a polarizer is produced by causing azo compounds to be adsorbed onto a base of, for example, a polyvinyl alcohol-based resin. It is noted that the production method for the polarizer of the present disclosure is not limited to the following production method.

(Preparation of Raw Material Film)

First, a raw material film to be used as a base for containing the azo compounds of the present disclosure is prepared. The raw material film can be produced by forming a polyvinyl alcohol-based resin into a film. The polyvinyl alcohol-based resin is not especially limited, and a commercially available resin may be used or a resin synthesized by a known method may be used. The polyvinyl alcohol-based resin can be obtained by, for example, saponificating a polyvinyl acetate-based resin. Examples of the polyvinyl acetate-based resin include polyvinyl acetate that is a homopolymer of vinyl acetate, and copolymers of vinyl acetate and other monomers copolymerizable with this. Examples of the other monomers to be copolymerized with vinyl acetate include unsaturated carboxylic acids, olefins, vinyl ethers and unsaturated sulfonic acids. The degree of saponification of the polyvinyl alcohol-based resin is preferably 85 to 100 mol % in general, and more preferably 95 mol % or more. The polyvinyl alcohol-based resin may be further modified, and for example, polyvinyl formal or polyvinyl acetal obtained by modification with aldehydes may be used. Besides, the degree of polymerization of the polyvinyl alcohol-based resin means a viscosity average degree of polymerization, can be obtained by a method(s) known in this technical field, and is preferably about 1,000 to 10,000 in general, and more preferably about 1,500 to 6,000.

A method for forming the polyvinyl alcohol-based resin into a film is not especially limited, and the film formation can be practiced by any known method. A polyvinyl alcohol-based resin film obtained in this case may contain glycerin, ethylene glycol, propylene glycol, low molecular weight polyethylene glycol or the like as plasticizer. The content of the plasticizer is preferably5 to 20% by mass and more preferably 8 to 15% by mass based on the whole film. The thickness of the raw material film is not especially limited, and is, for example, about 5 μm to 150 μm, and preferably about 10 μm to 100 μm.

(Swelling Step)

Next, the raw material film obtained by the aforementioned step is subjected to a swelling treatment. The swelling treatment is preferably performed by dipping the raw material film in a solution of 20 to 50° C. for 30 seconds to 10 minutes, and the solution is preferably water. The stretch ratio of the raw material film obtained through the swelling is preferably adjusted to 1.00 to 1.50 times, and more preferably 1.10 to 1.35 times. If the time necessary for producing the polarizer is desired to be shortened, the swelling treatment may be omitted because the raw material film is also swollen in a dyeing treatment described below.

(Dyeing Step)

Subsequently, the azo compounds used in the present disclosure are adsorbed to and impregnated in the resin film obtained by subjecting the raw material film to the above-described swelling treatment. If the swelling step is omitted, the swelling treatment of the raw material film may be simultaneously performed in this dyeing step. A treatment for absorbing and impregnating the azo compounds corresponds to a step of coloring the resin film, and hence this step is designated as the dyeing step. In the dyeing step, a color(s) to be applied to the resin film may be adjusted, for example, by using any azo compounds corresponding to dichroic dyes exemplarily described in "Application of Functional Dyes", compiled under the supervision of Masahiro Irie, edition of the first copy, CMC Publishing Co., Ltd., June 2002, pp. 98-100 to the extent that the performance of the polarizer of the present disclosure is not impaired.

The dyeing step is not especially limited as long as the azo compounds used as the dichroic dyes are adsorbed to and impregnated in the resin film, and for example, the resin film is preferably colored by dipping in a dye solution, or the resin film may be colored by applying a dye solution. A concentration of each azo compound in the dye solution is not especially limited as long as the resin film is sufficiently colored, and can be adjusted, for example, in a range of 0.05 g/litter to 100 g/litter.

The temperature of the dye solution employed in the dyeing step is preferably 5 to 60° C., more preferably 20 to 50° C., and particularly preferably 35 to 50° C. Besides, the time for dipping the resin film in the dye solution can be appropriately adjusted, and is adjusted preferably in a range of 30 seconds to 20 minutes, and more preferably 1 to 10 minutes.

The dye solution may further contain a dyeing auxiliary if necessary in addition to the azo compounds used in the present disclosure. Examples of the dyeing auxiliary include sodium carbonate, sodium hydrogen carbonate, sodium chloride, sodium sulfate, anhydrous sodium sulfate and sodium tripolyphosphate. The content of the dyeing auxiliary can be optionally adjusted depending on the dipping time and the temperature of the dye solution based on the dyeability of the used dye, and is preferably 0.01 to 5% by mass and more preferably 0.1 to 2% by mass in the dye solution.

(Washing Step 1)

After the dyeing step, a washing step (hereinafter also referred to as the "washing step 1") may be performed for removing the dye solution adhering to the surface of the resin film in the dyeing step. If the washing step 1 is performed, a dye (dyes) remaining on the surface of the resin film can be inhibited from migrating into solution used for a next treatment. In the washing step 1, water is generally used as a washing liquid. As a washing method, the dyed resin film is preferably dipped in the washing liquid, and alternatively, the resin film can be washed by applying the washing liquid thereto. A washing time is not especially limited, and is preferably 1 to 300 seconds, and more preferably 1 to 60 seconds. A temperature of the washing liquid used in the washing step 1 needs to be a temperature at which the material of the resin film (such as a hydrophilic polymer, that is, the polyvinyl alcohol-based resin in this case) does not melt, and in general, a washing treatment is performed at 5 to 40° C. However, the washing step 1 may be omitted because the performance of the resultant polarizer is not particularly largely affected even if the washing step 1 is not performed.

(Step of Causing Film to Contain Crosslinking Agent and/or Water Resistance Agent)

After the dyeing step or the washing step 1, crosslinking agent and/or water resistance agent can be contained. As a method for causing the crosslinking agent and/or the water resistance agent to be contained in the resin film, the resin film is preferably dipped in a treatment solution containing the crosslinking agent and/or the water resistance agent, and alternatively, the treatment solution may be applied or coated onto the resin film. The treatment solution contains at least one crosslinking agent and/or water resistance agent, and a solvent. A temperature of the treatment solution is preferably 5 to 70° C., and more preferably 5 to 50° C. Besides, a treatment time in this step is preferably 30 seconds to 6 minutes, and more preferably 1 to 5 minutes.

As the crosslinking agent, for example, boric acid, a boron compound such as borax or ammonium borate, a polyaldehyde such as glyoxal or glutaraldehyde, a polyisocyanate-based compound such as biuret, isocyanurate or blocked isocvanate, or a titanium-based compound such as titanium oxysulfate can be used. In addition, ethylene glycol glycidyl ether, polyamide-epichlorohydrin or the like may be used. Examples of the water resistance agent include peroxide succinate, ammonium persulfate, calcium perchlorate, benzoin ethyl ether, ethylene glycol diglycidyl ether, glycerin diglycidyl ether, ammonium chloride and magnesium chloride, and boric acid is preferably used. The solvent for the crosslinking agent and/or the water resistance agent is not especially limited, and water is preferably used. A concentration of the crosslinking agent and/or the water resistance agent in the treatment solution can be appropriately determined in accordance with the type of the agent, and for example, if boric acid is used, the concentration of boric acid in the treatment solution is preferably 0.1 to 6.0% by mass, and more preferably 1.0 to 4.0% by mass. Incidentally, if the time necessary for producing the polarizer is desired to be shortened, or if there is no need to perform a crosslinking treatment or water resistance treatment, this treatment step may be omitted.

(Stretching Step)

After performing the dyeing step, or optionally after performing the washing step 1 or the step of causing the crosslinking agent and/or the water resistance agent to be contained, a stretching step is performed. The stretching step is performed by uniaxially stretching the resin film. A stretching method may be either a wet stretching method or a dry stretching method. A draw ratio is preferably 3 times or more, and more preferably 5 to 8 times.

In the dry stretching method, if stretching heating medium is an air medium, the resin film is stretched preferably with the temperature of the air medium set to normal temperature to 180° C. Besides, the stretching is performed preferably under a humidity environment of 20 to 95% RH. Examples of a heating method for the resin film include a roll zone stretching method, a roll heat stretching method, a hot rolling method and an infrared heat stretching method, but the method is not limited to these stretching methods. The dry stretching step may be performed as single-stage stretching or as multi-stage stretching including two or more stages.

In the wet stretching method, the resin film is stretched preferably in water, water-soluble organic solvent or a mixed solution thereof. More preferably, the stretching treatment is performed with the resin film dipped in a solution containing at least one crosslinking agent and/or water resistance agent. As the crosslinking agent and the water resistance agent, any of the crosslinking agents and the water resistance agents described above with respect to the step of causing the crosslinking agent and/or the water resistance agent to be contained can be used. A concentration of the crosslinking agent and/or the water resistance agent in the solution employed in the stretching step is preferably 0.5 to 15% by mass, and more preferably 2.0 to 8.0% by mass. Stretching temperature is preferably 40 to 60° C., and more preferably 45 to 58° C. Stretching time is generally 30 seconds to 20 minutes, and preferably 2 to 5 minutes. The wet stretching step may be performed as single-stage stretching or as multi-stage stretching including two or more stages.

(Washing Step 2)

After performing the stretching step, the crosslinking agent and/or the water resistance agent may be deposited on or foreign matters may adhere to the surface of the resin film, and therefore, a washing step for washing the surface of the resin film (hereinafter also referred to as the "washing step 2") may be optionally performed. Washing time is preferably 1 second to 5 minutes. As a washing method, the resin film is preferably dipped in washing liquid, and alternatively, the washing liquid may be applied to or coated on the resin film for washing. The washing liquid is preferably water. The washing treatment may be performed as a single-stage treatment, or as a multi-stage treatment including two or more stages. A temperature of the washing liquid is not especially limited, and is generally 5 to 50° C., and preferably 10 to 40° C.

Examples of the treatment solution or the solvent thereof used in each of the aforementioned treatment steps include, in addition to water, dimethyl sulfoxide, N-methyl pyrrolidone, alcohols such as methanol, ethanol, propanol, isopropyl alcohol, glycerin, ethylene glycol, propylene glycol, diethylene glycol, triethylene glycol, tetraethylene glycol and trimethylol propane, and amines such as ethylenediamine and diethylenetriamine. The treatment solution or the solvent thereof is not limited to these, and is most preferably water. Besides, one of these treatment solutions and the solvents thereof may be singly used, or a mixture of two or more of these may be used.

(Drying Step)

After the stretching step or the washing step 2, drying step for the resin film is performed. The drying step may be performed by natural drying, but in order to improve drying efficiency, it may be performed by roll compression, surface moisture removal using an air knife or a water-absorbing roll, or the like, and furthermore, blow drying may be also performed. A temperature of the drying treatment is preferably 20 to 100° C., and more preferably 60 to 100° C. A drying time is preferably 30 seconds to 20 minutes, and more preferably 5 to 10 minutes.

Through the above-described method, the polarizer of the present disclosure containing the aforementioned azo compounds can be produced. Such a polarizer shows a higher degree of polarization and higher contrast than a conventional polarizer, and further has higher durability than a conventional dye-based polarizing plate.

<Polarizing Plate>

The polarizing plate of the present disclosure includes the above-described polarizer containing the azo compounds m the base thereof, and a transparent protection layer provided on one surface or both surfaces of the polarizer. The transparent protection layer is used for improving water resistance, handleability and the like of the polarizer.

The transparent protection layer is a protection film made of a transparent substance. The protection film is a film in a layered shape capable of retaining the shape of the polarizer, and is preferably made of a plastic material or the like excellent in transparency, mechanical strength, thermal stability, a water-blocking property and the like, and alternatively, a protection film made of another material capable of showing functions equivalent to those of the plastic material may be used. Examples of the plastic material constituting the protection film include films made of thermoplastic resins such as polyester-based resins, acetate-based resins, polyether sulfone-based resins, polycarbonate-based resins, polyamide-based resins, polyimide-based resins, polyolefin-based resins and acrylic-based resins, and acrylic-based, urethane-based, acrylic urethane-based, epoxy-based and silicone-based thermosetting resins or UV curable resins, and among these, examples of the polyolefin-based resins include amorphous polyolefin-based resins having a polymerization unit of cyclic polyolefin such as a norbornene: based monomer or a polycyclic norbornene-based monomer. In general, a protection film not impairing the performance of the polarizer is preferably selected, and as such a protection film, triacetyl cellulose (TAC) of a cellulose acetate-based resin or norbornene is particularly preferred. Besides, the protection film may be subjected to a hard coat treatment or an antireflection treatment, or a treatment for preventing sticking or for diffusion, anti-glare or the like as long as the effects of the present disclosure are not impaired. A thickness of the transparent protection layer can be appropriately designed in accordance with use of the polarizer, is preferably 1 µm to 200 µm, more preferably 5 µm to 150 µm, and particularly preferably 10 µm to 100 µm.

The polarizing plate preferably further includes, between the transparent protection layer and the polarizer, an adhesive layer for causing the transparent protection layer to adhere to the polarizer. An adhesive constituting the adhesive layer is not especially limited, and is preferably a polyvinyl alcohol-based adhesive. Examples of the polyvinyl alcohol-based adhesive include, but are not limited to, Gohsenol NH-26 (manufactured by Nippon Synthetic Chemical Industry Co., Ltd.) and Exceval RS-2117 (manufactured by Kuraray Co., Ltd.). Besides, a crosslinking agent and/or a water resistance agent can be added to the adhesive. As a polymer constituting the polyvinyl alcohol:based adhesive, a maleic anhydride-isobutylene copolymer is preferably used, and an adhesive mixedly containing a crosslinking agent may be used if necessary. Examples of the maleic anhydride-isobutylene copolymer include Isobam #18 (manufactured by Kuraray Co., Ltd.), Isobam #04 (manufactured by Kuraray Co., Ltd.), ammonia-modified Isobam #104 (manufactured by Kuraray Co., Ltd.), ammonia-modified Isobam #110 (manufactured by Kuraray Co., Ltd.), imidized. Isobam #304 (manufactured by Kuraray Co., Ltd.) and imidized Isobam #310 (manufactured by Kuraray Co., Ltd.). As the crosslinking agent, a water-soluble polyepoxy compound can be used. Examples of the water-soluble polyepoxy compound include Denacol EX-521 (manufactured by Nagase Chemtex Corporation) and TETRAD-C (manufactured by Mitsui Gas Chemical Company, Inc.). Alternatively, as an adhesive excluding the polyvinyl alcohol-based resin, any of known urethane-based, acrylic-based and epoxy-based adhesives can be used. In particular, acetoacetyl group-modified polyvinyl alcohol is preferably used, and polyaldehyde is preferably used as the crosslinking agent therefor. Besides, from the viewpoint of improving adhesive strength of the adhesive or improving water resistance, any of additives such as zinc compounds, chlorides and iodides can be singly or together contained in a concentration of about 0.1 to 10% by mass in the adhesive. The additives that can be contained in the adhesive are not especially limited and can be appropriately selected. After causing the transparent protection layer and the polarizer to adhere to each other with the adhesive, the resultant is dried or heated at an appropriately temperature, and thus, the polarizing plate can be produced.

If the polarizing plate is laminated onto a display device such as a liquid crystal display or an organic electroluminescence (commonly known as an OLED or an OEL), various functional layer(s) for viewing angle improvement and/or contrast improvement, or a layer or a film having a brightness enhancing property can be provided on the surface of the protection layer or protection film not exposed after the lamination. The functional layer is, for example, a layer or a film controlling a phase difference. The polarizing plate is preferably laminated onto such a film or a display device with an adhesive.

Besides, the polarizing plate may appropriately include, on an exposed surface of the protection layer or protection film, any of various known functional layer(s) such as an antireflection layer, an anti-glare layer and a hard coat layer. If such the layer having any of various functions is to be formed, a method for coating the exposed surface of the protection layer or protection film with a material having any of various functions is preferably employed, and alternatively, a layer or a film having such a function can be laminated onto the exposed surface of the protection layer or protection film with an adhesive or a pressure sensitive adhesive.

The polarizing plate of the present disclosure is a highly durable polarizing plate that can realize achromaticity while having high transmittance and a high degree of polarization, can particularly express white color like that of high quality paper in displaying white color, and can express neutral black color in displaying black color.

The polarizer or the polarizing plate of the present disclosure is provided, if necessary, with a protection layer and/or a functional layer, and further with a transparent support of glass, quartz, sapphire or the like, and is applied to a liquid crystal projector, a calculator, a watch, a notebook personal computer, a word processor, a liquid crystal television set, a polarizing lens, polarized glasses, a car navigation system, or indoor/outdoor measuring instrument or display. In particular, the polarizer or the polarizing plate of the present disclosure is suitably used in a liquid crystal display device such as a reflective liquid crystal display device, a transflective liquid crystal display device or an organic electroluminescence. A liquid crystal display device using the polarizer or the polarizing plate of the present disclosure can express white color like that of high quality paper and neutral black color. Besides, the liquid crystal display device using the polarizer or the polarizing plate of the present disclosure is a liquid crystal display device having high durability, high reliability and high contrast for a long period of time, and high color reproducibility.

EXAMPLES

The present disclosure will now be described in more details with reference to examples, and it is noted that the present disclosure is not limited to these aspects.

In each of Examples 1 to 26 described below, a polarizer containing, in a base thereof, an azo compound represented by Formula (1) as the compound A, an azo compound represented by Formula (2-I) or Formula (2-II) as the compound B, optionally an azo compound represented by Formula (6) as the compound C, and optionally another dichroic dye, and a polarizing plate using the polarizer were produced.

Example 1

(Synthesis of Compound Example 1-5)

After dissolving 12.0 parts by mass of a compound of Formula (8) obtained by a known method in 500 parts by mass of water, a solution containing 2.0 parts by mass of phenyl chlorocarbonate was added to the resultant solution, in a dropwise manner at 50° C. or less over 60 minutes while adjusting pH of the solution to 7 to 8 by adding a 15% sodium carbonate aqueous solution, and after the dropwise addition, the resultant solution was stirred for 120 hours to react the compound of Formula (8). After the reaction, an insoluble content was removed by filtration, ethanol was added to a filtrate to deposit crystal, the crystal was purified, and thus, Compound Example 1-5 having the structure of Formula (1) to be used in the present disclosure was obtained.

Formula (8)

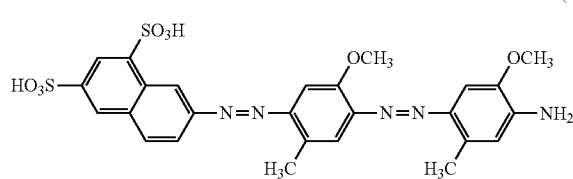

Formula (9)

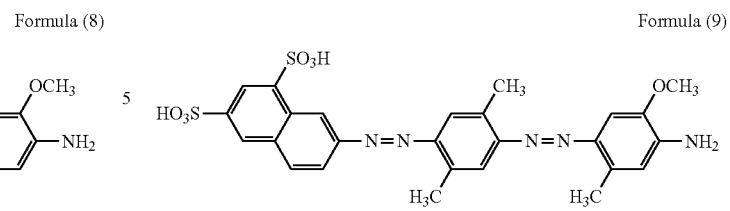

[Production of Polarizer and Polarizing Plate]

A polyvinyl alcohol resin film (manufactured by Kuraray Co., Ltd., VF series) having a degree of saponification of 99% or more and a thickness of 40 µm was subjected to a swelling treatment by dipping in warm water at 40° C. for 3 minutes. The thus swollen film was dipped in an aqueous solution containing 0.5 parts by mass of the azo compound corresponding to Compound Example 1-5 having the structure of (1) synthesized as described above, 1.1 parts by mass of an azo compound corresponding to Compound Example 2-6 having the structure of Formula (2-I), 1.5 parts by mass of sodium tripolyphosphate, 1.5 parts by mass of anhydrous sodium sulfate and 1500 parts by mass of water, at 45° C. for 6 minutes, so as to cause the azo compounds to be contained therein. The film containing the azo compounds was washed with water, and after the washing, a crosslinking treatment with boric acid was performed for 1 minute by using an aqueous solution at 40° C. containing 2% by mass of boric acid. The film resulting from the crosslinking treatment was subjected to a stretching treatment for 5 minutes in an aqueous solution at 58° C. containing 10% by mass of boric acid while stretching the film by 5.0 times. While keeping the state of tension of the stretched film, the film was subjected to a washing treatment with water at normal temperature for 20 seconds. The thus treated film was immediately subjected to a drying treatment at 60° C. for 5 minutes, and thus, a polarizer having a thickness of 15 µm was obtained. In the aforementioned manner, the polarizer according to the present disclosure containing the azo compound having the structure of Formula (1) and the azo compound having the structure of Formula (2-I) was produced. On each of both surfaces of the polarizer, an alkali-treated triacetyl cellulose film (manufactured by Fujifilm Corporation, TD-80U, hereinafter abbreviated as "TAC") having a thickness of 80 µm was stacked and then laminated with a polyvinyl alcohol adhesive, and thus, a polarizing plate of the present disclosure having a structure of TAC/adhesive layer/polarizer/adhesive layer/TAC was produced. The thus obtained polarizing plate retained optical performances, particularly single transmittance, hue, the degree of polarization and the like of the polarizer. This polarizing plate was used as a measurement sample of Example 1.

Example 2

A polarizer of the present disclosure containing an azo compound having the structure of Formula (1) and an azo compound having the structure of Formula (2-I), as well as a polarizing plate using the same were produced in the same manner as in Example 1 except that 12.0 parts by mass of the compound of Formula (8) was replaced with 11.6 parts by mass of a compound of Formula (9) obtained by a known method in the synthesis of Compound Example 1-5 so that an azo compound corresponding to Compound Example 1-2 having the structure of Formula (1) was synthesized, and this polarizing plate was used as a measurement sample of Example 2.

Example 3

A polarizer of the present disclosure containing an azo compound having the structure of Formula (1), an azo compound having the structure of Formula (2-I) and an azo compound having the structure of Formula (6), as well as a polarizing plate using the same were produced in the same manner as in Example 1 except that a film having been subjected to the swelling treatment in the production of the polarizer of Example 1 was dipped in an aqueous solution containing 0.55 parts by mass of the azo compound corresponding to Compound Example 1-5 having the structure of Formula (1) obtained by the synthesis, 1.1 parts by mass of the azo compound corresponding to Compound Example 2-6 having the structure of Formula (2-I), 0.15 parts by mass of an azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for adsorption of the azo compounds, and this polarizing plate was used as a measurement sample of Example 3.

Example 4

A polarizer containing an azo compound having the structure of Formula (1), an azo compound having the structure of Formula (2-I) and an azo compound having the structure of Formula (6), as well as a polarizing plate using the same were produced in the same manner as in Example 3 except that 0.55 parts by mass of the azo compound corresponding to Compound Example 1-5 having the structure of Formula (1) was replaced, in the production of the polarizer of Example 3, with 0.60 parts by mass of the azo compound corresponding to Compound Example 1-2 obtained by the synthesis in Example 2, and this polarizing plate was used as a measurement sample of Example 4.

Example 5

An azo compound corresponding to Compound Example 1-6 having the structure of Formula (1) was synthesized by replacing 12.0 parts by mass of the compound of Formula (8) with 11.6 parts by mass of a compound represented by Formula (10) in the synthesis of Compound Example 1-5 in Example 1. Besides, a polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment as in the production of the polarizer and the polarizing plate of Example 3 was dipped in an aqueous solution containing 0.48 parts by mass of an azo compound corresponding to Compound Example 1-6 having the structure of Formula (1) obtained by synthesis, 1.1 parts by mass of an azo compound corresponding to Compound Example 2-6 having the structure of Formula (2-I), 0.15 parts by mass of an azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 5.

Formula (10)

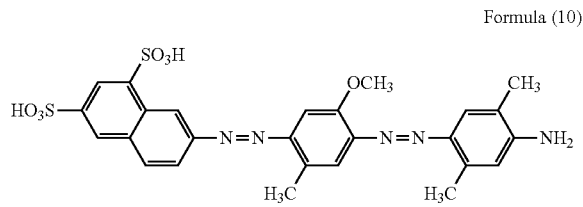 [SMILES: COc1cc(N=Nc2ccc3cc(S(=O)(=O)O)cc(S(=O)(=O)O)c3c2)c(C)cc1N=Nc1cc(C)c(N)cc1C]

Example 6

An azo compound corresponding to Compound Example 1-7 having the structure of Formula (1) was synthesized by replacing 12.0 parts by mass of the compound of Formula (8) with 10.7 parts by mass of a compound represented by Formula (11) in the synthesis of Compound Example 1-5 of Example 1. Besides, a polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer and the polarizing plate of Example 3 was dipped in an aqueous solution containing 0.78 parts by mass of the azo compound corresponding to Compound Example 1-7 having the structure of Formula (1) obtained by the synthesis, 1.1 parts by mass of the azo compound corresponding to Compound Example 2-6 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 6.

Formula (11)

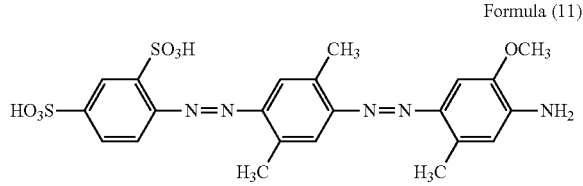 [SMILES: COc1cc(N=Nc2cc(C)c(N=Nc3ccc(S(=O)(=O)O)cc3S(=O)(=O)O)cc2C)c(C)cc1N]

Example 7

An azo compound corresponding to Compound Example 1-13 having the structure of Formula (1) was synthesized by replacing 12.0 parts by mass of the compound of Formula (8) with 12.7 parts by mass of a compound represented by Formula (12) in the synthesis of Compound Example 1-5 of Example 1. Besides, a polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer and the polarizing plate of Example 3 was dipped in an aqueous solution containing 0.78 parts by mass of the azo compound corresponding to Compound Example 1-13 having the structure of Formula (1) obtained by the synthesis, 1.1 parts by mass of the azo compound corresponding to Compound Example 2-6 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 7.

Formula (12)

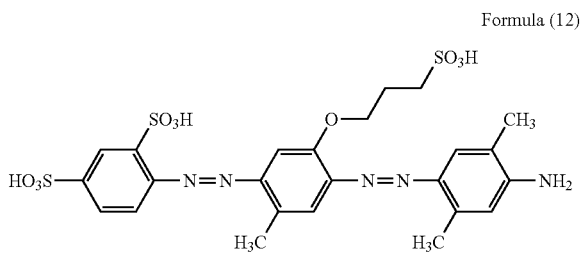 [SMILES: Cc1cc(N=Nc2cc(C)c(N=Nc3ccc(S(=O)(=O)O)cc3S(=O)(=O)O)cc2OCCCS(=O)(=O)O)c(C)cc1N]

Example 8

An azo compound corresponding to Compound Example 1-23 having the structure of Formula (1) was synthesized by replacing 12.0 parts by mass of the compound of Formula (8) with 13.86 parts by mass of a compound represented by Formula (13) in the synthesis of Compound Example 1-5 of Example 1. Besides, a polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer and the polarizing plate of Example 3 was dipped in an aqueous solution containing 0.45 parts by mass of the azo compound corresponding to Compound Example 1-23 having the structure of Formula (1) obtained by the synthesis, 1.1 parts by mass of the azo compound corresponding to Compound Example 2-6 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 8.

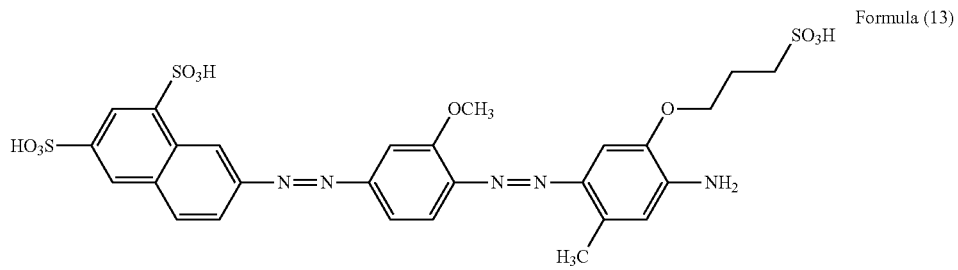 [SMILES: COc1cc(N=Nc2ccc3cc(S(=O)(=O)O)cc(S(=O)(=O)O)c3c2)ccc1N=Nc1cc(OCCCS(=O)(=O)O)c(N)cc1C]

Formula (13)

Example 9

An azo compound corresponding to Compound Example 1-22 having the structure of Formula (1) was synthesized by replacing 12.0 parts by mass of the compound of Formula (8) with 14.14 parts by mass of a compound represented by Formula (14) in the synthesis of Compound Example 1-5 of Example 1. Besides, a polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer and the polarizing plate of Example 3 was dipped in an aqueous solution containing 0.51 parts by mass of the azo compound corresponding to Compound Example 1-22 having the structure of Formula (1) obtained by the synthesis, 1.1 parts by mass of the azo compound corresponding to Compound Example 2-6 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 9.

Example 10

An azo compound corresponding to Compound Example 1-18 having the structure of Formula (1) was synthesized by replacing 12.0 parts by mass of the compound of Formula (8) with 12.8 parts by mass of a compound represented by Formula (15) in the synthesis of Compound Example 1-5 of Example 1. Besides, a polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer and the polarizing plate of Example 3 was dipped in an aqueous solution containing 0.51 parts by mass of the azo compound corresponding to Compound Example 1-18 having the structure of Formula (1) obtained by the synthesis, 1.1 parts by mass of the azo compound corresponding to Compound Example 2-6 having the structure of Formula (2-I), 0,15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 10.

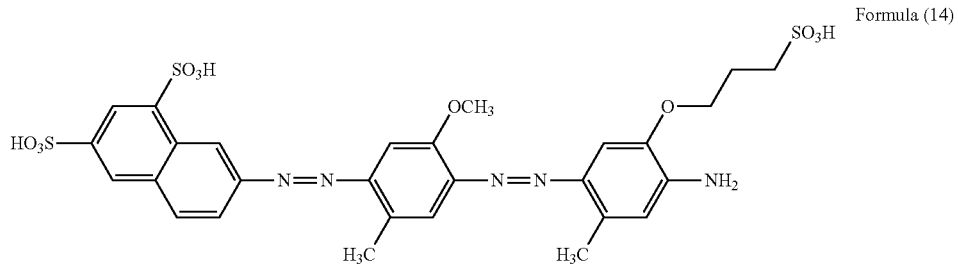 [SMILES: COc1cc(N=Nc2ccc3cc(S(=O)(=O)O)cc(S(=O)(=O)O)c3c2)c(C)cc1N=Nc1cc(OCCCS(=O)(=O)O)c(N)cc1C]

Formula (14)

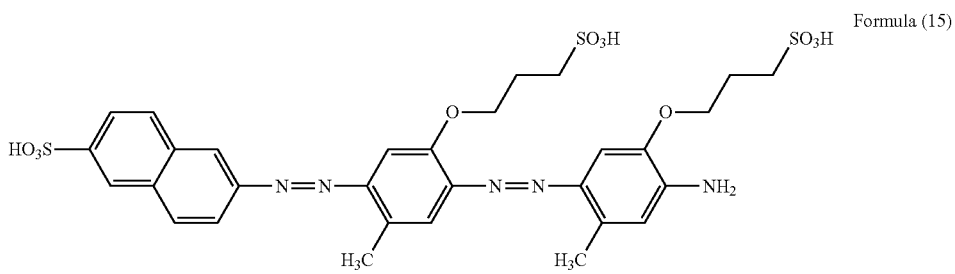 [SMILES: Cc1cc(N=Nc2cc(OCCCS(=O)(=O)O)c(N)cc2C)c(OCCCS(=O)(=O)O)cc1N=Nc1ccc2cc(S(=O)(=O)O)ccc2c1]

Formula (15)

Example 11

An azo compound corresponding to Compound Example 1-12 having the structure of Formula (1) was synthesized by replacing 12.0 parts by mass of the compound of Formula (8) with 15.3 parts by mass of a compound represented by Formula (16) in the synthesis of Compound Example 1-5 of Example 1, Besides, a polarizer containing an azo compound having the structure of Formula (1), an azo compound having the structure of Formula (2-I) and an azo compound having the structure of Formula (6) as well as a polarizing plate using the same were produced in the same manner as in Example 3 except that a film subjected to the swelling treatment in the production of the polarizer and the polarizing plate of Example 3 was dipped in an aqueous solution containing 0.82 parts by mass of the azo compound corresponding to Compound Example 1-12 having the structure of Formula (1) obtained by the synthesis, 1.1 parts by mass of the azo compound corresponding to Compound Example 2-6 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 11.

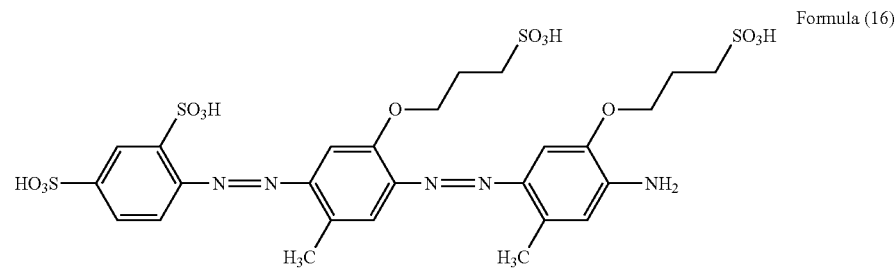 [SMILES: Cc1cc(N)c(OCCCS(=O)(=O)O)cc1N=Nc1cc(C)c(N=Nc2ccc(S(=O)(=O)O)cc2S(=O)(=O)O)cc1OCCCS(=O)(=O)O]

Formula (16)

Example 12

An azo compound corresponding to Compound Example 1-11 having the structure of Formula (1) was synthesized by replacing 12.0 parts by mass of the compound of Formula (8) with 16.3 parts by mass of a compound represented by Formula (17) in the synthesis of Compound Example 1-5 of Example 1. Besides, a polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer and the polarizing plate of Example 3 was dipped in an aqueous solution containing 1.0 part by mass of the azo compound corresponding to Compound Example 1-11 having the structure of Formula (1) obtained by the synthesis, 1.1 parts by mass of the azo compound corresponding to Compound Example 2-6 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 12.

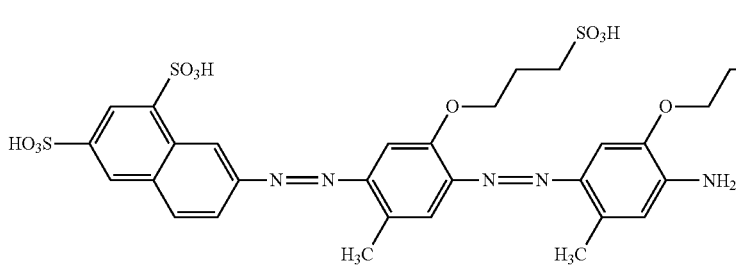

Formula (17)

Example 13

An azo compound corresponding to Compound Example 1-14 having the structure of Formula (1) was synthesized by replacing 12.0 parts by mass of the compound of Formula (8) with 15.0 parts by mass of a compound represented by Formula (18) in the synthesis of Compound Example 1-5 of Example 1. Besides, a polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer and the polarizing plate of Example 3 was dipped in an aqueous solution containing 0.96 parts by mass of the azo compound corresponding to Compound Example 1-14 having the structure of Formula (1) obtained by the synthesis, 1.1 parts by mass of the azo compound corresponding to Compound Example 2-6 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 13.

Compound Example 1-5 having the structure of Formula (1) obtained in Example 1, 1.1 parts by mass of an azo compound corresponding to Compound Example 2-2 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 14.

Example 15

A polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer and the polarizing plate of Example 3 was dipped in an aqueous solution containing 0.42 parts by mass of the azo compound corresponding to Compound Example 1-5 having the structure of Formula (1) obtained by the synthesis in Example 1, 1.3 parts by mass of an azo compound corresponding to Compound Example 2-21 having the structure of Formula (2-I), 0.15 parts by

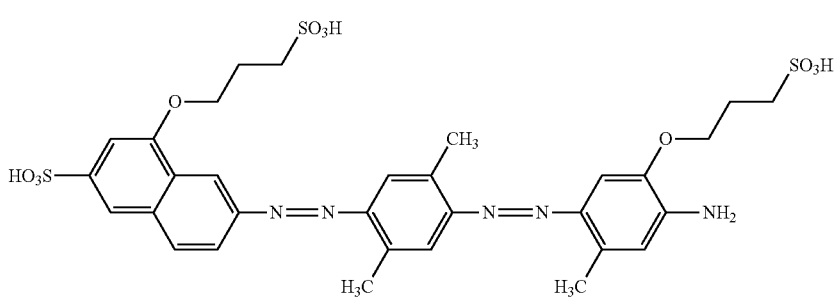

Formula (18)

Example 14

A polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer and the polarizing plate of Example 3 was dipped in an aqueous solution containing 0.42 parts by mass of the azo compound corresponding to mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 15.

Example 16

A polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer and the polarizing plate of Example 3 was dipped in an aqueous solution, containing 0.48 parts by mass of the azo compound corresponding to Compound Example 1-5 having the structure of Formula (1) obtained by the synthesis, 1.5 parts by mass of an azo compound corresponding to Compound Example 2-27 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 16.

Example 17

A polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer and the polarizing plate of Example 3 was dipped in an aqueous solution containing 0.52 parts by mass of the azo compound corresponding to Compound Example 1-5 having the structure of Formula (1) obtained by the synthesis, 2.3 parts by mass of an azo compound corresponding to Compound Example 2-14 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 17.

Example 18

A polarizer containing an azo compound having the structure of Formula (1), an azo compound having the structure of Formula (2-I) and an azo compound having the structure of Formula (6), as well as a polarizing plate using the same were produced in the same manner as in Example 8 except that a film subjected to the swelling treatment in the production of the polarizer and the polarizing plate of Example 8 was dipped in an aqueous solution containing 0.34 parts by mass of the azo compound corresponding to Compound Example 1-23 having the structure of Formula (1) obtained by the synthesis, 2.0 parts by mass of an azo compound corresponding to Compound Example 2-8 having the structure of Formula (2-I), 0.14 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 18.

Example 19

A polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer of Example 3 was dipped in an aqueous solution containing 0.57 parts by mass of the azo compound corresponding to Compound Example 1-5 having the structure of Formula (1) obtained by the synthesis, 3.0 parts by mass of an azo compound corresponding to Compound Example 2-26 having, the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 19.

Example 20

A polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer of Example 3 was dipped in an aqueous solution containing 0.50 parts by mass of the azo compound corresponding to Compound Example 1-5 having the structure of Formula (1) obtained by the synthesis, 3.5 parts by mass of an azo compound corresponding to Compound Example 2-15 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 20.

Example 21

A polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer of Example 3 was dipped in an aqueous solution containing 0.50 parts by mass of the azo compound corresponding to Compound Example 1-5 having the structure of Formula (1) obtained by the synthesis, 2.9 parts by mass of the azo compound corresponding to Compound Example 2-14 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 21.

Example 22

A polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer of Example 3 was dipped in an aqueous solution containing 0.50 parts by mass of the azo compound corresponding to Compound Example 1-5 having the structure of Formula (1) obtained by the synthesis, 2.4 parts by mass of an azo compound corresponding to Compound Example 2-19 having the structure of Formula (2-I), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 22.

Example 23

A polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer of Example 3 was dipped in an aqueous solution containing 0.50 parts by mass of the azo compound corresponding to Compound Example 1-5 having the structure of Formula (1) obtained by the synthesis, 2.9 parts by mass of an azo compound corresponding to Compound Example 2-31 having the structure of Formula (2-II), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 23.

Example 24

A polarizer containing an azo compound having the structure of Formula (1), an azo compound having the structure of Formula (2-II) and an azo compound having the structure of Formula (6), as well as a polarizing plate using the same were produced in the same manner as in Example 3 except that a film subjected to the swelling treatment in the production of the polarizer of Example 3 was dipped in an aqueous solution containing 0.45 parts by mass of the azo compound corresponding to Compound Example 1-5 having the structure of Formula (1) obtained by the synthesis, 2.5 parts by mass of an azo compound corresponding to Compound Example 2-47 having the structure of Formula (2-II), 0.15 parts by mass of the azo compound corresponding to Compound Example 6-2 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 24.

Example 25

A polarizer containing an azo compound having the structure of Formula (1), an azo compound having the structure of Formula (2-I) and an azo compound having the structure of Formula (6), as well as a polarizing plate using the same were produced in the same manner as in Example 3 except that a film subjected to the swelling treatment in the production of the polarizer of Example 3 was dipped in an aqueous solution containing 0.50 parts by mass of the azo compound corresponding to Compound Example 1-5 having the structure of Formula (1) obtained by the synthesis, 1.1 parts by mass of the azo compound corresponding to Compound Example 2-6 having the structure of Formula (2-I), 0.13 parts by mass of an azo compound corresponding to Compound Example 6-1 having the structure of Formula (6), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 25.

Example 26

A polarizer containing an azo compound having the structure of Formula (1), an azo compound having the structure of Formula (2-I) and an azo compound having a structure of the following Formula (19) listed in the C.I., as well as a polarizing plate using the same were produced in the same manner as in Example 3 except that a film subjected to the swelling treatment in the production of the polarizer of Example 3 was dipped in an aqueous solution containing 0.55 parts by mass of the azo compound corresponding to Compound Example 1-5 having the structure of Formula (1) obtained by the synthesis, 1.1 parts by mass of the azo compound corresponding to Compound Example 2-6 having the structure of Formula (2-I), 0.3 parts by mass of an azo compound corresponding to C.I. Direct Yellow 28 having the structure of Formula (19), 1.5 parts by mass of sodium tripolyphosphate, 1.5 parts by mass of anhydrous sodium sulfate and 1500 parts by mass of water, at 45° C. for 6 minutes for causing the azo compounds to be contained, and this polarizing plate was used as a measurement sample of Example 26.

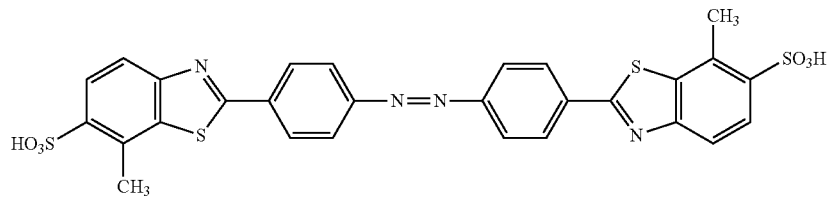

Formula (19)

The respective azo compounds used in Examples 1 to 26 and contents thereof are collectively shown in Table 1 below.

TABLE 1

| | Compound A | | Compound B | | Compound C | | Another Dichroic Dye | |
|---|---|---|---|---|---|---|---|---|
| | Compound Example | Content (Parts) | Compound Example | Content (Parts) | Compound Example | Content (Parts) | Compound | Content (Parts) |
| Example 1 | 1-5 | 0.5 | 2-6 | 1.1 | | | | |
| Example 2 | 1-2 | 0.5 | 2-6 | 1.1 | | | | |
| Example 3 | 1-5 | 0.55 | 2-6 | 1.1 | 6-2 | 0.15 | | |
| Example 4 | 1-2 | 0.6 | 2-6 | 1.1 | 6-2 | 0.15 | | |
| Example 5 | 1-6 | 0.48 | 2-6 | 1.1 | 6-2 | 0.15 | | |
| Example 6 | 1-7 | 0.78 | 2-6 | 1.1 | 6-2 | 0.15 | | |
| Example 7 | 1-13 | 0.78 | 2-6 | 1.1 | 6-2 | 0.15 | | |
| Example 8 | 1-23 | 0.45 | 2-6 | 1.1 | 6-2 | 0.15 | | |
| Example 9 | 1-22 | 0.51 | 2-6 | 1.1 | 6-2 | 0.15 | | |
| Example 10 | 1-18 | 0.51 | 2-6 | 1.1 | 6-2 | 0.15 | | |
| Example 11 | 1-12 | 0.82 | 2-6 | 1.1 | 6-2 | 0.15 | | |
| Example 12 | 1-11 | 1.0 | 2-6 | 1.1 | 6-2 | 0.15 | | |
| Example 13 | 1-14 | 0.96 | 2-6 | 1.1 | 6-2 | 0.15 | | |
| Example 14 | 1-5 | 0.42 | 2-2 | 1.1 | 6-2 | 0.15 | | |
| Example 15 | 1-5 | 0.42 | 2-21 | 1.3 | 6-2 | 0.15 | | |
| Example 16 | 1-5 | 0.48 | 2-27 | 1.5 | 6-2 | 0.15 | | |
| Example 17 | 1-5 | 0.52 | 2-14 | 2.3 | 6-2 | 0.15 | | |
| Example 18 | 1-23 | 0.34 | 2-8 | 2.0 | 6-2 | 0.14 | | |
| Example 19 | 1-5 | 0.57 | 2-26 | 3.0 | 6-2 | 0.15 | | |
| Example 20 | 1-5 | 0.5 | 2-15 | 3.5 | 6-2 | 0.15 | | |
| Example 21 | 1-5 | 0.5 | 2-14 | 2.9 | 6-2 | 0.15 | | |
| Example 22 | 1-5 | 0.5 | 2-19 | 2.4 | 6-2 | 0.15 | | |
| Example 23 | 1-5 | 0.5 | 2-31 | 2.9 | 6-2 | 0.15 | | |
| Example 24 | 1-5 | 0.45 | 2-47 | 2.5 | 6-2 | 0.15 | | |
| Example 25 | 1-5 | 0.5 | 2-6 | 1.1 | 6-1 | 0.13 | | |
| Example 26 | 1-5 | 0.55 | 2-6 | 1.1 | | | C.I. Direct Yellow 28 | 0.30 |

In each of Examples 27 to 47 described below, a polarizer containing, in a base thereof, an azo compound represented by Formula (1) as the compound A, an azo compound represented by Formula (3) as the compound B, optionally an azo compound represented by Formula (6) as the compound C, and optionally another dichroic dye, as well as a polarizing plate using the same were produced.

Example 27

A polarizer of the present disclosure containing an azo compound having the structure of Formula (1) and an azo compound having the structure of Formula (3), as well as a polarizing plate using the same were produced in the same manner as in Example 1 except that 0.76 parts by mass of an azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 1, and this polarizing plate was used as a measurement sample of Example 27.

Example 28

A polarizer of the present disclosure containing an azo compound having the structure of Formula (1) and an azo compound having the structure of Formula (3), as well as a polarizing plate using the same were produced in the same manner as in Example 2 except that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 2, and this polarizing plate was used as a measurement sample of Example 28.

Example 29

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 3 except that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 3, and this polarizing plate was used as a measurement sample of Example 29.

Example 30

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 4 except that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 4, and this polarizing plate was used as a measurement sample of Example 30.

Example 31

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 5 except that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 5, and this polarizing plate was used as a measurement sample of Example 31.

Example 32

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 6 except that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 6, and this polarizing plate was used as a measurement sample of Example 32.

Example 33

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 7 except that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 7, and this polarizing plate was used as a measurement sample of Example 33.

Example 34

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 8 except that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 8, and this polarizing plate was used as a measurement sample of Example 34.

Example 35

A polarizer of the present disclosure containing an azo compound having the structure of Formula (I), an azo compound having the structure of Formula (3) and an azo compound having the structure of Formula (6), as well as a polarizing plate using the same were produced in the same manner as in Example 9 except that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 9, and this polarizing plate was used as a measurement sample of Example 35.

Example 36

A polarizer of the present disclosure containing an azo compound having the structure of Formula (I), an azo compound having the structure of Formula (3) and an azo compound having the structure of Formula (6), as well as a polarizing plate using the same were produced in the same manner as in Example 10 except that the content of the azo compound corresponding to Compound Example 1-18 having the structure of Formula (1) was changed to 0.75 parts by mass, and that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 10, and this polarizing plate was used as a measurement sample of Example 36.

Example 37

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 11 except that the content of the azo compound corresponding to Compound Example 1-12 having the structure of Formula (1) was changed to 0.89 parts by mass, and that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 11, and this polarizing plate was used as a measurement sample of Example 37.

Example 38

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 12 except that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 12, and this polarizing plate was used as a measurement sample of Example 38.

Example 39

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 13 except that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 13, and this polarizing plate was used as a measurement sample of Example 39.

Example 40

A polarizer of the present disclosure containing an azo compound having the structure of Formula (1), an azo compound having the structure of Formula (3) and an azo compound having the structure of Formula (6), as well as a polarizing plate using the same were produced in the same mariner as in Example 14 except that 0.71 parts by mass of an azo compound corresponding to Compound Example 3-12 having the structure of Formula (3) was used instead of 1.1 parts by mass of the azo compound corresponding to Compound Example 2-2 having the structure of Formula (2-I) in the production of the polarizer of Example 14, and this polarizing plate was used as a measurement sample of Example 40.

Example 41

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 16 except that 0.85 parts by mass of an azo compound corresponding to Compound Example 3-1 having the structure of Formula (3) was used instead of 1.5 parts by mass of the azo compound corresponding to Compound Example 2-27 having the structure of Formula (2-I) in the production of the polarizer of Example 16, and this polarizing plate was used as a measurement sample of Example 41.

Example 42

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 17 except that 0.91 parts by mass of an azo compound corresponding to Compound Example 3-8 having the structure of Formula (3) was used instead of 2.3 parts by mass of the azo compound corresponding to Compound Example 2-14 having the structure of Formula (2-I) in the production of the polarizer of Example 17, and this polarizing plate was used as a measurement sample of Example 42.

Example 43

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 17 except that the content of the azo compound corresponding to Compound Example 1-5 having the structure of Formula (1) was changed to 0.54 parts by mass, and that 0.75 parts by mass of an azo compound corresponding to Compound Example 3-7 having the structure of Formula (3) was used instead of 2.3 parts by mass of the azo compound corresponding to Compound Example 2-14 having the structure of Formula (2-I) in the production of the polarizer of Example 17, and this polarizing plate was used as a measurement sample of Example 43.

Example 44

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 19 except that the content of the azo compound corresponding to Compound Example 1-5 having the structure of Formula (1) was changed to 0.34 parts by mass, and that 2.1 parts by mass of an azo compound corresponding to Compound Example 3-15 having the structure of Formula (3) was used instead of 3.0 parts by mass of the azo compound corresponding to Compound Example 2-26 having the structure of Formula (2-I) in the production of the polarizer of Example 19, and this polarizing plate was used as a measurement sample of Example 44.

Example 45

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 8 except that 0.88 parts by mass of the azo compound corresponding to Compound Example 3-8 having the structure of Formula (3) was used instead of 1.1 parts by mass of the azo compound corresponding to Compound Example 2-6 having the structure of Formula (2-I) in the production of the polarizer of Example 8, and this polarizing plate was used as a measurement sample of Example 45.

Example 46

A polarizer of the present disclosure containing an azo compound having the structure of Formula (1), an azo compound having the structure of Formula (3) and an azo compound having the structure of Formula (6), as well as a polarizing plate using the same were produced in the same manner as in Example 25 except that the content of the azo compound corresponding to Compound Example 6-1 having the structure of Formula (6) was changed to 0.2 parts by mass, and that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 25, and this polarizing plate was used as a measurement sample of Example 46.

Example 47

A polarizer of the present disclosure containing an azo compound having the structure of Formula (1), an azo compound having the structure of Formula (3) and an azo compound having the structure of Formula (19), as well as a polarizing plate using the same were produced in the same manner as in Example 26 except that the content of the azo compound corresponding to Compound Example 1-5 having the structure of Formula (1) was changed to 0.5 parts by mass, that the content of the azo compound corresponding to C.I. Direct Yellow 28 was changed to 0.2 parts by mass, and that 0.76 parts by mass of the azo compound corresponding to Compound Example 3-13 having the structure of Formula (3) was used instead of 1.1 parts by mass of the azo compound corresponding to Compound Example 2-6 having the structure of Formula (2-I) in the production of the polarizer of Example 26, and this polarizing plate was used as a measurement sample of Example 47.

The respective azo compounds used in Examples 27 to 47 and the contents thereof are collectively shown in Table 2 below.

compound having the structure of Formula (4-II) as well as a polarizing plate using the same were produced in the same manner as in Example 2 except that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 2, and this polarizing plate was used as a measurement sample of Example 49.

Example 50

A polarizer of the present disclosure containing an azo compound having the structure of Formula (1), an azo

TABLE 2

|  | Compound A | | Compound B | | Compound C | | Another Dichroic Dye | |
|---|---|---|---|---|---|---|---|---|
|  | Compound Example | Content (Parts) | Compound Example | Content (Parts) | Compound Example | Content (Parts) | Compound | Content (Parts) |
| Example 27 | 1-5 | 0.5 | 3-13 | 0.76 | | | | |
| Example 28 | 1-2 | 0.5 | 3-13 | 0.76 | | | | |
| Example 29 | 1-5 | 0.55 | 3-13 | 0.76 | 6-2 | 0.15 | | |
| Example 30 | 1-2 | 0.6 | 3-13 | 0.76 | 6-2 | 0.15 | | |
| Example 31 | 1-6 | 0.48 | 3-13 | 0.76 | 6-2 | 0.15 | | |
| Example 32 | 1-7 | 0.78 | 3-13 | 0.76 | 6-2 | 0.15 | | |
| Example 33 | 1-13 | 0.78 | 3-13 | 0.76 | 6-2 | 0.15 | | |
| Example 34 | 1-23 | 0.45 | 3-13 | 0.76 | 6-2 | 0.15 | | |
| Example 35 | 1-22 | 0.51 | 3-13 | 0.76 | 6-2 | 0.15 | | |
| Example 36 | 1-18 | 0.75 | 3-13 | 0.76 | 6-2 | 0.15 | | |
| Example 37 | 1-12 | 0.89 | 3-13 | 0.76 | 6-2 | 0.15 | | |
| Example 38 | 1-11 | 1.0 | 3-13 | 0.76 | 6-2 | 0.15 | | |
| Example 39 | 1-14 | 0.96 | 3-13 | 0.76 | 6-2 | 0.15 | | |
| Example 40 | 1-5 | 0.42 | 3-12 | 0.71 | 6-2 | 0.15 | | |
| Example 41 | 1-5 | 0.48 | 3-1 | 0.85 | 6-2 | 0.15 | | |
| Example 42 | 1-5 | 0.52 | 3-8 | 0.91 | 6-2 | 0.15 | | |
| Example 43 | 1-5 | 0.54 | 3-7 | 0.75 | 6-2 | 0.15 | | |
| Example 44 | 1-5 | 0.34 | 3-15 | 2.1 | 6-2 | 0.15 | | |
| Example 45 | 1-23 | 0.45 | 3-8 | 0.88 | 6-2 | 0.15 | | |
| Example 46 | 1-5 | 0.5 | 3-13 | 0.76 | 6-1 | 0.2 | | |
| Example 47 | 1-5 | 0.5 | 3-13 | 0.76 | | | C.I. Direct Yellow 28 | 0.20 |

In each of Examples 48 to 69 described below, a polarizer containing, in a base thereof, an azo compound represented by Formula (1) as the compound A, an azo compound represented by Formula (4-I) or Formula (4-II) as the compound B, optionally an azo compound represented by Formula (6) as the compound C, and optionally another dichroic dye, as well as a polarizing plate using the same were produced.

Example 48

A polarizer of the present disclosure containing an azo compound having the structure of Formula (1) and an azo compound having the structure of Formula (4-II), as well as a polarizing plate using the same were produced in the same manner as in Example 1 except that 2.0 parts by mass of an azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 1, and this polarizing plate was used as a measurement sample of Example 48.

Example 49

A polarizer of the present disclosure containing an azo compound having the structure of Formula (1) and an azo compound having the structure of Formula (4-II) and an azo compound having the structure of Formula (6), as well as a polarizing plate using the same were produced in the same manner as in Example 3 except that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 3, and this polarizing plate was used as a measurement sample of Example 50.

Example 51

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 4 except that 2.0 parts by mass of the azo compound corresponding to Compound Example 4-15 having the structure of Formula (4-II) was used instead of 1.1 parts by mass of the azo compound corresponding to Compound Example 2-6 having the structure of Formula

Example 52

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 5 except that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 5, and this polarizing plate was used as a measurement sample of Example 52.

Example 53

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 6 except that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 6, and this polarizing plate was used as a measurement sample of Example 53.

Example 54

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 7 except that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 7, and this polarizing plate was used as a measurement sample of Example 54.

Example 55

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 8 except that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 8, and this polarizing plate was used as a measurement sample of Example 55.

Example 56

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 9 except that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 9, and this polarizing plate was used as a measurement sample of Example 56.

Example 57

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 10 except that the content of the azo compound corresponding to Compound Example 1-18 having the structure of Formula (1) was changed to 0.75 parts by mass, and that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 10, and this polarizing plate was used as a measurement sample of Example 57.

Example 58

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 11 except that the content of the azo compound corresponding to Compound Example 1-12 having the structure of Formula (1) was changed to 0.89 parts by mass, and that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 11, and this polarizing plate was used as a measurement sample of Example 58.

Example 59

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 12 except that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 12, and this polarizing plate was used as a measurement sample of Example 59.

Example 60

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 13 except that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 13, and this polarizing plate was used as a measurement sample of Example 60.

Example 61

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 14 except that 1.05 parts by mass of an azo compound corresponding to Compound Example 4-23 having the structure of Formula (4-II) was used instead of 1.1 parts by mass of the azo compound corresponding to Compound Example 2-2 having the structure of Formula (2-I) in the production of the polarizer of Example 14, and this polarizing plate was used as a measurement sample of Example 61.

Example 62

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 16 except that 1.10 parts by mass of an azo compound corresponding to Compound Example 4-17 having the structure of Formula (4-II) was used instead of 1.5 parts by mass of the azo compound corresponding to Compound Example 2-27 having the structure of Formula (2-I) in the production of the polarizer of Example 16, and this polarizing plate was used as a measurement sample of Example 62.

Example 63

A polarizer of the present disclosure containing an azo compound having the structure of Formula (1), an azo compound having the structure of Formula (4-I) and an azo compound having the structure of Formula (6), as well as a polarizing plate using the same were produced in the same manner as in Example 17 except that 1.35 parts by mass of an azo compound corresponding to Compound Example 4-12 having the structure of Formula (4-I) was used instead of 2.3 parts by mass of the azo compound corresponding to Compound Example 2-14 having the structure of Formula (2-I) in the production of the polarizer of Example 17, and this polarizing plate was used as a measurement sample of Example 63.

Example 64

A polarizer of the present disclosure containing an azo compound having the structure of Formula (1), an azo compound having the structure of Formula (4-I) and an azo compound having the structure of Formula (6), as well as a polarizing plate using the same were produced in the same manner as in Example 17 except that the content of the azo compound corresponding to Compound Example 1-5 having the structure of Formula (1) was changed to 0.54 parts by mass, and that 0.95 parts by mass of an azo compound corresponding to Compound Example 4-9 having the structure of Formula (4-I) was used instead of 2.3 parts by mass of the azo compound corresponding to Compound Example 2-14 having the structure of Formula (2-I) in the production of the polarizer of Example 17, and this polarizing plate was used as a measurement sample of Example 64.

Example 65

A polarizer of the present disclosure containing an azo compound having the structure of Formula (1), an azo compound having the structure of Formula (4-I) and an azo compound having the structure of Formula (6), as well as a polarizing plate using the same were produced in the same mariner as in Example 19 except that the content of the azo compound corresponding to Compound Example 1-23 having the structure of Formula (1) was changed to 0.57 parts by mass, and that 1.10 parts by mass of the azo compound corresponding to Compound Example 4-17 having the structure of Formula (4-I) was used instead of 1.1 parts by mass of the azo compound corresponding to Compound Example 2-6 having the structure of Formula (2-I) in the production of the polarizer of Example 8, and this polarizing plate was used as a measurement sample of Example 65.

Example 66

A polarizer of the present disclosure containing an azo compound having the structure of Formula (1), an azo compound having the structure of Formula (4-I) and an azo compound having the structure of Formula (6), as well as a polarizing plate using the same were produced in the same manner as in Example 8 except that 0.92 parts by mass of an azo compound corresponding to Compound Example 4-14 having the structure of Formula (4-I) was used instead of 1.1 parts by mass of the azo compound corresponding to Compound Example 2-6 having the structure of Formula (2-I) in the production of the polarizer of Example 8, and this polarizing plate was used as a measurement sample of Example 66.

Example 67

A polarizer of the present disclosure containing an azo compound having the structure of Formula (1), an azo compound having the structure of Formula (4-II) and an azo compound having the structure of Formula (6), as well as a polarizing plate using the same were produced in the same mariner as in Example 8 except that 1.30 parts by mass of an azo compound corresponding to Compound Example 4-20 having the structure of Formula (4-II) was used instead of 1.1 parts by mass of the azo compound corresponding to Compound Example 2-6 having the structure of Formula (2-I) in the production of the polarizer of Example 8, and this polarizing plate was used as a measurement sample of Example 67.

Example 68

A polarizer of the present disclosure containing an azo compound having the structure of Formula (1), an azo compound having the structure of Formula (4-II) and an azo compound having the structure of Formula (6), as well as a polarizing plate using the same were produced in the same manner as in Example 25 except that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 25, and this polarizing plate was used as a measurement sample of Example 68.

Example 69

A polarizer of the present disclosure containing an azo compound having the structure of Formula (1), an azo compound having the structure of Formula (4-II) and an azo compound having the structure of Formula (19), as well as a polarizing plate using the same were produced in the same manner as in Example 26 except that the content of the azo compound corresponding to Compound Example 1-5 having the structure of Formula (1) was changed to 0.5 parts by mass, that the content of the azo compound corresponding to C.I. Direct Yellow 28 was changed to 0.2 parts by mass, and that 2.0 parts by mass of the azo compound corresponding to Compound Example 4-15 having the structure of Formula (4-II) was used instead of 1.1 parts by mass of the azo compound corresponding to Compound Example 2-6 having the structure of Formula (2-I) in the production of the polarizer of Example 26, and this polarizing plate was used as a measurement sample of Example 69.

The respective azo compounds used in Examples 48 to 69 and the contents thereof are collectively shown in Table 3 below.

pound represented by Formula (7), and optionally another dichroic dye, as well as a polarizing plate using the same were produced.

Example 70

A polarizer of the present disclosure containing an azo compound having the structure of Formula (1) and an azo compound having the structure of Formula (5-II), as well as a polarizing plate using the same were produced in the same manner as in Example 1 except that the content of the azo compound corresponding to Compound Example 1-5 having the structure of Formula (1) was changed to 0.65 parts by mass, and that 0.82 parts by mass of an azo compound corresponding to Compound Example 5-14 having the structure of Formula (5-II) was used instead of 1.1 parts by mass of the azo compound corresponding to Compound Example 2-6 having the structure of Formula (2-I) in the production of the polarizer of Example 1, and this polarizing plate was used as a measurement sample of Example 70.

Example 71

A polarizer of the present disclosure containing an azo compound having the structure of Formula (1) and an azo compound having the structure of Formula (5-II), as well as a polarizing plate using the same were produced in the same manner as in Example 2 except that the content of the azo compound corresponding to Compound Example 1-2 having the structure of Formula (1) was changed to 0.65 parts by mass, and that 0.82 parts by mass of the azo compound

TABLE 3

| | Compound A | | Compound B | | Compound C | | Another Dichroic Dye | |
|---|---|---|---|---|---|---|---|---|
| | Compound Example | Content (Parts) | Compound Example | Content (Parts) | Compound Example | Content (Parts) | Compound | Content (Parts) |
| Example 48 | 1-5 | 0.5 | 4-15 | 2.0 | | | | |
| Example 49 | 1-2 | 0.5 | 4-15 | 2.0 | | | | |
| Example 50 | 1-5 | 0.55 | 4-15 | 2.0 | 6-2 | 0.15 | | |
| Example 51 | 1-2 | 0.6 | 4-15 | 2.0 | 6-2 | 0.15 | | |
| Example 52 | 1-6 | 0.48 | 4-15 | 2.0 | 6-2 | 0.15 | | |
| Example 53 | 1-7 | 0.78 | 4-15 | 2.0 | 6-2 | 0.15 | | |
| Example 54 | 1-13 | 0.78 | 4-15 | 2.0 | 6-2 | 0.15 | | |
| Example 55 | 1-23 | 0.45 | 4-15 | 2.0 | 6-2 | 0.15 | | |
| Example 56 | 1-22 | 0.51 | 4-15 | 2.0 | 6-2 | 0.15 | | |
| Example 57 | 1-18 | 0.75 | 4-15 | 2.0 | 6-2 | 0.15 | | |
| Example 58 | 1-12 | 0.89 | 4-15 | 2.0 | 6-2 | 0.15 | | |
| Example 59 | 1-11 | 1.0 | 4-15 | 2.0 | 6-2 | 0.15 | | |
| Example 60 | 1-14 | 0.96 | 4-15 | 2.0 | 6-2 | 0.15 | | |
| Example 61 | 1-5 | 0.42 | 4-23 | 1.05 | 6-2 | 0.15 | | |
| Example 62 | 1-5 | 0.48 | 4-17 | 1.1 | 6-2 | 0.15 | | |
| Example 63 | 1-5 | 0.52 | 4-12 | 1.35 | 6-2 | 0.15 | | |
| Example 64 | 1-5 | 0.54 | 4-9 | 0.95 | 6-2 | 0.15 | | |
| Example 65 | 1-23 | 0.57 | 4-17 | 1.1 | 6-2 | 0.15 | | |
| Example 66 | 1-23 | 0.45 | 4-14 | 0.92 | 6-2 | 0.15 | | |
| Example 67 | 1-23 | 0.45 | 4-20 | 1.3 | 6-2 | 0.15 | | |
| Example 68 | 1-5 | 0.5 | 4-15 | 2.0 | 6-1 | 0.13 | | |
| Example 69 | 1-5 | 0.5 | 4-15 | 2.0 | | | C.I. Direct Yellow 28 | 0.20 |

In each of Examples 70 to 89 described below, a polarizer containing, in a base thereof, an azo compound represented by Formula (1) as the compound A, an azo compound represented by Formula (5-I) or Formula (5-II) as the compound B, optionally an azo compound represented by Formula (6) as the compound C, optionally an azo comcorresponding to Compound Example 5-14 having the structure of Formula (5-II) was used instead of 1.1 parts by mass of the azo compound corresponding to Compound Example 2-6 having the structure of Formula (2-I) in the production of the polarizer of Example 2, and this polarizing plate was used as a measurement sample of Example 71.

Example 72

A polarizer of the present disclosure containing an azo compound having the structure of Formula (1), an azo compound having the structure of Formula (5-II) and an azo compound having the structure of Formula (6), as well as a polarizing plate using the same were produced in the same manner as in Example 3 except that 0.82 parts by mass of the azo compound corresponding to Compound Example 5-14 having the structure of Formula (5-II) was used instead of 1.1 parts by mass of the azo compound corresponding to Compound Example 2-6 having the structure of Formula (2-I) in the production of the polarizer of Example 3, and this polarizing plate was used as a measurement sample of Example 72.

Example 73

A polarizer of the present disclosure containing an azo compound having the structure of Formula (1), an azo compound having the structure of Formula (5-II) and an azo compound having the structure of Formula (6), as well as a polarizing plate using the same were produced in the same manner as in Example 4 except that 0.82 parts by mass of the azo compound corresponding to Compound Example 5-14 having the structure of Formula (5-II) was used instead of 1.1 parts by mass of the azo compound corresponding to Compound Example 2-6 having the structure of Formula (2-I) in the production of the polarizer of Example 4, and this polarizing plate was used as a measurement sample of Example 73.

Example 74

A polarizer of the present disclosure containing an azo compound having the structure of Formula (1), an azo compound having the structure of Formula (5-II) and an azo compound having the structure of Formula (6), as well as a polarizing plate using the same were produced in the same manner as in Example 5 except that 0.82 parts by mass of the azo compound corresponding to Compound Example 5-14 having the structure of Formula (5-II) was used instead of 1.1 parts by mass of the azo compound corresponding to Compound Example 2-6 having the structure of Formula (2-I) in the production of the polarizer of Example 5, and this polarizing plate was used as a measurement sample of Example 74.

Example 75

A polarizer of the present disclosure containing an azo compound having the structure of Formula (1), an azo compound having the structure of Formula (5-II) and an azo compound having the structure of Formula (6), as well as a polarizing plate using the same were produced in the same manner as in Example 6 except that 0.82 parts by mass of the azo compound corresponding to Compound Example 5-14 having the structure of Formula (5-II) was used instead of 1.1 parts by mass of the azo compound corresponding to Compound Example 2-6 having the structure of Formula (2-I) in the production of the polarizer of Example 6, and this polarizing plate was used as a measurement sample of Example 75.

Example 76

A polarizer of the present disclosure containing an azo compound having the structure of Formula (1), an azo compound having the structure of Formula (5-II) and an azo compound having the structure of Formula (6), as well as a polarizing plate using the same were produced in the same manner as in Example 7 except that 0.82 parts by mass of the azo compound corresponding to Compound Example 5-14 having the structure of Formula (5-II) was used instead of 1.1 parts by mass of the azo compound corresponding to Compound Example 2-6 having the structure of Formula (2-I) in the production of the polarizer of Example 7, and this polarizing plate was used as a measurement sample of Example 76.

Example 77

A polarizer of the present disclosure containing an azo compound having the structure of Formula (1), an azo compound having the structure of Formula (5-II) and an azo compound having the structure of Formula (6), as well as a polarizing plate using the same were produced in the same manner as in Example 8 except that 0.82 parts by mass of the azo compound corresponding to Compound Example 5-14 having the structure of Formula (5-II) was used instead of 1.1 parts by mass of the azo compound corresponding to Compound Example 2-6 having the structure of Formula (2-I) in the production of the polarizer of Example 8, and this polarizing plate was used as a measurement sample of Example 77.

Example 78

A polarizer of the present disclosure containing an azo compound having the structure of Formula (1), an azo compound having the structure of Formula (5-II) and an azo compound having the structure of Formula (6), as well as a polarizing plate using the same were produced in the same manner as in Example 9 except that 0.82 parts by mass of the azo compound corresponding to Compound Example 5-14 having the structure of Formula (5-II) was used instead of 1.1 parts by mass of the azo compound corresponding to Compound Example 2-6 having the structure of Formula (2-I) in the production of the polarizer of Example 9, and this polarizing plate was used as a measurement sample of Example 78.

Example 79

A polarizer of the present disclosure containing an azo compound having the structure of Formula (1), an azo compound having the structure of Formula (5-II) and an azo compound having the structure of Formula (6), as well as a polarizing plate using the same were produced in the same manner as in Example 10 except that the content of the azo compound corresponding to Compound Example 1-18 having the structure of Formula (1) was changed to 0.75 parts by mass, and that 0.82 parts by mass of the azo compound corresponding to Compound Example 5-14 having the structure of Formula (5-II) was used instead of 1.1 parts by mass of the azo compound corresponding to Compound Example 2-6 having the structure of Formula (2-I) in the production of the polarizer of Example 10, and this polarizing plate was used as a measurement sample of Example 79.

Example 80

A polarizer of the present disclosure containing an azo compound having the structure of Formula (1), an azo compound having the structure of Formula (5-II) and an azo compound having the structure of Formula (6), as well as a polarizing plate using the same were produced in the same manner as in Example 11 except that the content of the azo compound corresponding to Compound Example 1-12 having the structure of Formula (1) was changed to 0.89 parts by mass, and that 0.82 parts by mass of the azo compound corresponding to Compound Example 5-14 having the structure of Formula (5-II) was used instead of 1.1 parts by mass of the azo compound corresponding to Compound Example 2-6 having the structure of Formula (2-I) in the production of the polarizer of Example 11, and this polarizing plate was used as a measurement sample of Example 80.

Example 81

A polarizer of the present disclosure containing an azo compound having the structure of Formula (1), an azo compound having the structure of Formula (5-II) and an azo compound having the structure of Formula (6), as well as a polarizing plate using the same were produced in the same manner as in Example 12 except that 0.82 parts by mass of the azo compound corresponding to Compound Example 5-14 having the structure of Formula (5-II) was used instead of 1.1 parts by mass of the azo compound corresponding to Compound Example 2-6 having the structure of Formula (2-I) in the production of the polarizer of Example 12, and this polarizing plate was used as a measurement sample of Example 81.

Example 82

A polarizer of the present disclosure containing an azo compound having the structure of Formula (1), an azo compound having the structure of Formula (5-II) and an azo compound having the structure of Formula (6), as well as a polarizing plate using the same were produced in the same manner as in Example 13 except that 0.82 parts by mass of the azo compound corresponding to Compound Example 5-14 having the structure of Formula (5-II) was used instead of 1.1 parts by mass of the azo compound corresponding to Compound Example 2-6 having the structure of Formula (2-I) in the production of the polarizer of Example 13, and this polarizing plate was used as a measurement sample of Example 82.

Example 83

A polarizer of the present disclosure containing an azo compound having the structure of Formula (1), an azo compound having the structure of Formula (5-I) and an azo compound having the structure of Formula (6), as well as a polarizing plate using the same were produced in the same mariner as in Example 14 except that 0.75 parts by mass of an azo compound corresponding to Compound Example 5-1 having the structure of Formula (5-I) was used instead of 1.1 parts b mass of the azo compound corresponding to Compound Example 2-2 having the structure of Formula (2-I) in the production of the polarizer of Example 14, and this polarizing plate was used as a measurement sample of Example 83.

Example 84

A polarizer of the present disclosure containing an azo compound having the structure of Formula (1), an azo compound having the structure of Formula (5-II) and an azo compound having the structure of Formula (6), as well as a polarizing plate using the same were produced in the same manner as in Example 16 except that 1.05 parts by mass of an azo compound corresponding to Compound Example 5-18 having the structure of Formula (5-II) was used instead of 1.5 parts by mass of the azo compound corresponding to Compound Example 2-27 having the structure of Formula (2-I) in the production of the polarizer of Example 16, and this polarizing plate was used as a measurement sample of Example 84.

Example 85

A polarizer of the present disclosure containing an azo compound having the structure of Formula (1), an azo compound having the structure of Formula (5-I), an azo compound having the structure of Formula (6) and an azo compound having the structure of Formula (7), as well as a polarizing plate using the same were produced in the same manner as in Example 17 except that 0.96 parts by mass of the azo compound corresponding to Compound Example 5-1 having the structure of Formula (5-I) was used instead of 2.3 parts by mass of the azo compound corresponding to Compound Example 2-14 having the structure of Formula (2-I) and that 0.38 parts by mass of an azo compound corresponding to Compound Example 7-39 having the structure of Formula (7) was further used in the production of the polarizer of Example 17, and this polarizing plate was used as a measurement sample of Example 85.

Example 86

A polarizer of the present disclosure containing an azo compound having the structure of Formula (1), an azo compound having the structure of Formula (5-I), an azo compound having the structure of Formula (6) and an azo compound having the structure of Formula (7), as well as a polarizing plate using the same were produced in the same manner as in Example 17 except that 0.96 parts by mass of the azo compound corresponding to Compound Example 5-4 having the structure of Formula (5-I) was used instead of 2.3 parts by mass of the azo compound corresponding to Compound Example 2-14 having the structure of Formula (2-I) and that 0.52 parts by mass of an azo compound corresponding to Compound Example 7-91 having the structure of Formula (7) was further used in the production of the polarizer of Example 17, and this polarizing plate was used as a measurement sample of Example 86.

Example 87

A polarizer of the present disclosure containing an azo compound having the structure of Formula (1), an azo compound having the structure of Formula (5-I), an azo compound having the structure of Formula (6) and an azo compound having the structure of Formula (7), as well as a polarizing plate using the same were produced in the same manner as in Example 8 except that the content of the azo compound corresponding to Compound Example 1-23 having the structure of Formula (1) was changed to 0.65 parts by mass, that 0.75 parts by mass of the azo compound corresponding to Compound Example 5-1 having the structure of Formula (5-I) was used instead of 1.1 parts by mass of the azo compound corresponding to Compound Example 2-6 having the structure of Formula (2-I) and that 0.40 parts by mass of the azo compound corresponding to Compound Example 7-39 having the structure of Formula (7) was further used in the production of the polarizer of Example 8, and this polarizing plate was used as a measurement sample of Example 87.

Example 88

A polarizer of the present disclosure containing an azo compound having the structure of Formula (1.), an azo compound having the structure of Formula (5-I) and an azo compound having the structure of Formula (6), as well as a polarizing plate using the same were produced in the same manner as in Example 25 except that the content of the azo compound corresponding to Compound Example 6-1 having the structure of Formula (6) was changed to 0.14 parts by mass, and that 0.96 parts by mass of the azo compound corresponding to Compound Example 5-1 having the structure of Formula (5-I) was used instead of 1.1 parts by mass of the azo compound corresponding to Compound Example 2-6 having the structure of Formula (2-I) in the production of the polarizer of Example 25, and this polarizing plate was used as a measurement sample of Example 88.

Example 89

A polarizer of the present disclosure containing an azo compound having the structure of Formula (1), an azo compound having the structure of Formula (5-I) and an azo compound having the structure of Formula (19), as well as a polarizing plate using the same were produced in the same manner as in Example 26 except that the content of the azo compound corresponding to Compound Example 1-5 having the structure of Formula (1) was changed to 0.52 parts by mass, that the content of the azo compound corresponding to C.I. Direct Yellow 28 was changed to 0.2 parts by mass, and that 0.96 parts by mass of the azo compound corresponding to Compound Example 5-1 having the structure of Formula (5-I) was used instead of 1.1 parts by mass of the azo compound corresponding to Compound Example 2-6 having the structure of Formula (2-I) in the production of the polarizer of Example 26, and this polarizing plate was used as a measurement sample of Example 89.

The respective azo compounds used in Examples 70 to 89 and the contents thereof are collectively shown in Table 4 below.

TABLE 4

| | Compound A | | Compound B | | Compound C | | azo compound by the Formula (7) | | Another Dichroic Dye | |
|---|---|---|---|---|---|---|---|---|---|---|
| | Compound Example | Content (Parts) | Compound Example | Content (Parts) | Compound Example | Content (Parts) | Compound Example | Content (Parts) | Compound | Content (Parts) |
| Example 70 | 1-5 | 0.65 | 5-14 | 0.82 | | | | | | |
| Example 71 | 1-2 | 0.65 | 5-14 | 0.82 | | | | | | |
| Example 72 | 1-5 | 0.55 | 5-14 | 0.82 | 6-2 | 0.15 | | | | |
| Example 73 | 1-2 | 0.6 | 5-14 | 0.82 | 6-2 | 0.15 | | | | |
| Example 74 | 1-6 | 0.48 | 5-14 | 0.82 | 6-2 | 0.15 | | | | |
| Example 75 | 1-7 | 0.78 | 5-14 | 0.82 | 6-2 | 0.15 | | | | |
| Example 76 | 1-13 | 0.78 | 5-14 | 0.82 | 6-2 | 0.15 | | | | |
| Example 77 | 1-24 | 0.45 | 5-14 | 0.82 | 6-2 | 0.15 | | | | |
| Example 78 | 1-23 | 0.51 | 5-14 | 0.82 | 6-2 | 0.15 | | | | |
| Example 79 | 1-19 | 0.75 | 5-14 | 0.82 | 6-2 | 0.15 | | | | |
| Example 80 | 1-12 | 0.89 | 5-14 | 0.82 | 6-2 | 0.15 | | | | |
| Example 81 | 1-11 | 1.0 | 5-14 | 0.82 | 6-2 | 0.15 | | | | |
| Example 82 | 1-14 | 0.96 | 5-14 | 0.82 | 6-2 | 0.15 | | | | |
| Example 83 | 1-5 | 0.42 | 5-1 | 0.75 | 6-2 | 0.15 | | | | |
| Example 84 | 1-5 | 0.48 | 5-18 | 1.05 | 6-2 | 0.15 | | | | |
| Example 85 | 1-5 | 0.52 | 5-1 | 0.96 | 6-2 | 0.15 | 7-39 | 0.38 | | |
| Example 86 | 1-5 | 0.52 | 5-1 | 0.96 | 6-2 | 0.15 | 7-91 | 0.52 | | |
| Example 87 | 1-24 | 0.65 | 5-1 | 0.75 | 6-2 | 0.14 | 7-39 | 0.40 | | |
| Example 88 | 1-5 | 0.52 | 5-1 | 0.96 | 6-1 | 0.14 | | | | |
| Example 89 | 1-5 | 0.52 | 5-1 | 0.96 | | | | | C.I. Direct Yellow 28 | 0.20 |

Comparative Example 1

A polarizer not containing the compound A of the present disclosure, as well as a polarizing plate using the same were produced in the same manner as in Example 1 except that a dye aqueous solution containing the same azo compounds as those described in Example 2 of Japanese Laid-Open Patent Publication No. 11-218611 was used as a dye aqueous solution for use in absorbing the azo compounds in the production of the polarizer in Example 1 to produce a polarizer having luminous efficiency-corrected single transmittance Ys of about 41%, and this polarizing plate was used as a measurement sample of Comparative Example 1.

Comparative Example 2

A polarizer not containing the compound A of the present disclosure, as well as a polarizing plate using the same were produced in the same manner as in Example 1 except that a dye aqueous solution containing the same azo compounds as those described in Example 3 of Japanese Patent No. 4162334 was used as a dye aqueous solution for use in absorbing the azo compounds in the production of the polarizer in Example 1 to produce a polarizer having luminous efficiency-corrected single transmittance Ys of about 41%, and this polarizing plate was used as a measurement sample of Comparative Example 2.

Comparative Example 3

A polarizer not containing the compound A of the present disclosure, as well as a polarizing plate using the same were produced in the same manner as in Example 1 except that a dye aqueous solution containing the same azo compounds as those described in Example 1 of Japanese Patent No. 4360100 was used as a dye aqueous solution for use in absorbing the azo compounds in the production of the polarizer in Example 1 to produce a polarizer having luminous efficiency-corrected single transmittance Ys of about 41%, and this polarizing plate was used as a measurement sample of Comparative Example 3.

Comparative Example 4

A polarizer not containing the compound A of the present disclosure, as well as a polarizing plate using the same were produced in the same manner as in Example 3 except that the azo compound corresponding to Compound Example 1-5 having the structure of Formula (1) was replaced with an azo compound corresponding to C.I. Direct Red 80 having the ureide skeleton in the production of the polarizer in Example 3, and this polarizing plate was used as a measurement sample of Comparative Example 4. It is noted that C.I. Direct Red 80 is an azo compound having the following structural Formula:

having the ureide skeleton in the production of the polarizer in Example 29, and this polarizing plate was used as a measurement sample of Comparative Example 6.

Comparative Example 7

A polarizer not containing the compound A of the present disclosure, as well as a polarizing plate using the same were produced. In the same manner as in Example 29 except that the azo compound corresponding to Compound Example 1-5 having the structure of Formula (1) was replaced with the azo compound corresponding to C.I. Direct Red 84 having the ureide skeleton in the production of the polarizer in Example 29, and this polarizing plate was used as a measurement sample of Comparative Example 7.

Comparative Example 8

A polarizer not containing the compound A of the present disclosure, as well as a polarizing plate using the same were produced in the same manner as in Example 50 except that the azo compound corresponding to Compound Example 1-5 having the structure of Formula (1) was replaced with the azo compound corresponding to C.I. Direct Red 80

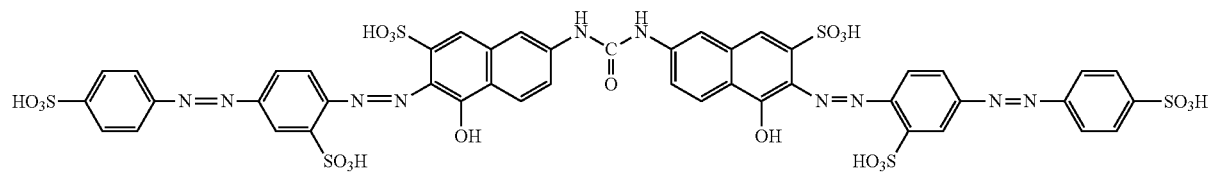

C.I. Direct Red 80

Comparative Example 5

A polarizer not containing the compound A of the present disclosure, as well as a polarizing plate using the same were produced. In the same manner as in Example 3 except that the azo compound corresponding to Compound. Example 1-5 having the structure of Formula (1) was replaced with an azo compound corresponding to C.I. Direct Red 84 having the ureide skeleton in the production of the polarizer in Example 3, and this polarizing plate was used as a measurement sample of Comparative Example 5. It is noted that C.I. Direct Red 84 is an azo compound having the following structural Formula:

having the ureide skeleton in the production of the polarizer in Example 50, and this polarizing plate was used as a measurement sample of Comparative Example 8.

Comparative Example 9

A polarizer not containing the compound. A of the present disclosure, as well as a polarizing plate using the same were produced in the same manner as in Example 50 except that the azo compound corresponding to Compound Example 1-5 having the structure of Formula (1) was replaced with the azo compound corresponding to C.I. Direct Red 84 having the ureide skeleton in the production of the polarizer in Example 50, and this polarizing plate was used as a measurement sample of Comparative Example 9.

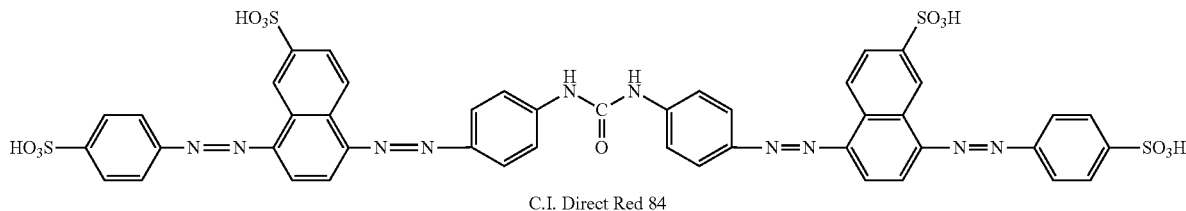 [SMILES: O=C(Nc1ccc(N=Nc2ccc(N=Nc3ccc(S(=O)(=O)O)cc3)c3cc(S(=O)(=O)O)ccc23)cc1)Nc1ccc(N=Nc2ccc(N=Nc3ccc(S(=O)(=O)O)cc3)c3cc(S(=O)(=O)O)ccc23)cc1]

C.I. Direct Red 84

Comparative Example 6

A polarizer not containing the compound A of the present disclosure, as well as a polarizing plate using the same were produced in the same manner as in Example 29 except that the azo compound corresponding to Compound Example 1-5 having the structure of Formula (1) was replaced with the azo compound corresponding to C.I. Direct Red 80

Comparative Example 10

A polarizer not containing the compound A of the present disclosure, as well as a polarizing plate using the same were produced in the same manner as in Example 72 except that the azo compound corresponding to Compound Example 1-5 having the structure of Formula (1) was replaced with the azo compound corresponding, to C.I. Direct Red 80 having the ureide skeleton in the production of the polarizer in Example 72, and this polarizing plate was used as a measurement sample of Comparative Example 10.

Comparative Example 11

A polarizer not containing the compound A of the present disclosure, as well as a polarizing plate using the same were produced in the same manner as in Example 72 except that the azo compound corresponding to Compound Example 1-5 having the structure of Formula (1) was replaced with the azo compound corresponding to C.I. Direct Red 84 having the ureide skeleton in the production of the polarizer in Example 72, and this polarizing plate was used as a measurement sample of Comparative Example 11.

Comparative Example 12

A polarizer not containing the compound B of the present disclosure, as well as a polarizing plate using the same were produced in the same manner as in Example 3 except that 1.1 parts by mass of the azo compound corresponding to Compound Example 2-6 having the structure of Formula (2-I) was replaced with 0.82 parts by mass of an azo compound described in Example 1 of Japanese Patent Publication No. 64-5623, which similarly shows blue color, has the highest degree of polarization at substantially the same wavelength and has the following structural Formula, and this polarizing plate was used as a measurement sample of Comparative Example 12.

Comparative Example 14

An iodine-based polarizer containing iodine instead of the compound A and the compound B of the present disclosure, as well as a polarizing plate using the same were produced in the same manner as in Example 1 except that an iodine-containing dye aqueous solution (a dye aqueous solution containing iodine, potassium iodide and ammonium iodide) described in Comparative Example 3 of Japanese Laid-Open Patent Publication No. 2006-276236 was used as a dye aqueous solution for use in absorbing the azo compounds in the production of the polarizer in Example 1 to produce an iodine-based polarizer having luminous efficiency-corrected single transmittance (Ys) of about 41%, and this polarizing plate was used as a measurement sample of Comparative Example 14.

[Evaluation]

The measurement samples obtained in Examples 1 to 89 and Comparative Examples 1 to 14 were evaluated as follows.

[Single Transmittance Ts, Parallel Transmittance Tp and Cross Transmittance Tc]

The single transmittance Ts, the parallel transmittance Tp and the cross transmittance Tc of each measurement sample were measured using a spectrophotometer ("U-4100" manufactured by Hitachi, Ltd.). Here, the single transmittance Ts refers to transmittance at each wavelength measured using a single measurement sample. The parallel transmittance Tp refers to spectral transmittance at each wavelength measured

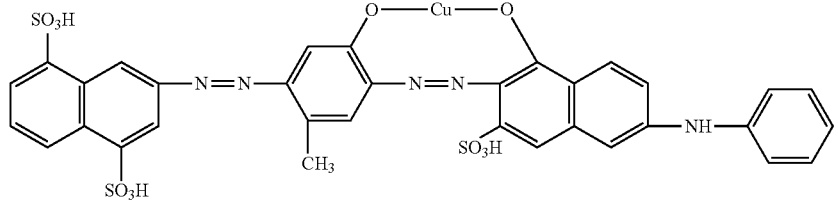

Comparative Example 13

A polarizer not containing the compound B of the present disclosure, as well as a polarizing plate using the same were produced in the same manner as in Example 3 except that 1.1 parts by mass the azo compound corresponding to Compound Example 2-6 having the structure of Formula (2-I) was replaced with Li parts by mass of an azo compound represented by Formula (17) described in International Publication No. WO2012/108169, which is similarly a tetrakis-azo compound and has the following structural Formula, and this polarizing plate was used as a measurement sample of Comparative Example 13.

with two measurement samples stacked with their absorption axes aligned in parallel to each other. The cross transmittance Tc refers to spectral transmittance measured with two measurement samples stacked with their absorption axes aligned to orthogonally cross each other. The measurement of each transmittance was performed in a wavelength region of 400 to 700 nm.

[Luminous Efficiency-Corrected Single Transmittance Ys, Luminous Efficiency-Corrected Parallel Transmittance Yp and Luminous Efficiency-corrected Cross Transmittance Yc]

Luminous efficiency-corrected single transmittance Ys, luminous efficiency-corrected parallel transmittance Yp and luminous efficiency-corrected cross transmittance Yc refer

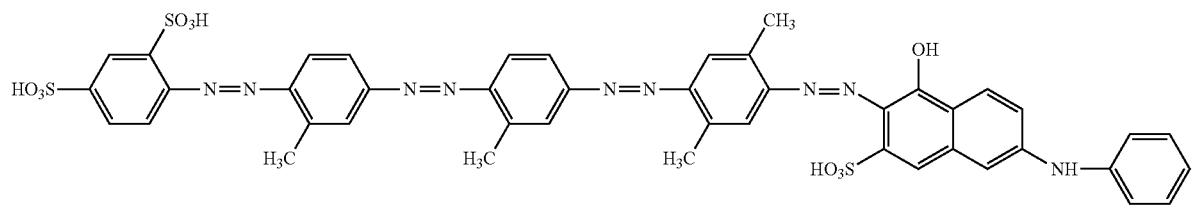 [SMILES: Cc1cc(N=Nc2cc(C)c(N=Nc3c(S(=O)(=O)O)cc4cc(Nc5ccccc5)ccc4c3O)cc2C)ccc1N=Nc1ccc(N=Nc2ccc(S(=O)(=O)O)cc2S(=O)(=O)O)c(C)c1]

to transmittance obtained by respectively correcting the single transmittance Ts, the parallel transmittance Tp and the cross transmittance Tc, which were obtained in the wavelength region of 400 to 700 nm at a prescribed wavelength interval dλ (herein, at intervals of 5 nm), based on the luminous efficiency in accordance with JIS Z 8722:2009. Specifically, they were calculated by substituting the single transmittance Ts, the parallel transmittance Tp and the cross transmittance Tc respectively in the following equations. In the following equations, Pλ represents a spectral distribution of standard light (illuminant C), and yλ represents a 2-degree visual field color matching function.

$$Ys(\%) = \frac{\int_{400}^{700} P\lambda \cdot y\lambda \cdot Ts \cdot d\lambda}{\int_{400}^{700} P\lambda \cdot y\lambda \cdot d\lambda}$$

$$Yp(\%) = \frac{\int_{400}^{700} P\lambda \cdot y\lambda \cdot Tp \cdot d\lambda}{\int_{400}^{700} P\lambda \cdot y\lambda \cdot d\lambda}$$

$$Yc(\%) = \frac{\int_{400}^{700} P\lambda \cdot y\lambda \cdot Tc \cdot d\lambda}{\int_{400}^{700} P\lambda \cdot y\lambda \cdot d\lambda}$$

(Degree of Polarization ρy)

The degree of polarization ρy of each measurement sample was obtained. The degree of polarization ρy was calculated by substituting the luminous efficiency-corrected parallel transmittance Yp and the luminous efficiency cross transmittance Yc in the following equation.

$$\rho y = \{(Yp-Yc)/(Yp+Yc)\}^{1/2} \times 100$$

(Contrast)

A contrast CR was checked by calculating a ratio (Yp/Yc) between the luminous efficiency-corrected parallel transmittance Yp and the luminous efficiency-corrected cross transmittance Yc measured using two measurement samples of the same type.

[Polarization Performance]

Table 5 below shows results of the polarization performance of the respective measurement samples of Example 1 to 26 and Comparative Examples 1 to 5 and 12 to 14.

TABLE 5

| | Ys (%) | Yp (%) | Yc (%) | ρ (%) | CR |
|---|---|---|---|---|---|
| Example 1 | 40.76 | 33.16 | 0.0675 | 99.80 | 491 |
| Example 2 | 40.89 | 33.39 | 0.0461 | 99.86 | 724 |
| Example 3 | 40.98 | 33.56 | 0.0279 | 99.92 | 1202 |
| Example 4 | 40.98 | 33.56 | 0.0253 | 99.92 | 1327 |
| Example 5 | 41.11 | 33.78 | 0.0240 | 99.93 | 1407 |
| Example 6 | 41.13 | 33.80 | 0.0352 | 99.90 | 960 |
| Example 7 | 41.24 | 33.99 | 0.0221 | 99.94 | 1538 |
| Example 8 | 40.91 | 33.46 | 0.0087 | 99.97 | 3846 |
| Example 9 | 41.25 | 34.02 | 0.0156 | 99.95 | 2180 |
| Example 10 | 40.85 | 33.28 | 0.0905 | 99.73 | 368 |
| Example 11 | 40.93 | 33.48 | 0.0222 | 99.93 | 1508 |
| Example 12 | 40.96 | 33.53 | 0.0210 | 99.94 | 1597 |
| Example 13 | 41.09 | 33.72 | 0.0464 | 99.86 | 726 |
| Example 14 | 41.02 | 33.54 | 0.1107 | 99.67 | 303 |
| Example 15 | 40.80 | 33.19 | 0.0983 | 99.70 | 338 |
| Example 16 | 41.17 | 33.89 | 0.0091 | 99.97 | 3724 |
| Example 17 | 41.05 | 33.69 | 0.0071 | 99.98 | 4746 |
| Example 18 | 41.02 | 33.65 | 0.0033 | 99.99 | 10197 |
| Example 19 | 41.18 | 33.87 | 0.0414 | 99.88 | 818 |
| Example 20 | 40.95 | 33.51 | 0.0241 | 99.93 | 1391 |
| Example 21 | 40.86 | 33.35 | 0.0360 | 99.89 | 927 |
| Example 22 | 41.04 | 33.66 | 0.0291 | 99.91 | 1157 |
| Example 23 | 41.13 | 33.80 | 0.0289 | 99.91 | 1170 |
| Example 24 | 40.36 | 32.54 | 0.0391 | 99.88 | 832 |
| Example 25 | 41.14 | 33.82 | 0.0293 | 99.91 | 1154 |
| Example 26 | 41.13 | 33.78 | 0.0518 | 99.85 | 652 |
| Comparative Example 1 | 40.28 | 31.02 | 1.4320 | 95.49 | 22 |
| Comparative Example 2 | 41.32 | 33.16 | 0.9892 | 97.06 | 34 |
| Comparative Example 3 | 41.31 | 33.40 | 0.7264 | 97.85 | 46 |
| Comparative Example 4 | 40.79 | 31.17 | 2.1050 | 93.46 | 15 |
| Comparative Example 5 | 40.88 | 30.28 | 3.1451 | 90.10 | 10 |
| Comparative Example 12 | 40.72 | 30.74 | 2.4240 | 92.40 | 13 |
| Comparative Example 13 | 40.95 | 32.76 | 0.7820 | 97.64 | 42 |
| Comparative Example 14 | 41.43 | 34.33 | 0.0012 | 100.00 | 28606 |

As is understood from Table 5, in comparison between Examples 1 to 26 and Comparative Examples 1 to 5, 12 and 13, each polarizing plate of the present disclosure containing both the azo compound represented by Formula (1) as the compound A and the azo compound represented by Formula (2-I) or Formula (2-II) as the compound B has a higher degree of polarization and remarkably improved contrast as compared with the dye-based polarizing plates of Comparative Examples 1 to 5 not containing the compound A and the dye-based polarizing plates of Comparative Examples 12 and 13 not containing the compound B. Accordingly, when both the azo compound represented by Formula (1) and the azo compound represented by Formula (2-I) or (2-II) are used as the dichroic dyes, a polarizing plate excellent in the polarization performance, particularly a polarizing plate having a high degree of polarization and high contrast can be obtained.

Table 6 below shows results of the polarization performance of the measurement samples of Examples 27 to 47 and Comparative Examples 6 and 7. The results of Comparative Examples 1 to 3 and 12 to 14 are the same as those shown in Table 5.

TABLE 6

| | Ys (%) | Yp (%) | Yc (%) | ρ (%) | CR |
|---|---|---|---|---|---|
| Example 27 | 41.08 | 33.65 | 0.1008 | 99.70 | 334 |
| Example 28 | 41.02 | 33.58 | 0.0730 | 99.78 | 460 |
| Example 29 | 40.89 | 33.40 | 0.0409 | 99.88 | 817 |
| Example 30 | 40.76 | 33.19 | 0.0360 | 99.89 | 921 |
| Example 31 | 40.85 | 33.34 | 0.0373 | 99.89 | 893 |
| Example 32 | 40.96 | 33.49 | 0.0613 | 99.82 | 547 |
| Example 33 | 40.83 | 33.31 | 0.0351 | 99.89 | 949 |
| Example 34 | 41.06 | 33.70 | 0.0157 | 99.95 | 2147 |
| Example 35 | 40.97 | 33.55 | 0.0234 | 99.93 | 1434 |
| Example 36 | 40.93 | 33.37 | 0.1358 | 99.59 | 246 |
| Example 37 | 40.97 | 33.54 | 0.0312 | 99.91 | 1077 |
| Example 38 | 41.05 | 33.67 | 0.0355 | 99.89 | 948 |
| Example 39 | 41.31 | 34.06 | 0.0717 | 99.79 | 475 |
| Example 40 | 41.15 | 33.70 | 0.1691 | 99.50 | 199 |
| Example 41 | 41.07 | 33.71 | 0.0297 | 99.91 | 1137 |
| Example 42 | 40.90 | 33.43 | 0.0267 | 99.92 | 1254 |
| Example 43 | 41.19 | 33.86 | 0.0741 | 99.78 | 457 |
| Example 44 | 40.86 | 33.31 | 0.0758 | 99.77 | 440 |
| Example 45 | 41.05 | 33.70 | 0.0050 | 99.99 | 6807 |

TABLE 6-continued

|  | Ys (%) | Yp (%) | Yc (%) | ρ (%) | CR |
|---|---|---|---|---|---|
| Example 46 | 41.06 | 33.67 | 0.0453 | 99.87 | 744 |
| Example 47 | 40.95 | 33.47 | 0.0677 | 99.80 | 494 |
| Comparative Example 6 | 41.09 | 23.53 | 10.2354 | 62.75 | 2 |
| Comparative Example 7 | 40.75 | 24.77 | 8.4391 | 70.13 | 3 |

As is understood from Table 6, in comparison between Examples 27 to 47 and Comparative Examples 6 and 7, each polarizing plate of the present disclosure containing both the azo compound represented by Formula (1) as the compound A and the azo compound represented by Formula (3) as the compound B has a higher degree of polarization and remarkably improved contrast as compared with the dye-based polarizing plates of Comparative Examples 6 and 7 not containing the compound A. Besides, since the polarization performance of the measurement samples of Comparative Examples 1 to 3 not containing the compound A and Comparative Examples 12 and 13 not containing the compound B is the same as that shown in Table 5, each polarizing plate of the present disclosure of Examples 27 to 47 also has a higher degree of polarization and remarkably improved contrast as compared with the dye-based polarizing plates of Comparative Examples 1 to 3, 12 and 13. Accordingly, when both the azo compound represented by Formula (1) and the azo compound represented by Formula (3) are used as the dichroic dyes, a polarizing plate excellent in the polarization performance, particularly a polarizing plate having a high degree of polarization and high contrast can be obtained.

Table 7 below shows the results of polarization performance of the respective measurement samples of Examples 48 to 69 and Comparative Examples 8 and 9. The results of Comparative Examples 1 to 3 and 12 to 14 are the same as those shown in Table 5.

TABLE 7

|  | Ys (%) | Yp (%) | Yc (%) | ρ (%) | CR |
|---|---|---|---|---|---|
| Example 48 | 40.89 | 33.31 | 0.1250 | 99.63 | 267 |
| Example 49 | 40.92 | 33.37 | 0.1184 | 99.65 | 282 |
| Example 50 | 41.21 | 33.93 | 0.0401 | 99.88 | 846 |
| Example 51 | 41.03 | 33.64 | 0.0325 | 99.90 | 1035 |
| Example 52 | 41.01 | 33.59 | 0.0423 | 99.87 | 794 |
| Example 53 | 40.90 | 33.39 | 0.0707 | 99.79 | 472 |
| Example 54 | 40.97 | 33.52 | 0.0541 | 99.84 | 620 |
| Example 55 | 41.22 | 33.96 | 0.0204 | 99.94 | 1665 |
| Example 56 | 40.82 | 33.29 | 0.0309 | 99.91 | 1077 |
| Example 57 | 41.24 | 33.92 | 0.0902 | 99.73 | 376 |
| Example 58 | 40.97 | 33.54 | 0.0297 | 99.91 | 1129 |
| Example 59 | 41.05 | 33.67 | 0.0366 | 99.89 | 920 |
| Example 60 | 41.07 | 33.67 | 0.0674 | 99.80 | 500 |
| Example 61 | 41.11 | 33.75 | 0.0502 | 99.85 | 672 |
| Example 62 | 41.07 | 33.71 | 0.0297 | 99.91 | 1137 |
| Example 63 | 40.88 | 33.40 | 0.0251 | 99.92 | 1331 |
| Example 64 | 41.15 | 33.84 | 0.0229 | 99.93 | 1478 |
| Example 65 | 40.92 | 33.48 | 0.0114 | 99.97 | 2937 |
| Example 66 | 41.10 | 33.77 | 0.0185 | 99.95 | 1825 |
| Example 67 | 41.06 | 33.69 | 0.0263 | 99.92 | 1281 |
| Example 68 | 41.08 | 33.70 | 0.0507 | 99.85 | 665 |
| Example 69 | 40.98 | 33.50 | 0.0893 | 99.73 | 375 |
| Comparative Example 8 | 41.03 | 31.15 | 2.5190 | 92.22 | 12 |
| Comparative Example 9 | 40.91 | 30.32 | 3.1551 | 90.08 | 10 |

As is understood from Table 7, in comparison between Examples 48 to 69 and Comparative Examples 8 and 9, each polarizing plate of the present disclosure containing both the azo compound represented by Formula (1) as the compound A and the azo compound represented by Formula (4-I) or (4-II) as the compound B has a higher degree of polarization and remarkably improved contrast as compared with the dye-based polarizing plates of Comparative Examples 8 and 9 not containing the compound A. Besides, since the polarization performance of the measurement samples of Comparative Examples 1 to 3 not containing the compound A and Comparative Examples 12 and 13 not containing the compound B is the same as that shown in Table 5, each polarizing plate of the present disclosure of Examples 48 to 69 also has a higher degree of polarization and remarkably improved contrast as compared with the dye-based polarizing plates to Comparative Examples 1 to 3, 12 and 13. Accordingly, when both the azo compound represented by Formula (1) and the azo compound represented by Formula (4-I) or (4-II) are used as the dichroic dyes, a polarizing plate excellent in the polarization performance, particularly a polarizing plate having a high degree of polarization and high contrast can be obtained.

Table 8 shows the results of the polarization performance of the respective measurement samples of Examples 70 to 89 and Comparative Examples 10 and 11. The results of Comparative Examples 1 to 13 and 12 to 14 are the same as those shown in Table 5.

TABLE 8

|  | Ys (%) | Yp (%) | Yc (%) | ρ (%) | CR |
|---|---|---|---|---|---|
| Example 70 | 40.96 | 33.34 | 0.2154 | 99.36 | 155 |
| Example 71 | 40.97 | 33.42 | 0.1542 | 99.54 | 217 |
| Example 72 | 41.06 | 33.67 | 0.0512 | 99.85 | 658 |
| Example 73 | 40.92 | 33.43 | 0.0568 | 99.83 | 589 |
| Example 74 | 41.12 | 33.76 | 0.0533 | 99.84 | 633 |
| Example 75 | 40.90 | 33.38 | 0.0812 | 99.76 | 411 |
| Example 76 | 40.88 | 33.38 | 0.0447 | 99.87 | 747 |
| Example 77 | 40.94 | 33.49 | 0.0321 | 99.90 | 1043 |
| Example 78 | 41.01 | 33.60 | 0.0392 | 99.88 | 857 |
| Example 79 | 41.09 | 33.68 | 0.0917 | 99.73 | 367 |
| Example 80 | 41.12 | 33.76 | 0.0555 | 99.84 | 608 |
| Example 81 | 40.91 | 33.43 | 0.0391 | 99.88 | 855 |
| Example 82 | 40.83 | 33.28 | 0.0586 | 99.82 | 568 |
| Example 83 | 40.86 | 33.35 | 0.0415 | 99.88 | 804 |
| Example 84 | 40.84 | 33.31 | 0.0458 | 99.86 | 727 |
| Example 85 | 41.13 | 33.80 | 0.0292 | 99.91 | 1158 |
| Example 86 | 40.95 | 33.51 | 0.0246 | 99.93 | 1362 |
| Example 87 | 41.05 | 33.68 | 0.0215 | 99.94 | 1567 |
| Example 88 | 41.11 | 33.75 | 0.0509 | 99.85 | 663 |
| Example 89 | 41.20 | 33.86 | 0.0893 | 99.74 | 379 |
| Comparative Example 10 | 41.09 | 23.94 | 9.8230 | 64.67 | 2 |
| Comparative Example 11 | 40.75 | 29.96 | 3.2510 | 89.68 | 9 |

As is understood from Table 8, in comparison between Examples 70 to 89 and Comparative Examples 10 and 11, each polarizing plate of the present disclosure containing both the azo compound represented by Formula (1) as the compound A and the azo compound represented by Formula (5-I) or (5-II) as the compound B has a higher degree of polarization and remarkably improved contrast as compared with the dye-based polarizing plates of Comparative Examples 10 and 11 not containing the compound A. Besides, since the polarization performance of the measurement samples of Comparative Examples 1 to 3 not containing the compound A and Comparative Examples 12 and 13 not containing the compound B is the same as that shown in Table 5, each polarizing plate of the present disclosure of Examples 70 to 89 also has a higher degree of polarization and remarkably improved contrast as compared with the dye-based polarizing plates to Comparative Examples 1 to 3, 12 and 13. Accordingly, when both the azo compound represented by Formula (1) and the azo compound represented by Formula (5-I) or (5-II) are used as the dichroic dyes, a polarizing plate excellent in the polarization performance, particularly a polarizing plate having a high degree of polarization and high contrast can be obtained.

[Durability Test]

Next, for performing a durability test of a polarizing plate of the present disclosure, each of the measurement samples of Examples 3, 18, 29, 50 and 77, Comparative Example 2 and Comparative Example 14 was applied under an environment of 85° C. and relative humidity of 85% RH for 1000 hours. The results are shown in Table 9 below.

TABLE 9

|  | Initial | | After 1000 hrs. | |
| --- | --- | --- | --- | --- |
|  | Ys (%) | ρy (%) | Ys (%) | ρy (%) |
| Example 3 | 40.98 | 99.92 | 39.58 | 99.99 |
| Example 18 | 41.02 | 99.99 | 40.19 | 99.99 |
| Example 29 | 40.89 | 99.88 | 40.71 | 99.92 |
| Example 50 | 41.21 | 99.88 | 40.81 | 99.94 |
| Example 72 | 41.06 | 99.85 | 40.75 | 99.97 |
| Comparative Example 2 | 41.32 | 99.06 | 33.51 | 99.99 |
| Comparative Example 14 | 41.46 | 99.99 | 78.23 | 7.22 |

As is understood from Table 9, in comparison between Comparative Example 2 and Examples 3, 18, 29, 50 and 72, the luminous efficiency-corrected single transmittance Ys was lowered in the measurement sample of Comparative Example 2 but the luminous efficiency-corrected single transmittance Ys had substantially the same value as that obtained before the durability test in the measurement samples of Examples 3, 18, 29, 50 and 72. This reveals that the polarizing plate of the present disclosure is less deteriorated in the luminous efficiency-corrected single transmittance is through the durability test than the conventional dye-based polarizing plate, and hence has high durability. Besides, in comparison between Comparative Example 14 of the iodine-based polarizing plate and Examples 3, 18, 29, 50 and 72, a great lowering of the degree of polarization ρy was observed in the measurement sample of Comparative Example 14, but the lowering of the degree of polarization ρy was not observed at all in the measurement samples of Example 3, 18, 29, 50 and 72. This reveals that the polarizing plate of the present disclosure is obviously improved in the durability as compared with the conventional iodine-based polarizing plate. Accordingly, the polarizer or the polarizing plate of the present disclosure has a high degree of polarization, high contrast and high durability, and when such a polarizer or polarizing plate of the present disclosure is used in a liquid crystal display device, a highly reliable and brighter liquid crystal display device having high contrast for a long period of time can be provided.

What is claimed is:
1. A polarizer containing: in a base thereof,
at least one of an azo compound represented by the following Formula (1) or a salt thereof (as compound A); and
at least one of an azo compound represented by the following Formula (2-I), (2-II), (3), (4-I), (4-II), (5-I) or (5-II), or a salt thereof (as compound B):
the compound A:

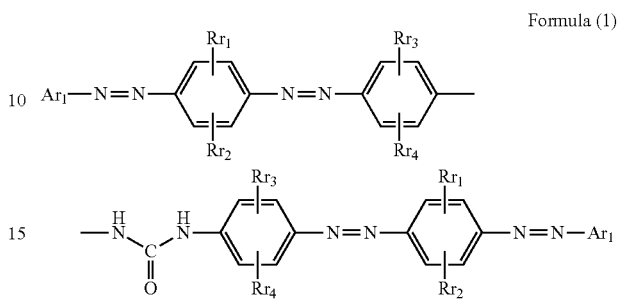

Formula (1)

wherein $Ar_1$ represents a phenyl group or a naphthyl group having at least one substituent of a sulfo group or a carboxy group; and
$Rr_1$ to $Rr_4$ each independently represent a hydrogen atom, a lower alkyl group, a lower alkoxy group or a lower alkoxy group having a sulfo group,
the compound B:

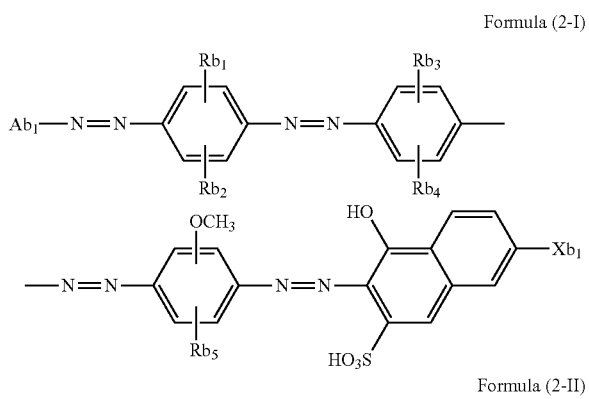

Formula (2-I)

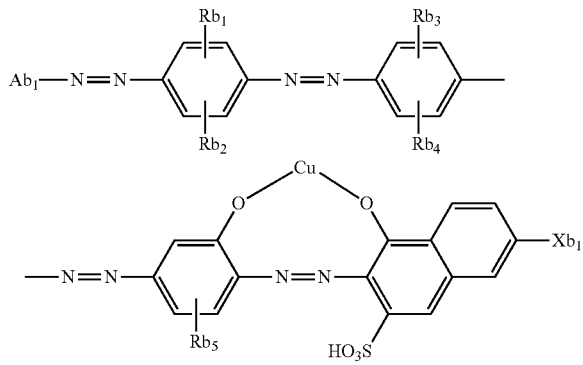

Formula (2-II)

wherein $Ab_1$ represents a phenyl group or a naphthyl group having at least one substituent of a sulfo group or a carboxy group;
$Rb_1$ to $Rb_5$ each independently represent a hydrogen atom, a lower alkyl group, a lower alkoxy group or a lower alkoxy group having a sulfo group; and
$Xb_1$ represents an amino group, a phenylamino group, a phenylazo group, a naphthotriazole group or a benzoylamino group optionally having at least one substituent selected from the group consisting of a lower alkyl group, a lower alkoxy group, a sulfo group, an amino group, a lower alkylamino group, a hydroxyl group, a carboxy group and a carboxyethyl amino group, Formula (3)

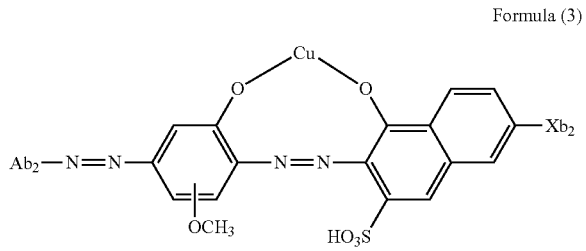

wherein $Ab_2$ represents a phenyl group or a naphthyl group having at least one substituent of a sulfo group or a carboxy group; and $Xb_2$ represents a phenylamino group, a phenylazo group, a naphthotriazole group or a benzoylamino group optionally having at least one substituent selected from the group consisting of a lower alkyl, a lower alkoxy group, a hydroxyl group, a carboxy group, a sulfo group, an amino group and a substituted amino group, Formula (4-I)

Formula (4-II)

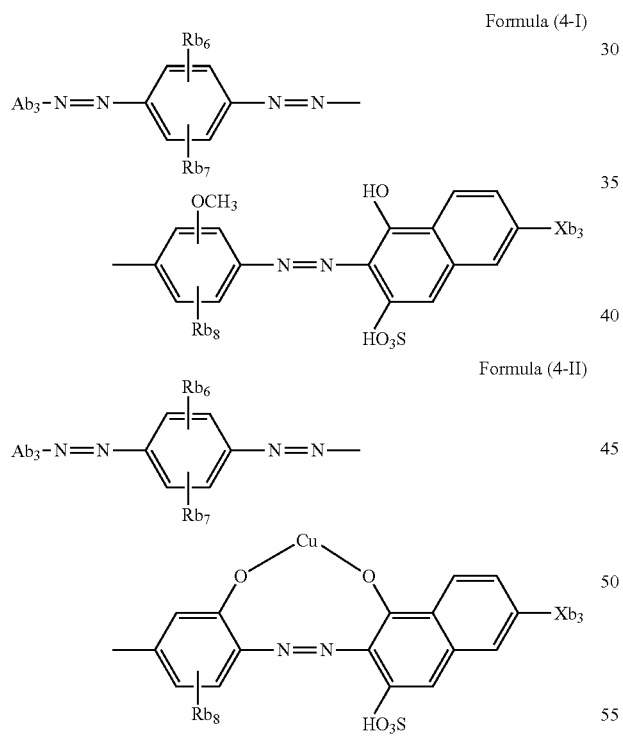

wherein $Ab_3$ represents a phenyl group or a naphthyl group having at least one substituent of a sulfo group or a carboxy group;

$Rb_6$ to $Rb_8$ each independently represent a hydrogen atom, a lower alkyl group, a lower alkoxy group or a lower alkoxyl group having a sulfo group; and $Xb_3$ represents an amino group, a phenylamino group, a phenylazo group, a benzoyl group, a benzoylamino group or a naphthotriazole group optionally having at least one substituent selected from the group consisting of a lower alkyl, a lower alkoxy group, a hydroxyl group, a carboxy group, a sulfo group, an amino group, a substituted amino group and an aminonaphthyl group, and Formula (5-I)

Formula (5-II)

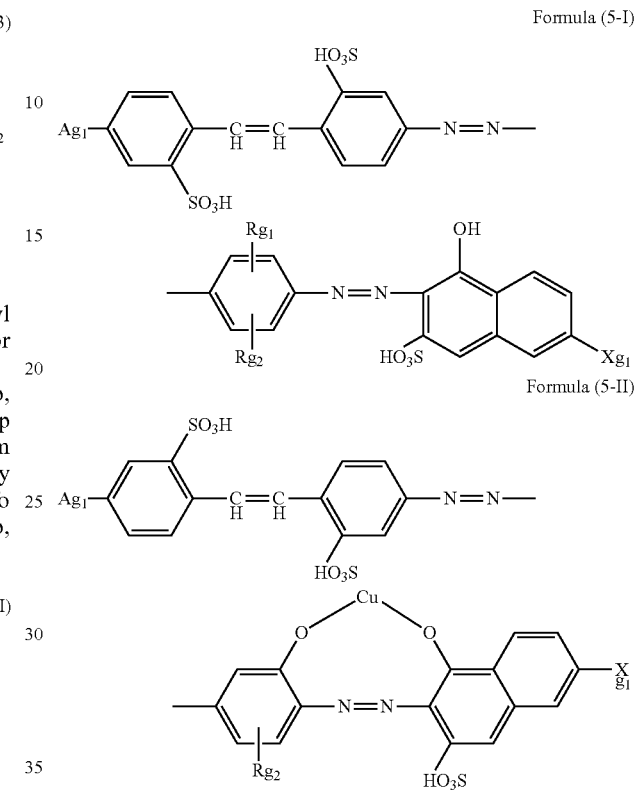

wherein $Ag_1$ represents a nitro group or an amino group, $Xg_1$ represents: an amino group optionally having at least one substituent selected from the group consisting of a lower alkyl group, a lower alkoxy group and a sulfo group;

a benzoyl group or a benzoylamino group optionally having at least one substituent selected from the group consisting of a lower alkyl group, a lower alkoxy group, a sulfo group, an amino group and a substituted amino group;

a phenylamino group optionally having at least one substituent selected from the group consisting of a lower alkyl group, a lower alkoxy group, a sulfo group, an amino group and a substituted amino group;

a phenylazo group optionally having at least one substituent selected from the group consisting of a lower alkyl group, a lower alkoxy group, a sulfo group, a hydroxyl group, an amino group and a substituted amino group; or a naphthotriazole group optionally having at least one substituent selected from the group consisting of a lower alkyl group, a lower alkoxy group, a sulfo group, an amino group and a substituted amino group, $Rg_1$ and $Rg_2$ of Formula (5-I) each independently represent a hydrogen atom, a hydroxyl group, a lower alkyl group, a lower alkoxy group or a lower alkoxy group having a sulfo group, and $Rg_2$ of Formula (5-II) represents a hydrogen atom, a hydroxyl group, a lower alkyl group, a lower alkoxy group or a lower alkoxy group having a sulfo group.

2. The polarizer according to claim 1, wherein the compound represented by Formula (1) is represented by the following Formula (1'):

Formula (1')

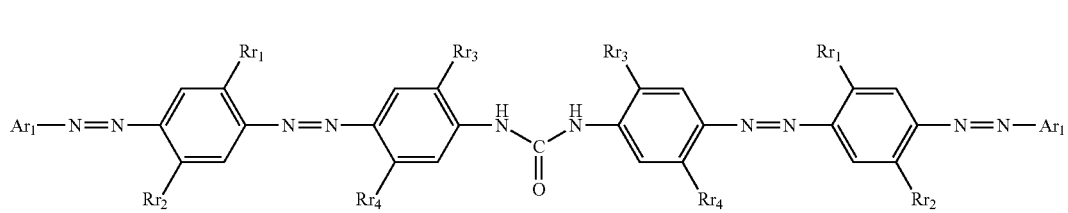

wherein $Ar_1$ and $Rr_1$ to $Rr_4$ are the same as defined in claim 1.

3. The polarizer according to claim 1, further containing, in the base, at least one of an azo compound represented by the following Formula (6) or a salt thereof (as compound C):

Formula (6)

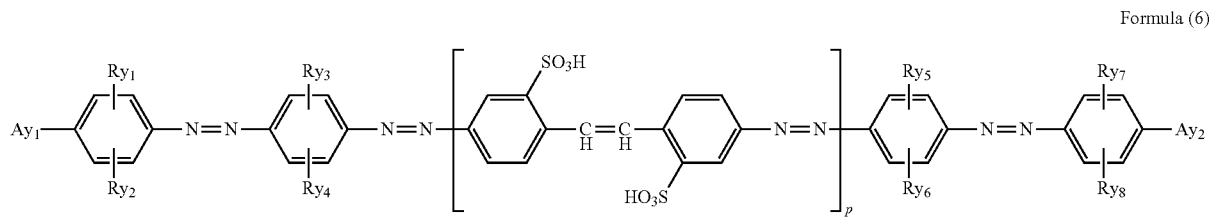

wherein $Ay_1$ and $Ay_2$ each independently represent a sulfo group, a carboxy group, a hydroxyl group, a lower alkyl group or a lower alkoxyl group;

$Ry_1$ to $Ry_8$ each independently represent a hydrogen atom, a sulfo group, a lower alkyl group or a lower alkoxyl group; and p represents an integer of 1 to 3.

4. The polarizer according to claim 1, wherein the base is a film made of a polyvinyl alcohal-based resin.

5. A polarizing plate comprising a transparent protection layer on at least one surface of the polarizer according to claim 1.

6. A liquid crystal display device comprising the polarizer according to claim 1.

7. A liquid crystal display device comprising the polarizing plate according to claim 5.

* * * * *

UNITED STATES PATENT AND TRADEMARK OFFICE
CERTIFICATE OF CORRECTION

PATENT NO. : 10,007,142 B2
APPLICATION NO. : 15/814802
DATED : June 26, 2018
INVENTOR(S) : Noriaki Mochizuki and Takahiro Higeta Page 1 of 2

It is certified that error appears in the above-identified patent and that said Letters Patent is hereby corrected as shown below:

On the Title Page (*) Notice: "Subject to any disclaimer, the term of this patent is extended or adjusted under 35 U.S.C. 154(b) by 0 days. days." should read -- Subject to any disclaimer, the term of this patent is extended or adjusted under 35 U.S.C. 154(b) by 0 days. --.

In the Specification

Column 5, Formula (4-II) "$Xb_2$" should read -- $Xb_3$ -- (as shown below).

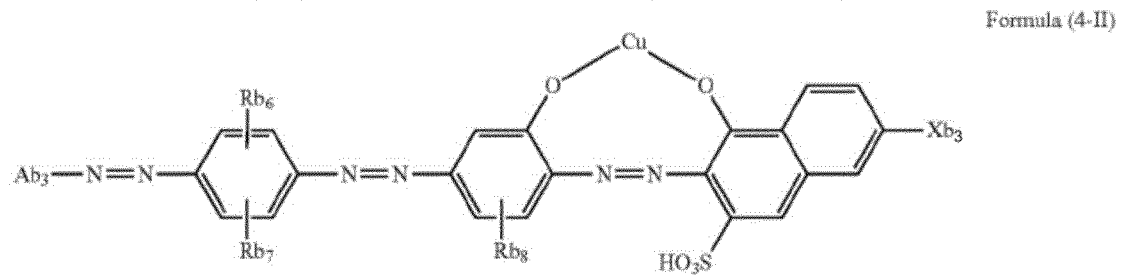

Column 10, Line 20, "An" should read -- Ar1 --.

Column 35, [Compound Example 2-38] "$OCH_3$" should read -- $SO_3H$ -- (as shown below).

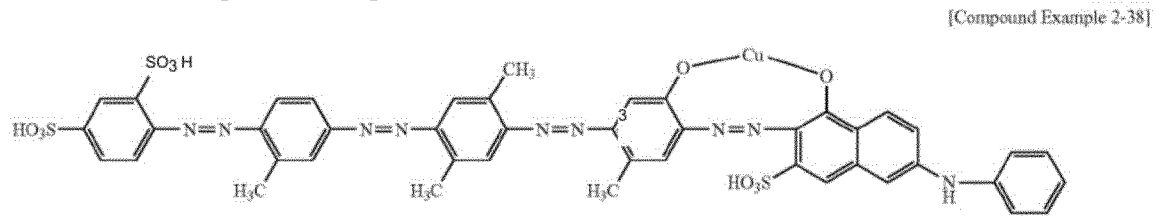

Signed and Sealed this
Third Day of September, 2019

Andrei Iancu
*Director of the United States Patent and Trademark Office*

CERTIFICATE OF CORRECTION (continued)
U.S. Pat. No. 10,007,142 B2

Column 63, [Compound Example 5-15] "H₂N" should read -- O₂N -- (as shown below).

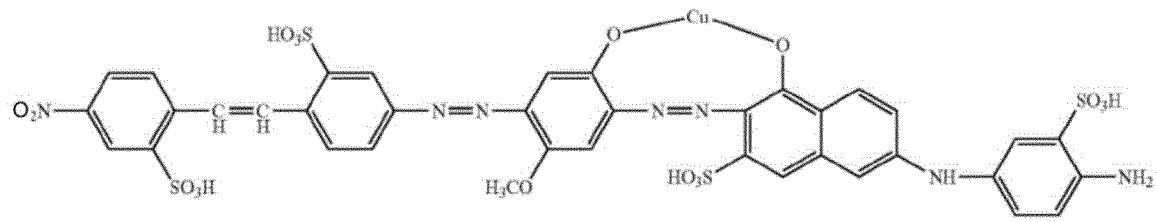

Column 101, Line 27, "The content of the plasticizer is preferably5 to 20% by mass and more preferably 8 to 15% by mass based o the whole film" should read -- The content of the plasticizer is preferably 5 to 20% by mass and more preferably 8 to 15% by mass based o the whole film --.

Column 107, Line 31, "...aqueous solution at 58° C. containing 10% by mass of boric..." should read -- ...aqueous solution at 58° C. containing 3.0% by mass of boric... --.

Column 119, Line 22, "...structure of Fomula (2-1) and an azo compound having the..." should read -- ...structure of Formula (2-11) and an azo compound having the... --.

Column 139, Line 7, "...compound having the structure Formula (1.), an azo..." should read -- ...compound having the structure Formula (1), an azo... --.

Column 143, Line 49, "...was replaced with Li parts by mass of an azo compound..." should read -- ...was replaced with 1:1 parts by mass of an azo compound... --.

Column 149, Line 14, "...of Examples 3, 18, 29, 50 and 77, Comparative Example 2..." should read -- ...of Examples 3, 18, 29, 50 and 72, Comparative Example 2... --.